United States Patent [19]

Tsevdos et al.

[11] Patent Number: 5,734,719
[45] Date of Patent: Mar. 31, 1998

[54] DIGITAL INFORMATION ACCESSING, DELIVERY AND PRODUCTION SYSTEM

[75] Inventors: James T. Tsevdos, Fort Lauderdale; Ross L. Cook, Boynton Beach; Nancy Lee Ring, Boca Raton; Robert S. Barnhill, Boca Raton; Glen E. Hamblin, Boca Raton; Kenneth L. Milsted, Boynton Beach; Craig N. Kindell; Susan Elizabeth Waefler, both of Delray Beach; Carlos Portela, Pompano Beach, all of Fla.; Brent C. Anderson, Dallas, Tex.

[73] Assignee: International Business Systems, Incorporated, Armonk, N.Y.

[21] Appl. No.: 763,308

[22] Filed: Dec. 10, 1996

(Under 37 CFR 1.47)

Related U.S. Application Data

[63] Continuation of Ser. No. 137,880, Oct. 15, 1993, abandoned.

[51] Int. Cl.⁶ .......................... H04N 7/167; H04N 7/00; H04N 7/12
[52] U.S. Cl. .................... 380/5; 348/1; 348/385; 348/387
[58] Field of Search ...................... 348/7, 1, 385, 348/387, 13; 380/5, 3, 4, 20; 455/6.3; 369/85

[56] References Cited

U.S. PATENT DOCUMENTS

| | | |
|---|---|---|
| 4,920,432 | 4/1990 | Eggers et al. . |
| 5,235,642 | 8/1993 | Wobber et al. ................... 380/25 |
| 5,247,347 | 9/1993 | Litteral et al. . |
| 5,412,717 | 5/1995 | Fischer ................................. 380/4 |
| 5,412,720 | 5/1995 | Hoarty ................................ 380/15 |
| 5,418,713 | 5/1995 | Allan . |

Primary Examiner—Stephen C. Buczinski

[57] ABSTRACT

A digital data on-demand turnkey system at a customer premise wherein N number of sewers provide for 100% of content distribution of remotely stored digitized information, which information may be previewed in real-time, and product incorporating selected digitized information can be manufactured on-site and within a short response time to a customer's request at a point of sale location. In a retail environment customers, at a point-of-sale location are able to exhaustively search and preview the content database using graphics-based touch screens at consumer kiosks. Previews including audio and video segments are made available. Prompting screens allow customers to make purchasing decisions by stipulating content which is available from any number of categories of subject matter including music. The selected media for the manufacture and production of the digital data may be from a myriad of different selections and can include CD's, cassette tapes, CD ROM technology, reel-to-reel tapes, and video disks, as an example. A master server will be situated geographically so as to be accessible to chain and network subservers. Its geographic and networked location is dependent upon communication network systems and subsystem costs and availability in order to best serve a customer's premise, whether it be a retail store or similar point-of-sale or other end-user location. Security mechanisms that require centralized database authorizations prior to the transmission of content and/or the manufacture of any of the products is provided in addition.

19 Claims, 30 Drawing Sheets

Business Analysis Tool Workstation

Select an Analysis Group and Press OK:

Sales:
- ▨ Gross Revenue
- ▨ Top Selling Albums For A Category
- ▨ Top Selling Albums
- ▨ Music Category
- ▨ Unit Sales By Media Type Customer Demographics:
- ▨ Customer Transactions By Age
- ▨ Time Of Day
- ▨ Money Spent

[OK] [Cancel]

Revenue For Period: 1/1/93 Through 1/1/94
(in 000's)

Compact Disc: $384
Tapes: $175
Total: $559

| ALBUM TITLE | COUNT |
|---|---|
| MAGICAL MYSTERY TOUR | 8 |
| WHO'S NEXT | 6 |
| CROSSROADS DISC I | 5 |
| HARVEST | 4 |

FIG. 31

| ALBUM NAME | CATEGORY | COUNT |
|---|---|---|
| MAGICAL MYSTERY TOUR | POP/ROCK | 8 |
| ALL MY LOVE | R&B/SOUL | 6 |
| SOUTHERN STAR | COUNTRY | 6 |
| WHO'S NEXT | POP/ROCK | 6 |
| BANNED IN THE U.S.A. | RAP | 5 |
| CROSSROADS DISC I | POP/ROCK | 5 |
| HARVEST | POP/ROCK | 4 |
| BEACHES SOUNDTRACK | SOUNDTRACK | 2 |

FIG. 32

| Age Groups | CD Volume | Tape Volume | Avg. Units/Transaction |
|---|---|---|---|
| 15-19.... | 9 | 5 | |
| 20-24.... | | | |
| 25-34.... | | | |
| 35-44.... | | | |
| >45..... | | | |

| Time of Day | Number of Transactions |
|---|---|
| 10:00AM-2:00PM | 6 |
| 2:00PM-6:00PM | 7 |
| 6:00PM-Midnight | 4 |

DIGITAL INFORMATION ACCESSING, DELIVERY AND PRODUCTION SYSTEM

This application is a continuation of application Ser. No. 08/137,880, filed Oct. 15, 1993, now abandoned.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to the field of data storage, data communication, review and controlled production of information, and in particular to a system for accessing digital information, including audio and video information, at remotely stored locations and for communicating in real-time that information to a user's premise or a point-of-sale for reproduction of the communicated information in a material object for end-user use.

2. Description of Related Art

Retailers of the world are in a constant struggle to meet the demands of the consuming public with regard to the availability and competitive pricing of products. This struggle is a challenge for the retailer's ability to meet the end-user's immediate need and if an item must be backordered, the customer's patience. The retailer must do that in a manner which is cost effective to the merchandiser and competitive from a delivery and price standpoint to the purchaser.

There is likely no more of a demanding and aggressive purchasing public than those individuals who are avid followers and fans of entertainers and artists in the entertainment industry. Because of the high demand and the massive number of customers and potential customers, as it relates to the entertainment industry, the level of competition is extremely high, whether it be for memorabilia, contemporary news items, fashion trends, or entertainment products.

Product distribution and availability is one of those merchandising areas where the retailer has experienced keen competition and where they have struggled to be the source of all products, to be identified as having immediate availability, to continue to serve the totality of the market share which they have captured and to grow that market share.

As an example, in the entertainment industry, particularly as it applies to companies involved in music typically known as music label companies, there has been a constant challenge for such companies to exploit their entire catalog. There is a need or concern to make every album in their catalog available in any format and to never be out of stock with respect to that particular product. If the labels are indeed able to achieve that high level of expectation and availability, the retailer then is faced with the dilemma of allocating floor space to all of that available inventory regardless of the popularity of much of the stocked material. If this is not common practice, the retailer will be faced with losing a particular customer and clientele if the stock is not on-hand. In most instances, it is unrealistic to expect that a retailer will have sufficient floor space and financial resources to have an exhaustive stock of all products. As an example, the music industry is presently offering 60,000 to 100,000 albums by title and is growing at an extraordinary rate. Additionally, artists are continually engaged to expand their repertoire. This is particularly true when an artist has gained recent popularity and is a big hit with the consuming public, which may have resulted in an insatiable appetite for that artist's work. The retailer has the challenge of identifying what quantities are marketable over what period of time for that artist and any number of other artists and labels. The outlet merchandiser is fraught with the effort to stock those products and to have them available when approached by a customer who has that immediate and demanding interest in procuring a copy of that artist's work. Any miscalculation by the retailer evolves in what is known as stock-outs.

The retailer's inventory management problems are there whether or not the product is in inventory at their particular retail outlet or needs to be procured in order to meet that immediate demand regardless of the life of the demand. These are time consuming and difficult calculations for retailers. The retailer break-even point is in a constant state of flux and miscalculations and bad judgment calls result in prices which are less than competitive and margins which are often nonexistent.

A further frequently encountered problem by the retailer is the issue of a purchaser who may not be in the position to fully identify either the artist by full name, the label company or the full name of the title of the authored work or piece. Now with respect to items which are of current popularity, some developed systems are available to preview portions that may be able to aid in the identification of the particular product of interest. However, when it comes to the literally hundreds of thousands of pieces that have been produced, it is a near impossibility under the present systems to assist that potential purchaser when that artistic production is not of current vintage and even may be extremely dated. Further, even if some assistance has been given to that particular purchaser, without preview of that item, there is a great deal of uncertainty on the part of the potential purchaser as to whether or not the item identified is one of interest to them. In most cases there is great hesitancy to purchase an item which may be relatively expensive and which may turn out to not be a item of particular interest.

It is difficult for the retailer to maximize the inventory at the retail outlet and have it attain the level of expectation of the customer. Inventory and product stocking principles, such as just-in-time practices, have assisted the merchandiser to control the amount of stock-on-hand against cash-flow concerns to meet customer demand. But these practices still fall short of the patientless consumer who wants the product now regardless of the reasonableness of the demand, even for products which are so popular that stock-outages are to be expected or products which are so dated that only archival copies generally exist.

Even in today's automated systems which provide a computerized library resource of available programmed materials, limitations are imposed and financial constraints are present due to a lack of convenient and available storage space and constricted and time consuming data communication channels.

SUMMARY OF THE INVENTION

The present inventive contribution provides a digital data on-demand turnkey system at the customer premise wherein N number of servers provide for 100% of content distribution of remotely stored digitized information, which information may be previewed or reviewed in real-time, and product incorporating selected digitized information can be manufactured within a short response time to a customer's request at a point of sale location. This technique is carried out without intermediate buffering or caching which minimizes costs particularly at those locations being served. The Oxford Dictionary of Computing defines a real-time system as any system in which the time at which output is produced is significant. It states that this is usually because the input corresponds to some movement in the physical world, and the output has to relate to that same movement. It notes that the lag from input time to output time must be sufficiently small for acceptable timeliness.

In a retail environment consumers, whether they be at a point-of-sale or at another customer premise, are able to exhaustively search and preview the content database using graphics-based touch screens at consumer interface terminals such as a kiosk. For a proposed audio application, previews including audio and video segments are available. Through the use of prompting screens customers are able to make purchasing decisions by stipulating content which is available from any number of categories of subject matter such as music types. Content can be identified by album, artist or remembered portions of material within the content of the totality of the work.

The selected media for the manufacture and production of digital and analog software may be from a myriad of different selections and can be accomplished on digital media such as CD's, analog technology such as cassette tapes, CD ROM technology, reel-to-reel tapes, game cartridges, video disks of varying sizes, sheet music, floppy disks and can include content which is audio, such as voice or music, video, interactive game program and cartography, just to mention a few.

Since the system is adaptable to having an unlimited number of servers, strategic and economic networking can be accomplished to allocate proportionally the preview material as well as the total content of a specific work at the respective servers depending, in particular, on the popularity and the costs. A master server will be situated geographically so as to be accessible to chained and networked subservers. Its geographic and networked location is dependent upon communication network systems and subsystems costs and availability in order to best serve a customer's premise, whether it be a retail store or similar point-of-sale or other end-user location. The strategy of allocating between the servers, the content for preview and for the final manufacturing process for a particular work, is strategized in order to eliminate the need for any in-store inventory of an artist's composition regardless of format. In essence, every album in every particular label's catalog will be available in any format and the retailer will never have a condition of being out of stock. The retailer will be able to utilize floor space to maximize merchandising and need not feel the burden of inventory drag.

Thusly, merchandising is greatly enhanced through the use of multi-media kiosks or booths individualized to the customer and/or categories of buyers. This makes the selection, preview and purchase more personal to the customer. Not only is the customer able to preview any number of one of a selected categories of music types or whatever the content subject matter may be, including electronic games, software programs, video, audio and images, the customer can be introduced to other albums or works of a particular artist or a particular type of music. With the multi-media kiosk experience, the retailer has an opportunity to further enhance the purchaser's interest in matters which possibly are collateral to the original intent, interest and desire of a customer. Obviously, this is of great advantage to the retailer and can result in additional sales. The gathering and further use of artificial intelligence of the sort which is specific to a buyer or to a category of buyers can maximize the retailer's return through the use of such a system.

Both the retailer and the label companies are and have been specially interested in the ability to protect the myriad of proprietary rights which the artists, the labels and others have through copyright protection and/or licenses. The present inventive system provides for security mechanisms that require centralized database authorizations prior to the transmission of content and/or the manufacture of any of the products. In addition, the system simplifies the financial and accounting aspects and will reduce, if not totally eliminate, pilferage of items within the store at the point of sale.

Further, before a purchase is actually made, numerous communications are made to the potential purchaser ensuring that the purchaser has the properly identified items of interest and is interested in their procurement. These aspects and the further aspects of the preview opportunities greatly reduce and minimize return of purchases by the customer.

The total authorization, accounting and management reporting and marketing research system collects and maintains data useful to the retailer and the label companies. With proper analysis all stations along the merchandising trail can benefit from this information and exploit the economic opportunities available from the analysis of such data.

After review, selection and proper authorization procedures have transpired all of which are done in a short period of time having benefitted from the expedited communication and transfer of digitized information to provide for real time handling of the customer's needs at the point of sale, the manufacturing and production process of the media in the selected format is accomplished. Not only is the manufacturing subsystem capable of generating an exact replica of the master of the selected piece or work, but the manufacturing subsystem is also capable of producing the art work or labels and any included documentation with regard to the purchased item. The digitized information to be replicated will be communicated to the manufacturing subsystem at the customer premise from any one or a number of the data servers, including the master server within the geographical network of servers. As stated before, the specific server from which the information or a portion of the information is to be forthcoming is dependent upon such factors as the popularity of the work, the total length of the work, the cost of transporting the information from the server to the customer premise and other factors which are cost effective and minimize the distance to the customer premise while maintaining the required level of response for real-time transactions.

In the above mentioned way, the present invention provides an effective means for accessing remotely stored information at strategically located server locations adapted to communicate and transmit content information to a customer premise in real time and in such a manner so as to be able to manufacture media incorporating the transmitted information, while maintaining the integrity and providing accountability of the communicated and networked information to provide on-demand and real time customer satisfaction.

BRIEF DESCRIPTION OF THE DRAWINGS

FIG. 29 is a screen illustration of the business analysis tool workstation illustrating the categories for detailed accounting and finance information;

FIG. 30 is an exemplary screen illustration of an accounting for a particular point-of-sale outlet by product format;

FIG. 31 is an exemplary screen illustration of the high volume album selections for a particular time period.

FIG. 32 is an exemplary screen view of an alternative accounting tool illustrating sales activity by album and music category;

FIG. 35 is an exemplary accounting workstation screen chart showing demographic statistics for sales of product types;

FIG. 36 is an exemplary screen presentation of accounting workstation analysis information which is store-hours time dependent;

DESCRIPTION OF THE ILLUSTRATIVE EMBODIMENTS

While the present invention will be described more fully hereinafter with reference to the accompanying drawings, in which illustrative embodiments of the present invention are shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
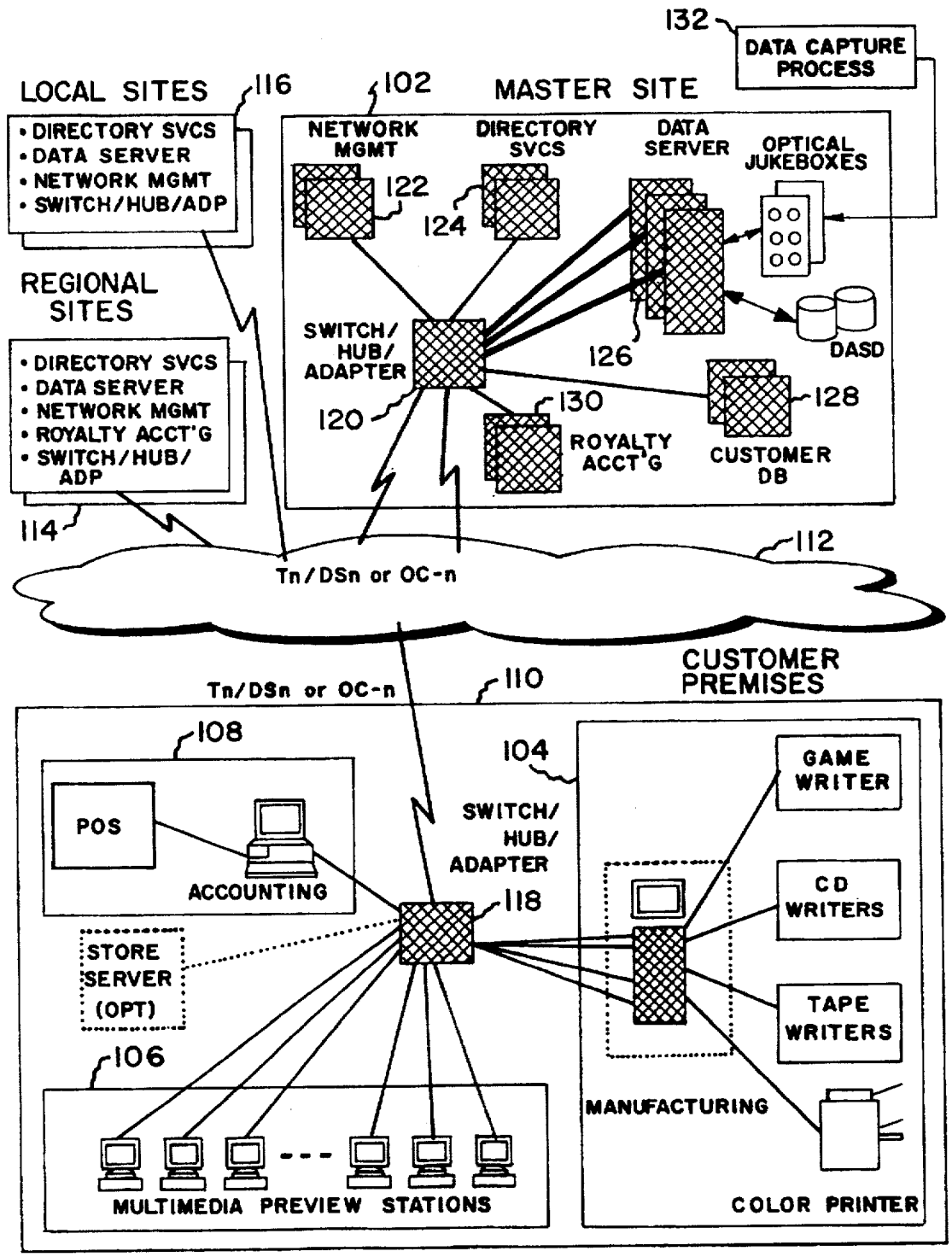
FIG. 1 is a pictorial representation of a system architecture including a master site having communication with a retail store according to the principles of the present invention.

The deficiencies, inadequacies, restrictions, limitations both technically and commercially and the cost prohibitions of the presently available on-demand packaged digital data for playback systems are overcome by the present invention. Presented is a concept where a device for manufacturing media with content data has virtual connection where all message packets arrive and in sequence to a host content data machine at a high speed constant bit rate, providing for data to be streamed from a Master Site 102 to a Manufacturing subsystem 104 as shown in FIG. 1. In the context of the present invention a data stream is a continuous stream of data elements being transmitted, or intended for transmission, in character or binary-digit form. In a preferred embodiment of such a system a data preview station 106 is also provided and high speed data streaming is a desirable feature of the operation for preview. While it is not necessary to have high speed data streaming for the transaction accounting operations of the Master Site 102 and a Accounting Subsystem 108 at, e.g., the retail store 110, that also is preferred.

In a preferred manufacturing system with accountability, high speed data streaming would be from end station to end station. One end station would be for data preview at booths 106. Another end station is the manufacturing device or subsystem 104. Yet another end station is the manager's or the accounting work station 108. While a further end station is the data content host or the Master Site 102.

An important aspect of streaming data between the end stations is for the data to be streamed so that it can be presented so as to reproduce whatever the recorded information is at the proper reproduction rate so that the individual using it or looking at it or listening to it can not distinguish whether or not the recorded version is being played back from a local media, such as a video tape or compact disc, or if the individual is witnessing it being played back remotely and transmitted through a network. The bits of information have to be delivered to the preview or manufacturing device at a rate required by that device to recreate faithful reproduction of the original recording.

A communications cloud, such as cloud 112 in FIG. 1 generically represents a network where included state-of-the art topology provides for routing and transporting of data. In general, the interface into the cloud is specified by the myriad of different network topologies. So regardless of the specific topology or type of a backbone or switching techniques within the cloud, the data gets transported from one point to another point over a wide geographical area.

The Tn designations of FIG. 1, or T Carrier transmission systems are represented by DSn or Digital Signal levels which make up the standard digital transmission hierarchy developed by Bell Labs. DS0 represents a single digital voice channel at 64 Kilobits per second. T 1 represents 24 DS0 channels in the US., and in Europe the designation is E 1 representing 30 DS0 channels. The different worldwide digital hierarchy's are referenced in their applicable standards body's such as Bellcore Technical References, International Telecommunications Union (CCITT) and International Organization for Standardization. The OC-N designation represents the Sonet Optical Carrier Speed Hierarchy where OC-3 is equivalent to 84 T 1 or 2016 DS0 voice channels. The text *Data Network Design* authored by Darren L. Spohn copyrighted 1993 by publisher McGraw-Hill, Inc. presents design information relied upon in the development of the present invention.

In the illustration of FIG. 1, coming into the customer premise site or Retail Store 110, as for example, either a T1 or DS1, which is 1.5 megabits or a T3 or DS3 level which is 44 megabits per second or an asynchronous transfer mode (ATM) which would be carried over in OC-3 optical fiber which provides 155 megabit fiber connection or a combination is employed. ATM is a cell relay type of protocol which is being widely developed throughout the telephony industry. At the other side of the exemplary cloud 112 where a serving site exists and, in the illustration of FIG. 1, Master Site 102, there is a exemplary connect to T3, DS3 which follows with ATM running over either OC-3 fiber at 155 megabit or even up to QC-12 which is 622 megabits.

At the top level server site, the actual bandwidth or bit rate required would be dependent on the number of, and the size and the quantity of the data that is served from that site. Multiple T3s or multiple OC-3s or OC-12s are connected and multiplexed out to the different devices in the Master Site 102. This is also the practice for any of the server sites, such as Regional Site 114 and Local Site 116, as well as the top level sites or Master Site 102.

Figure 8:
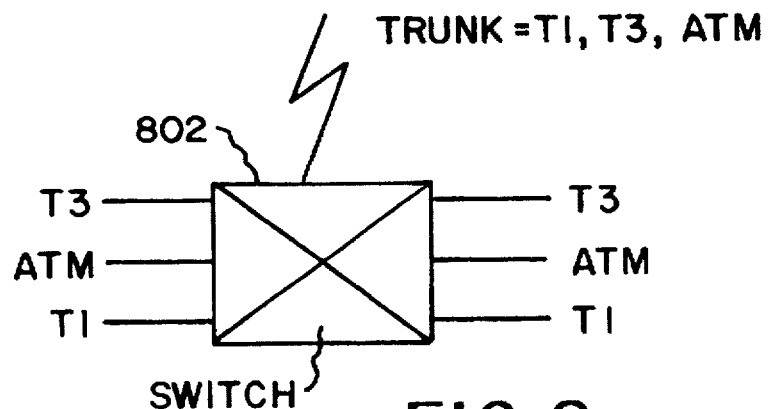
FIG. 8 is an exemplary switch for connecting different communication service consumers.
Figure 9:
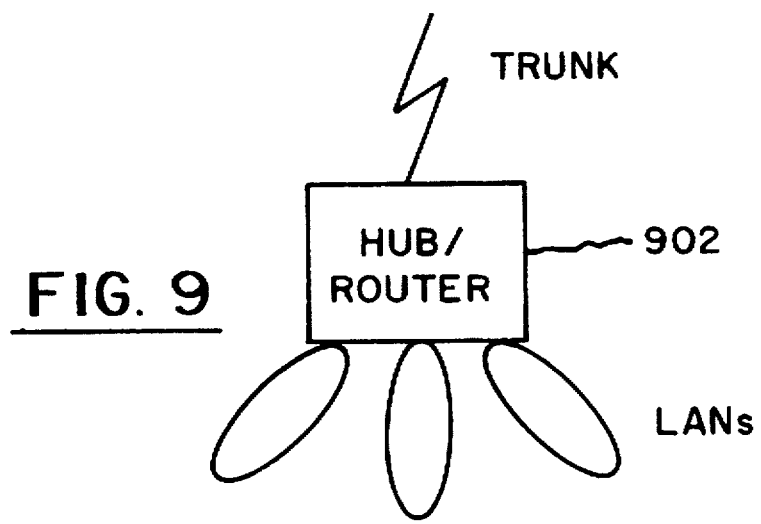
FIG. 9 is an exemplary hub or router for connecting different communication service consumers.
Figure 10:
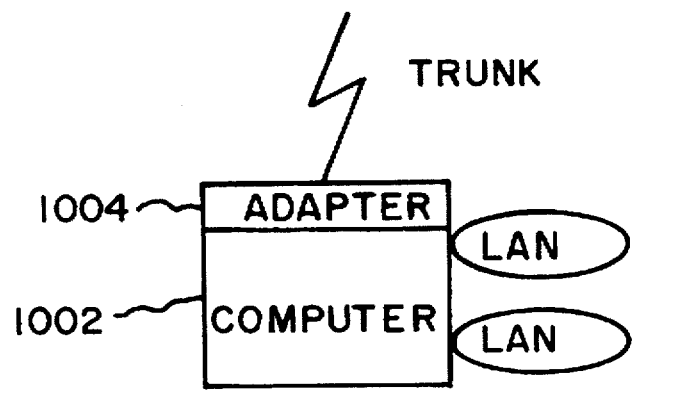
FIG. 10 is an alternative communication connecting system including an adapter and a computer for connecting different communication service consumers.

FIGS. 8, 9, 10 illustrated three approaches to multiplex and demultiplex the aggregate bandwidth required by the various terminals and devices contained within the customer premises to a single high speed trunk entering the network. This approach is also applied at the server sites to aggregate bandwidth entering the network. Another important function of the switches 118 or 120 in FIG. 1, and in FIGS. 8, 9, 10, is to multiplex or aggregate multiple trunks from the network provider to the customer premise or server site.

The ATM communication technique presents a standard 53 octet or 53 byte cell which has included within it a header comprising the virtual path identifier, the generic flow control, the virtual channel identifier, reserve bits to be determined, a payload type, a call lost priority and a header error control field. A cell includes the header of 5 bytes and a 48 byte data content payload. It is possible to provide in one of these cells of 53 bytes, voice, video and imaging data. This cell would move at a constant bit rate speed from end station to end station and when, for example, it reached the manufacturing device the header information is discarded and the data portion of the packet is copied to the media. This media, as for example, can be CD or magnetic media for reproduction and manufacturing at this station.

Each of these cells is assigned a path by the communications network dependent upon the network traffic and load. In the communications industry this is known as fast packet switching. It provides an expeditious way to move a large volume of data.

The feature of ATM which provides for all packets or cells being of the same length presents a condition where small messages which are time dependent do not get held up by large messages which are not time dependent and can be delayed without degradation of the message's value. This is because all messages are comprised of the same 53 octet length. As hereinbefore mentioned the user has the advantage of different levels of service depending on the user's requirements for streaming the applications data. The header on each of the 53 byte uniform length cells provides routing information for each of the cells in the network. In a shared network environment, such as is present in much of today's communication networks there is uncertainty and variability. The ATM process provides for standardization in the actual transport method or transmission method through the use of fixed sized cells, plus priority routing of time critical data as specified in the cell header.

A further feature of the present invention is made evident by FIG. 1, where at the master site 102, the concept of separating the different logical functions that are a part of the serving site into different or separate types of machines is presented. The idea of separating the functions allows for the scaling of different sizes of serving machines, and the specializing of the hardware configurations and even the software configuration so that they are able to perform the identified specialized functions. The machines include the network management unit 122, the directory services unit 124, the data server unit 126, the customer data base unit 128, incorporating information individualized to the customer's purchasing habits and interests and the royalty accounting unit 130. The network management unit 122 checks the status of the operation of communication links with the customer premise 110 and units within the customer premise 110. The directory for services 124 provides address functions for appropriate routing of messages requesting, for example, content data at the data server 126 or customer data in the customer database 128.

An example, illustrating the separation of function issue, is applicable to the royalty accounting unit 130 where if there is a suitable application available, for example, on an IBM AS/400 system that does credit card transactions or accounting transactions, it is desirable to adopt that kind of a machine and based on it's other characteristics, e.g., security, adapt it for use in the banking industry for use as a machine to track the royalty transactions that would flow in from the various customer premises. Similarly, a separate machine with specialized software can accomplish the network management of unit 122 at the serving site.

In addition, the data server 126 or servers can be specialized in machine type, as to the amount of storage etc. that they manage according to the type of content. So, a system can include one type of machine that is well suited to serve video data, and a second type of data serving machine that might be more suitable for such data as electronic game content data or audio data. Therefore at the different serving sites, the different functions are separated to run on separate machines, interconnecting them through switches or hubs or a suitable type of interconnecting arrangement at the serving site, and then manage the message protocols to route the appropriate message traffic coming in from the cloud 112 to the appropriate functional processing machine.

Also in FIG. 1 in the description, the local site 116 and regional site 114 are not pictorially displayed like the master site 102. The bulleted list identifies some of the subset of the functions that are in the discussion breakdown of the master site 102. Certain of these functions, for example, those of customer data base unit 128, might not be of sufficiently high enough volume or traffic to justify replicating the customer data base machine 128 at all the different serving sites. So, by functionally separating the types of functions that are being served out of the sites, they can be distributed differently throughout the serving hierarchy. Therefore at some number of the serving sites or maybe only at certain levels of the serving hierarchy, some of these functions are present while at other levels they are not.

Figure 3:
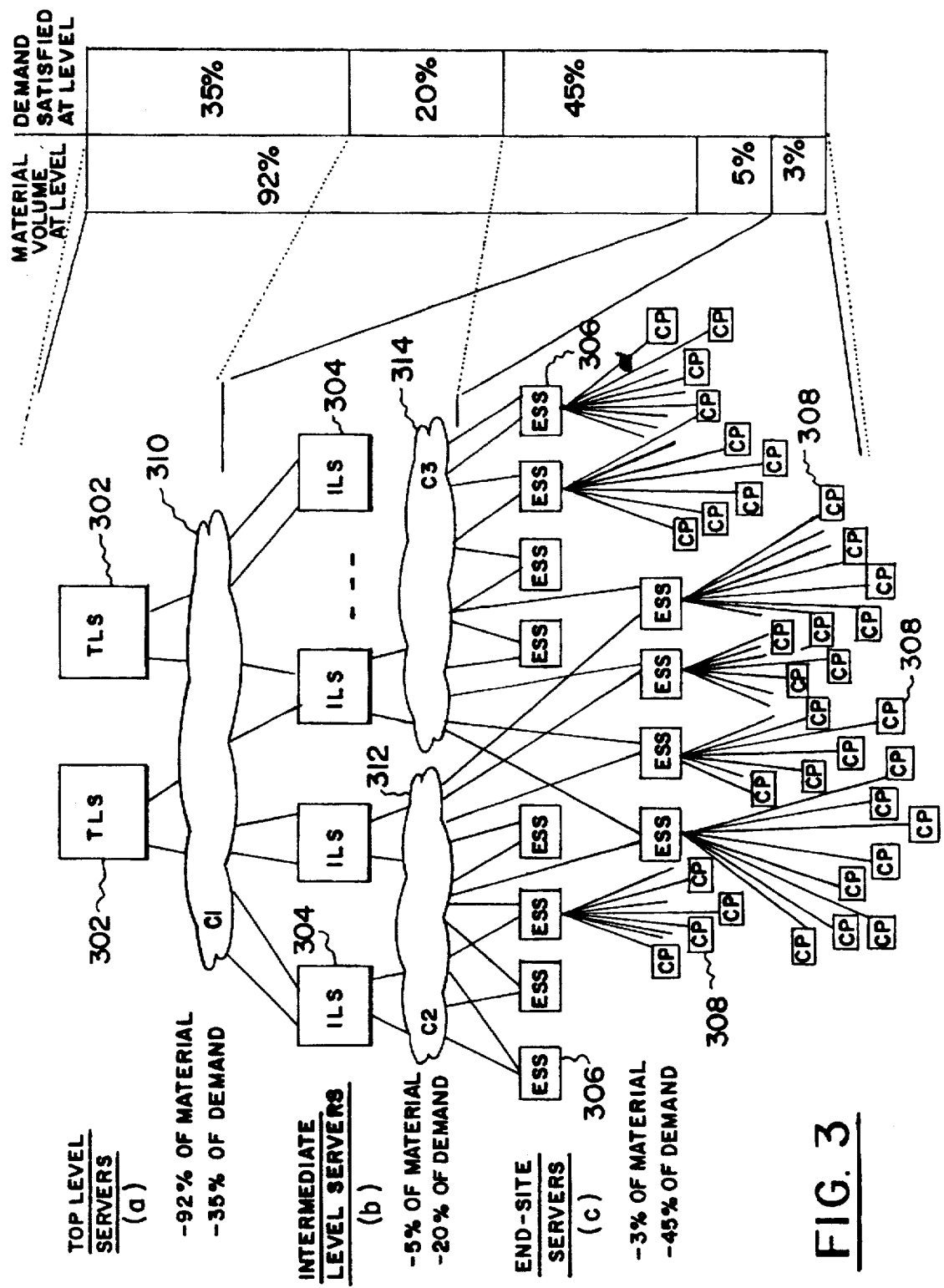
FIG. 3 is an exemplary remote serving topology of a hierarchical arrangement of the servers with allocated content represented graphically opposite the corresponding hierarchical layer of the servers.

The lowest level of the data servers or ESS servers 306 in FIG. 3 are most important in terms of the high volume transactions, and replication of those is done in a more generous manner. By separating the different serving functions the opportunity is provided to choose the appropriate configuration for each machine and use the communication switch interconnections to route the data traffic to the appropriate machine or function.

Figure 2:
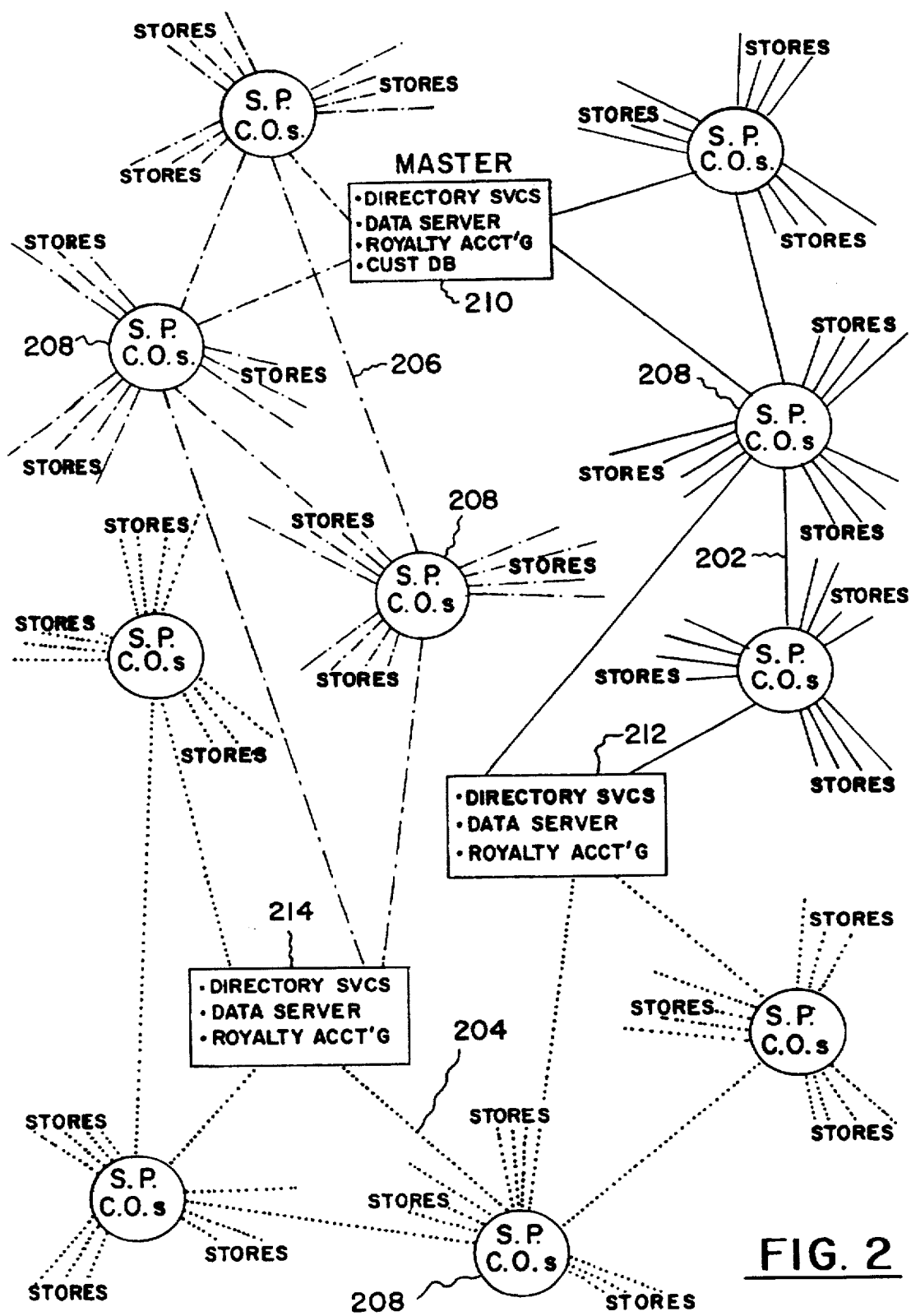
FIG. 2 is a high-level communication network structure, exemplary of a communications system for implementing the system and method of the present invention.

FIG. 2 is an example of how the exemplary cloud 112 of FIG. 1 might physically connect three different serving sites together. In FIG. 2 there are three different service providers i.e., solid lines 202, dashed lines 204 and dotted and dashed lines 206 carriers or telephone operating companies shown by the different types of connecting lines. In FIG. 2 there are central offices (COs) 208, where the customer premises (or the stores); are connected. Then there are trunk connections going from central offices 208 to other central offices 208 which connect to the different server sites, i.e., Master Site 210, and Regional Site 212 and Regional Site 214. Each of the server sites 210 and 212 has more than one set of trunks going to different service provider central offices (COs). In the serving sites 210, 212 or 214, the included switches are used to terminate the different trunks coming from the different central offices. On the back side of the switch is where the serving machines are connected. The switching function at the server site allows the data traffic routing between the various clouds.

In FIG. 2 there is represented three different sets of service providers 202, 204 and 206 that provide cloud function for interconnecting not only server sites, but also the retail stores.

Using ATM as the interconnect with the data server, gives the physical appearance of having the entire data content on every one of the local servers. It is still desirable to replicate some portion of that storage in each of the local servers for transaction and frequency of requestors demand reasons, but transparently, by communications through ATM, them is the appearance of having 100% of the data content of every catalog listing or item at the serving site. The number of the replication sites can be regulated or reduced depending upon how widespread the presence of ATM is.

The only reason to replicate the databank is to be able to spread the high demand and bandwidth amongst all the various sites. This practice is set forth in FIG. 2. Primary servers can function as backup servers. Such, as for example, is possible with regard to server 212 providing backup for server 214 when serving the central office 208 connected between them and illustrated in FIG. 2 as the bottom and centrally most disposed central office. The backup strategy provides for efficiency and also makes it easier to recover in the onset of breakdowns or disasters.

Being able to give the appearance of having 100% of the data content locally, camouflages having servers physically disbursed throughout a geographic area regardless of size. It is evident that through implementation of this inventive concept, directory service control function can control all the different Customer Premise sites to decide from where to access and obtain the content data. This control structure still relies on having all the data server sites connected by an ATM backbone to accomplish the necessary network.

FIG. 3 illustrates the communication network layout with emphasis on (a) a multiple-level structure of data servers providing improved reliability and availability of data, (b) redundant connections among the servers and their clients through multiple communication paths, and (c) distribution of on-line data according to demand and on-line storage and transmission costs.

In this FIG. 3 there are several repositories each of which typically contains a portion of the totality of the content material available. Each exemplary level in this structure is comprised of server class machines which are large configuration systems with large amounts of on-line DASD storage plus extensive communications capability. In the FIG. 3 example, the top most server level can contain 100% of the data which is available. The top level servers sometimes called master servers or golden masters are usually provided with 100% of the content data at very little additional cost above the 90 some percentage they would otherwise store as a result of allocation strategies where the content data allocated to servers at the various levels is based upon the frequency of content data use and is a function of the popularity of segments of the content data and is a result of data studies from consumer demand curves. A very high percentage also provides for redundancy and back up if service to a server should fail. Set forth for discussion purposes only, are arbitrary percentages of data divided between the multiple levels of servers. In practice the percentages are variable and are, for example, a function of such things as consumer demographics and time of year, just to mention a couple.

The servers at this level (a), are the Top Level Servers (TLS) 302. There are several of these servers, geographically placed according to several factors. The factors include: communication line availability and communication line cost, aggregate demand from the next lower level, and other considerations such as geographic and safety/security of the data. These servers 302 have a very high percentage of the content data, sometimes 100%, but in the case of FIG. 3 it is 92% which satisfies the least demand or approximately 35% of the content data requests.

Below the Top Level Servers 302 in this structure at level (b) is a collection of servers 304 which contain a considerably lesser portion of the total data (typically around 5%). Yet, this level server 304 satisfies up to the next 20% of the demand on average, due to the popularity of the content data stored at the (b) level. These servers are the Intermediate Level Servers (ILS) 304.

Finally, in the example of FIG. 3 there is a set of servers 306 at a level (c) which support the customer premises directly. In the structure, these servers 306 satisfy the largest percent of the requests for the most frequently selected content data. These servers are the End-Site Servers (ESS) 306. As compared to the TLS and ILS, the ESS servers hold the minimal amount of the content material available, which is typically around 3%. However, as can be seen from FIG. 3, these servers 306 satisfy the bulk of the customer's requests for content data, which is about 45%.

The cost analysis is driven by an effort to achieve replicating a small percentages of physical storage at the lower levels of the structure, so that a considerable amount of the transaction demand is satisfied while spreading out the balance among different server sites and machines. The demand requests for the data must be collected and an analysis made of the transaction patterns. The study results are used to minimize the data replication and maximize (i.e., reduce) the response time of the transaction, and distribute the data for storage among large numbers of servers and sites without experiencing excessive costs to replicate these amounts of storage which are widely distributed.

For a typical request, when a data file and its content is needed and the service of a higher level server is required a request is sent from the Customer Premise (CP) 308, to the ESS 306 which is its preferred route. The communications network may determine that the requested ESS 306 is available directly (i.e., in a single path) or it may select an alternate path for this conversation. An alternate path could be selected through any path with sufficient level of service, particularly with regard to bandwidth. In this example, alternate paths could be found through any of the communication clouds 310, 312, or 314. Alternatively, when the message arrives at the selected ESS 306, the data server on that site could determine that (i) it does not have the data requested and so it could re-route the request to an ILS 304 itself or (ii) that it has too many transactions in process, and routes the request to another ESS 306 which could for example be in another geographical time zone.

Figure 4:
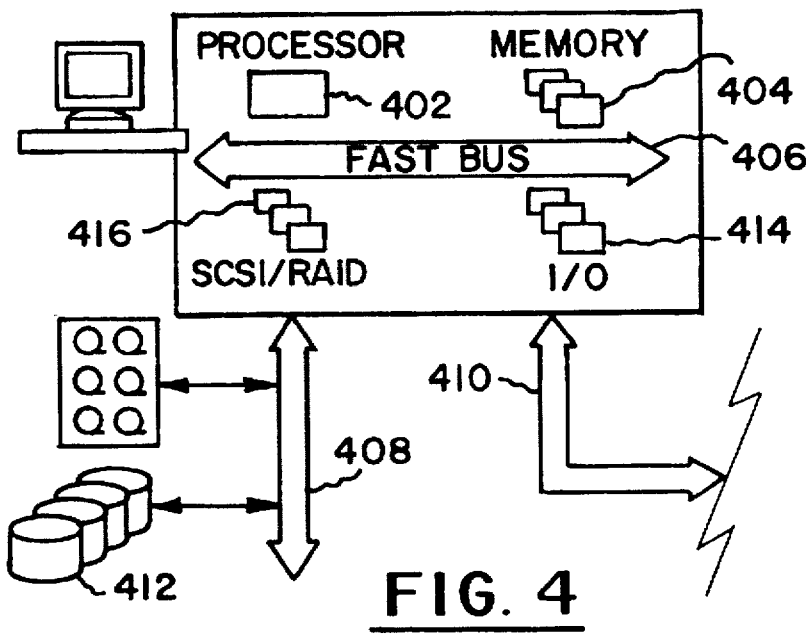
FIG. 4 is an exemplary regional data server illustrating a uniprocessor architecture.

FIG. 4 is an exemplary uniprocessor system data server just like a standard personal computer IBM PS/2 Model 95 with a single processor 402 connected through a fast bus 406 to some amount of memory 404, a redundant array of independent disks (RAID) 416, SCSI buss 406 to hang storage units 412 on and connecting line 410, then some sort of I/O 414 which represents things like communications adapters.

Figure 5:
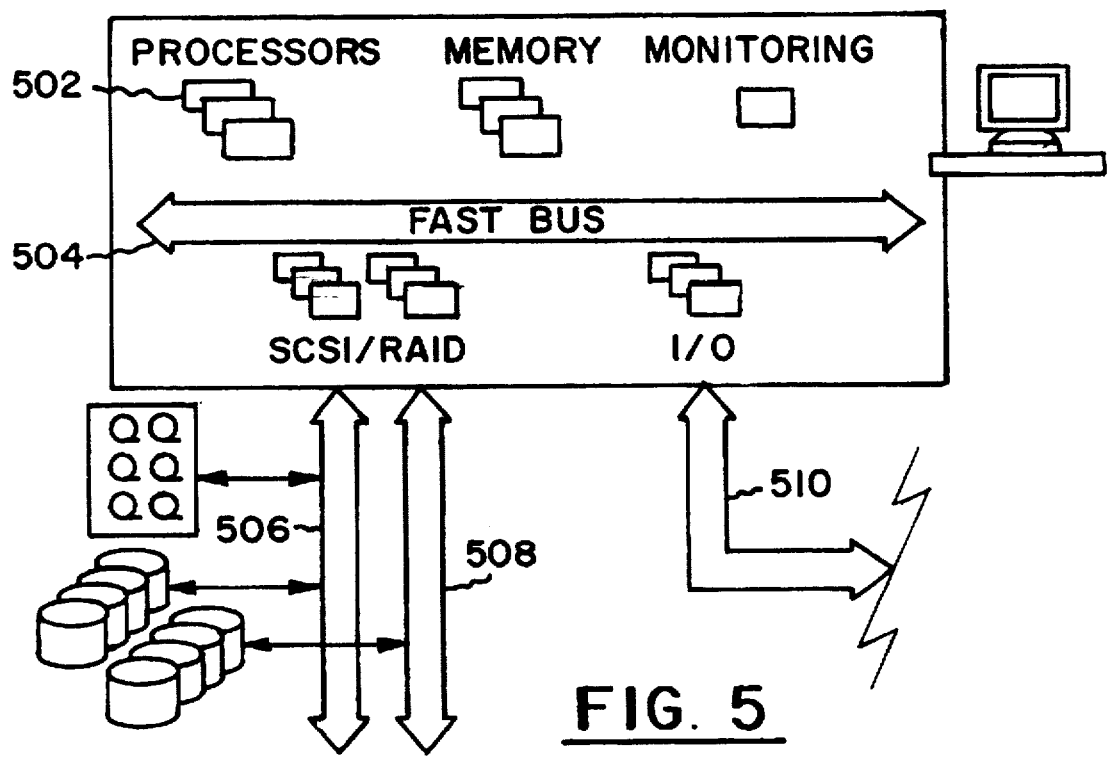
FIG. 5 is an alternative exemplary data server illustrating a multiprocessor architecture.

FIG. 5 illustrates a multi-processor data server system where there is more than one processor 502 sitting on a single fast bus 504 or interprocessor memory bus of some sort with multiple I/O buses 506, 508 and 510 hanging off of the system. There are several different types of machines that represent this kind of structure ranging from the IBM 3090 types of mainframes to systems like Tricord, Sequent and Pyramid Models. There are many kinds of multiprocessor shared memory types of machines.

Figure 6:
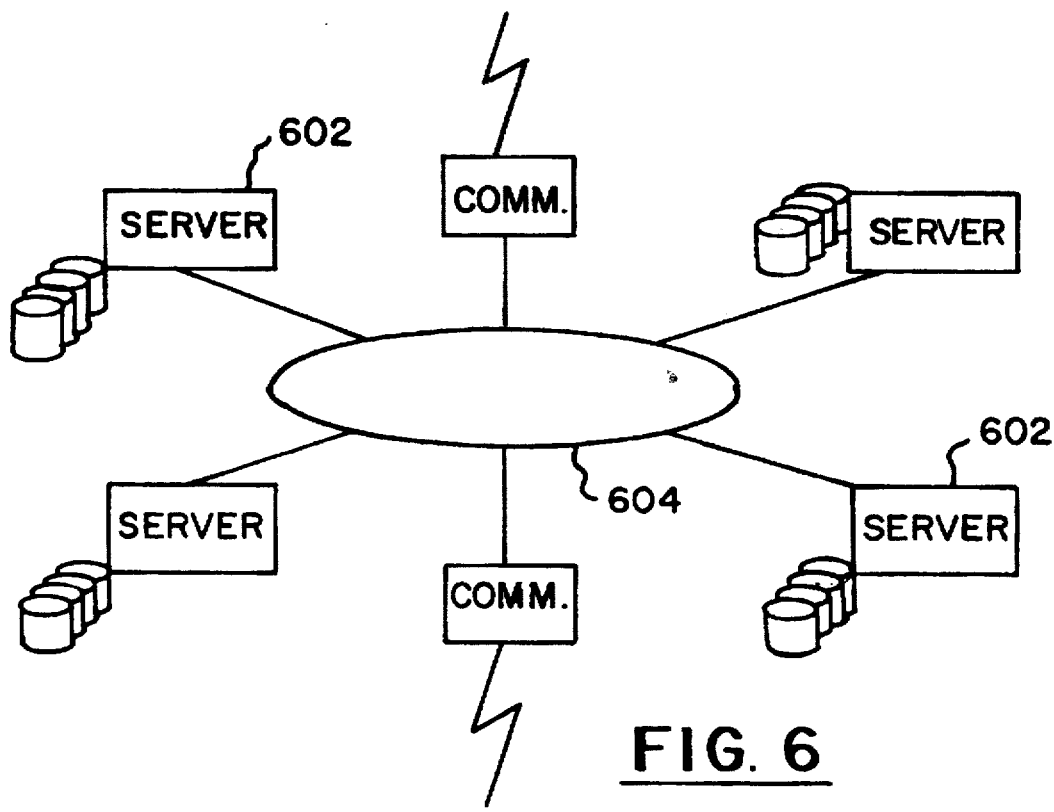
FIG. 6 is an exemplary server architecture illustrating communication interconnecting through a ring or bus cluster.
Figure 7:
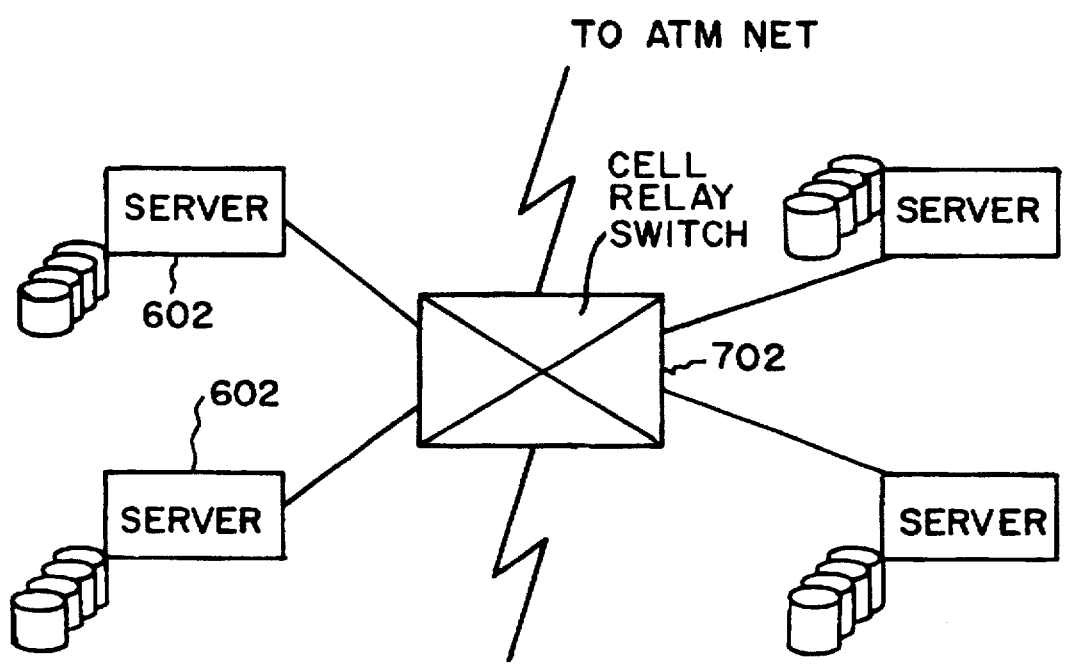
FIG. 7 is an alternative server architecture illustrating communication interconnecting through a switch cluster arrangement.

FIGS. 6 and 7 illustrate multiple processing elements or servers 602, such as those illustrated in FIGS. 4 and 5 that are interconnected with different possible high-speed interconnects. The first example of interconnects, as set forth in FIG. 6, is LAN technology interconnecting various processing elements with their own private memories and I/O devices or servers 602. This is also illustrative of a fiber channel standard or a proprietary interconnect schemes as shown by way of the oval interconnect 604.

FIG. 7 is another distribution topology showing that using an ATM or other high speed switch 702 as an interconnect method between those different types of processing elements or servers 602. In shared memory multiprocessors, blocking effects and interference, from trying to access the same memory, are experienced. Bottlenecks on the bus or in the memory are the more adverse conditions which can arise and are adverse to the speed of the processors and the I/O devices. However, shared memory does simplify some of the software structures. Since all the data is accessible from the various and different processing elements in the distributed function structures, there is less interference, because there is more message-based systems which allows them to run asynchronously. But under such circumstances, latency or the time interval in terms of requesting the data for transfer and getting it transferred across whatever the interconnect scheme is, is of prime concern. The physical topology is important but it usually results in the need for software which is more complex. There is a need to acquire the right message constructs with low latency, so that the form of throughput is acceptable. The other benefit is that structures of the type in FIGS. 6 and 7 tend to scale up from small configurations to the large and super large configurations with less difficulty than the shared memory configurations. In shared memory sooner or later bus limitations or looking interferences are presented which are difficult to overcome. So the preference is a methodology that permits scale-up without undue complexity or waste.

Another flexibility with such structures is the ability to specialize the different types of processors, so that a special assist for doing communications and a special assist for doing the data storage retrieval can be created. Also specializing the different processing elements can be done, as opposed to using a single homogenous type of processing element which is what is typically done in the shared memory multiprocessor. For the loosely coupled structure of FIG. 7, each of these elements can also be a tightly coupled shared memory processing element itself.

FIGS. 8, 9 and 10 relate to switching, routing and other adapter and computer techniques with respect to the service providers as herein before presented regarding FIGS. 1 and 2. These switching techniques provide the means for gathering the incoming and outgoing messages. The incoming messages are included within a trunk, which is a high speed aggregated collection of bandwidth. The speed is higher than the consuming side of the system and its total bandwidth is for all the end terminals that are in the store or customer premise. The outgoing messages are essentially the reverse process and which exit into the network in a cloud such as cloud 112 of FIG. 1.

The trunk in the case of FIG. 8 ranges in speed from a T1 to a T3, or an ATM and operates over fiber type of physical connectivity. If the switch 802 is the connection media, then messages are switched from the trunk to any one of several other communication ports. The advantage of a switch is that typically the switch 802 is designed for a large aggregate amount of bandwidth which allows a large number of simultaneous connections to occur, including on up to the bandwidth limit. A less expensive alternative to FIG. 8 is the configuration of FIG. 10 which shows a computer 1002 acting as a switching mechanism or a gateway where the trunk is coming in through a trunk adapter 1004 plugged in on the computer bus. In this example, it could be either a T1 adapter, a T3 adapter or an OC-3 fiber adapter plugged in on the computer bus with other adapter cards plugged into the computer bus, that, for example, could be LAN types of adapters. The computer 1002, with its software and hardware perform a multiplexing, a routing, or a gateway type function from the LAN conversations to the trunk adapter.

FIG. 9, is an example of specialized hardware built to represent the same kind of functionality. There are several manufacturers providing products identified as either hubs or routers that perform similar functions, where there is one type of physical connectivity that is routed or bridged to LANs.

All three of these figures, FIGS. 8, 9 and 10, represent the exemplary arrangement of an incoming high speed trunk 118 in FIG. 1 into the customer premise. The switching function occurs whether at an actual switch or hub router or even a computer acting as a router, to take the traffic coming in from the outside network and then switch it to the appropriate data consumer and or terminals, inside of the customer premise.

Typical switches are made out of what is referred to as switching fabric and typically are of a cross point switching mechanism. The actual physical medium for the higher speed, transmission may, be on copper or on fiber. Although there are other types of fabric that are used to perform switching functions, they usually provide some sort of a simultaneous connection between an incoming port and an outgoing port. Crosspoint switches are a space division form of multiplexing technique. Either the hub router or the computer gateway/router technique, are typically time division type of multiplexing mechanisms.

In the case of FIG. 10, the computer could be a personal computer, a workstation, or almost any computer that has the normal input/output bus concept with I/O adapters plugged into it. In such a case the time division multiplexing aspect of the computer bus to switch data from one adapter to another is employed. The hub and the router are specially packaged versions of the computer of FIG. 10. Alternatively, they can include a switching fabric, i.e., a space division type of fabric. There are three types of multiplexing, i.e., frequency division, space division or time division.

Figure 11:
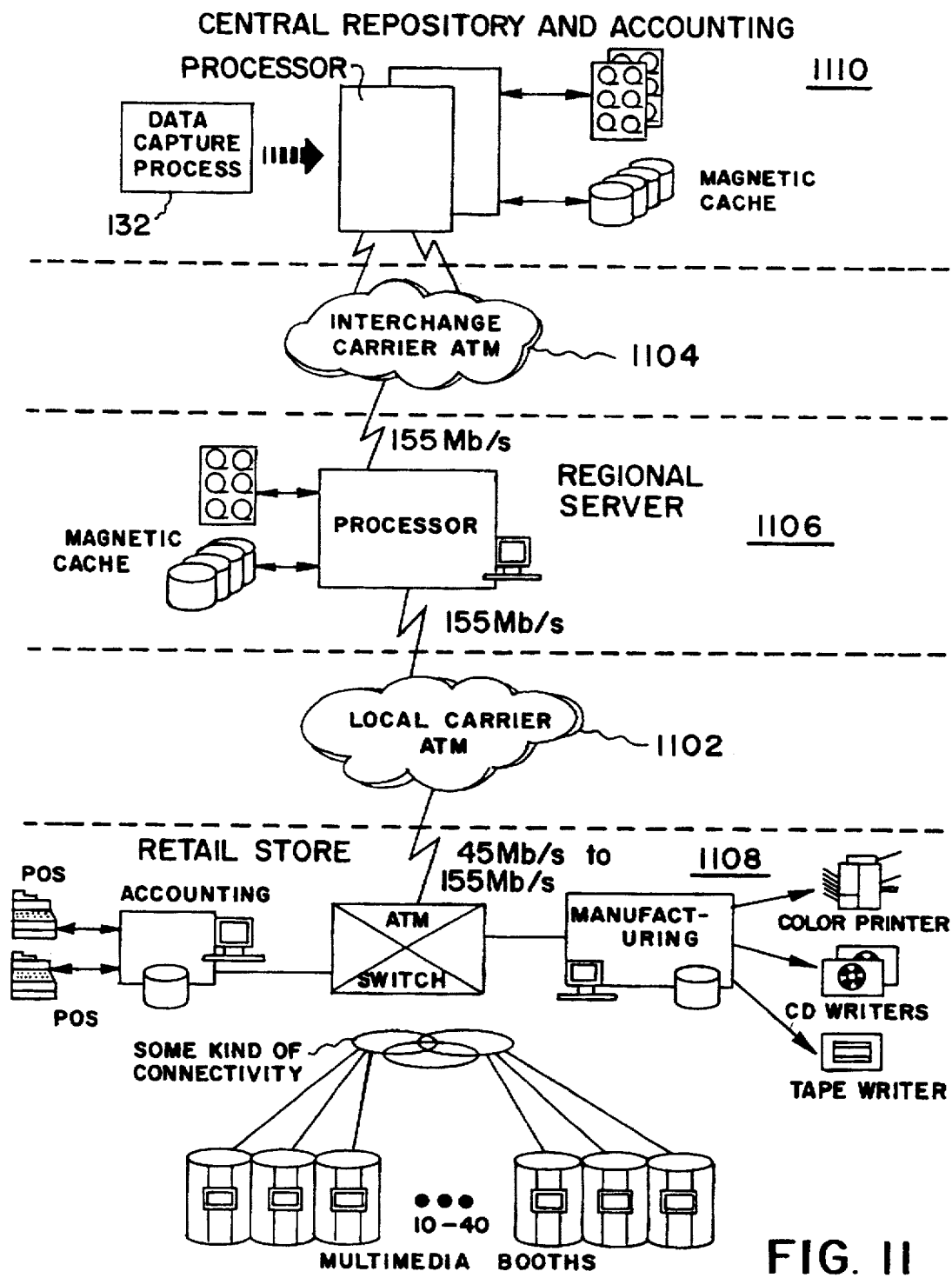
FIG. 11 is a exemplary block diagram of an on-demand system with illustrative switching devices for networking between regional and central servers, according to the principles of the present invention.

One of the distinctions of FIG. 11 is the cloud 1102 between the regional server site 1106 and the retail store site 1108. The service provider can be any from the group including a local phone company, operating company, an interexchange carrier, or a bypass company. Examples of the communication media in clouds 1102 and 1104 are copper wire, under sea cables, fiber, microwaves and satellite links.

Typically the T carriers or the DS, digital signal hierarchies are carried over microwaves, as well as satellites. Presently some satellite companies are exploring how to transport the higher speed carriers like the OC-3 types of speeds across their carriers so that ATM can flow at higher speeds than 44 megabits per second.

Figure 12:
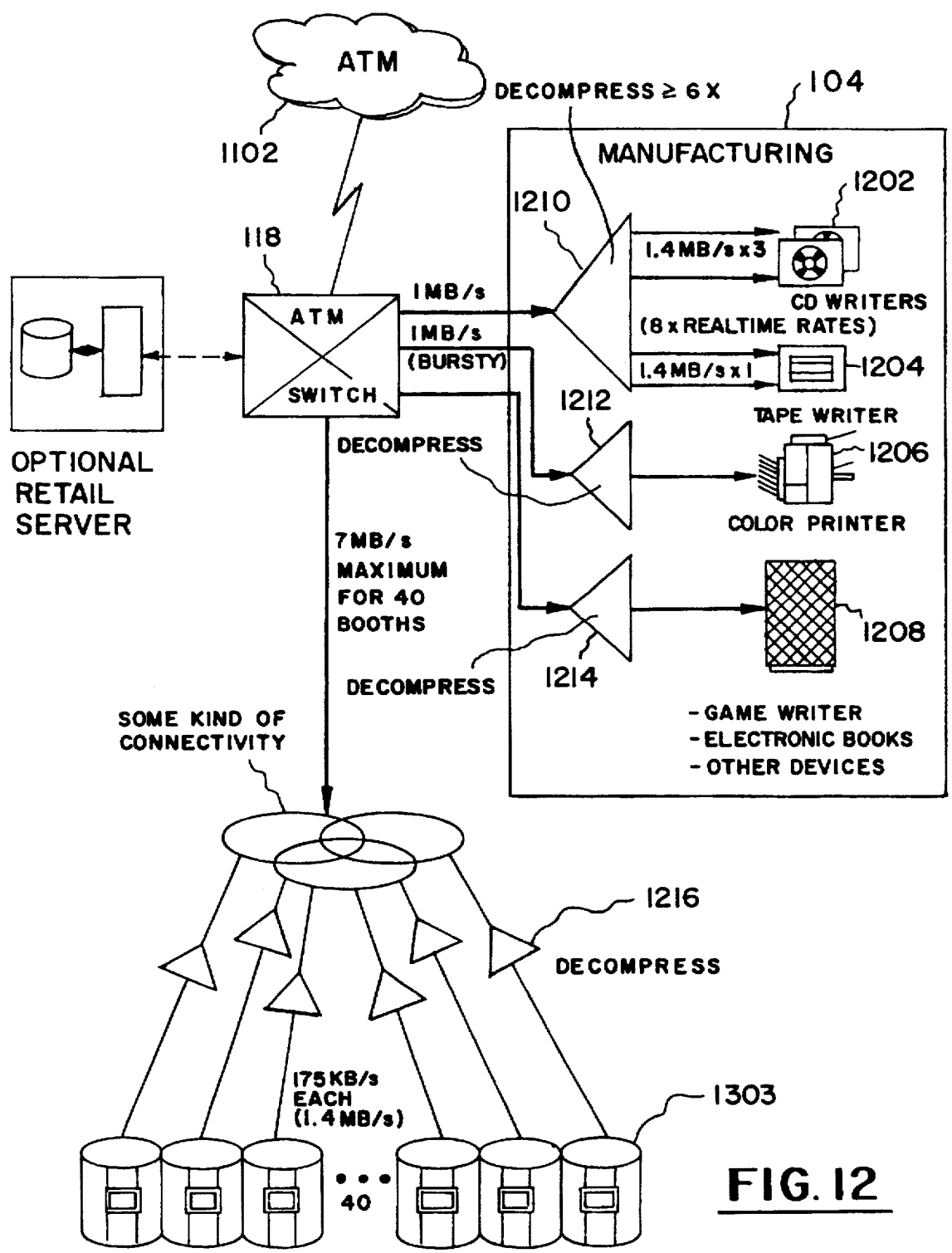
FIG. 12 is an exemplary partial block diagram of a retail store system with expanded illustration of the manufacturing subsystem.

FIG. 12 details the manufacturing and decompression aspects of the real-time transfer of data to the manufacturing subsystem 104 from the repository. Here the aggregate data coming in from the cloud 1102 could be ATM at 155 megabits per second, but the data going out to each one of the manufacturing machines 1202, 1204, 1206 and 1208 depends on their individual requirements. In this specific unit 118, i.e., an ATM switch, it could in fact, be the PC that is used to de-multiplex the data and route it to each one of the manufacturing machines at their different rates. Data comes in at real-time and is transmitted at whatever the requirement is for each of the machines 1202, 1204, 1206 and 1208, respectively. This is accomplished whether it is at 1.4 megabytes per second or 1.2 megabytes or if it was 700 KB per second. The printer 1206 has a lesser need for real-time data flow and the data transmission can be at a specific data signalling rate.

In the preferred embodiment on-demand content data system there are a multitude of different data rate values for the various different medias, techniques, compression algorithms of units 1210, 1212, 1214 and 1216 and reproduction machines. They are variable, and dependent on the streaming requirements of the reproduction machine, a function of whether it is audio, or video and audio, or if it is video compression by compression technique.

The preview station has a different required data flow rate then the CD writer. A CD water, for example, can write six times normal playback speed. A high speed data rate of 1.1 megabytes per second is necessary for a six times CD writer, 1.4 megabytes for an eight times tape writer and 7 megabytes for 40 preview booths playing 1.4 Mbit per second MPEG compressed video or CD quality audio.

It is desirable to encrypt certain content data to maintain a higher level of security for proprietary information and communication channels and communication switching techniques which are readily accessible to unauthorized or unintended interception. According data may be encrypted for example at Data Capture unite 132. Data is encrypted at unit 132 with a random pattern of characters known as an encryption key. Each cryptographic key is protected and is stored in royalty accounting unit 130. Decryption of the encoded data is accomplished at the units 1210, 1212 and 1214 where the decryption and decompression steps are performed in a manner consistent with the processes of encryption and compression at the time of data capture. Units 1210, 1212 and 1214 also provide the capability of buffering to accomplish streaming to the CD writer 1202, tapewriter 1204, color printer 1206 and alternate unit 1208.

A preview station 1303 of FIG. 12 has a need for video considerations. In some cases it will have MPEG video compressed and alternatively RTV or PLV compressed DVI or any of the various compression formats supported by software only motion video playback. For effective streaming, the conditions must exist for continuous transmission once commenced, until completion of the data segment, which is usually the end of the recording or data stream. This continuous transmission must be guaranteed not to fall below the speed required by the playback device to sustain continuous full motion video.

The communications asynchronous transfer mode (ATM) with its switching technique provides advantages over broadband communications, and it's incorporation within the present invention presents opportunities for handling all types of traffic and is protocol insensitive because of the bandwidth and the high speed bit rate. It is particularly suitable for voice, video, image and data transmission as identified in the present invention.

Figure 13:
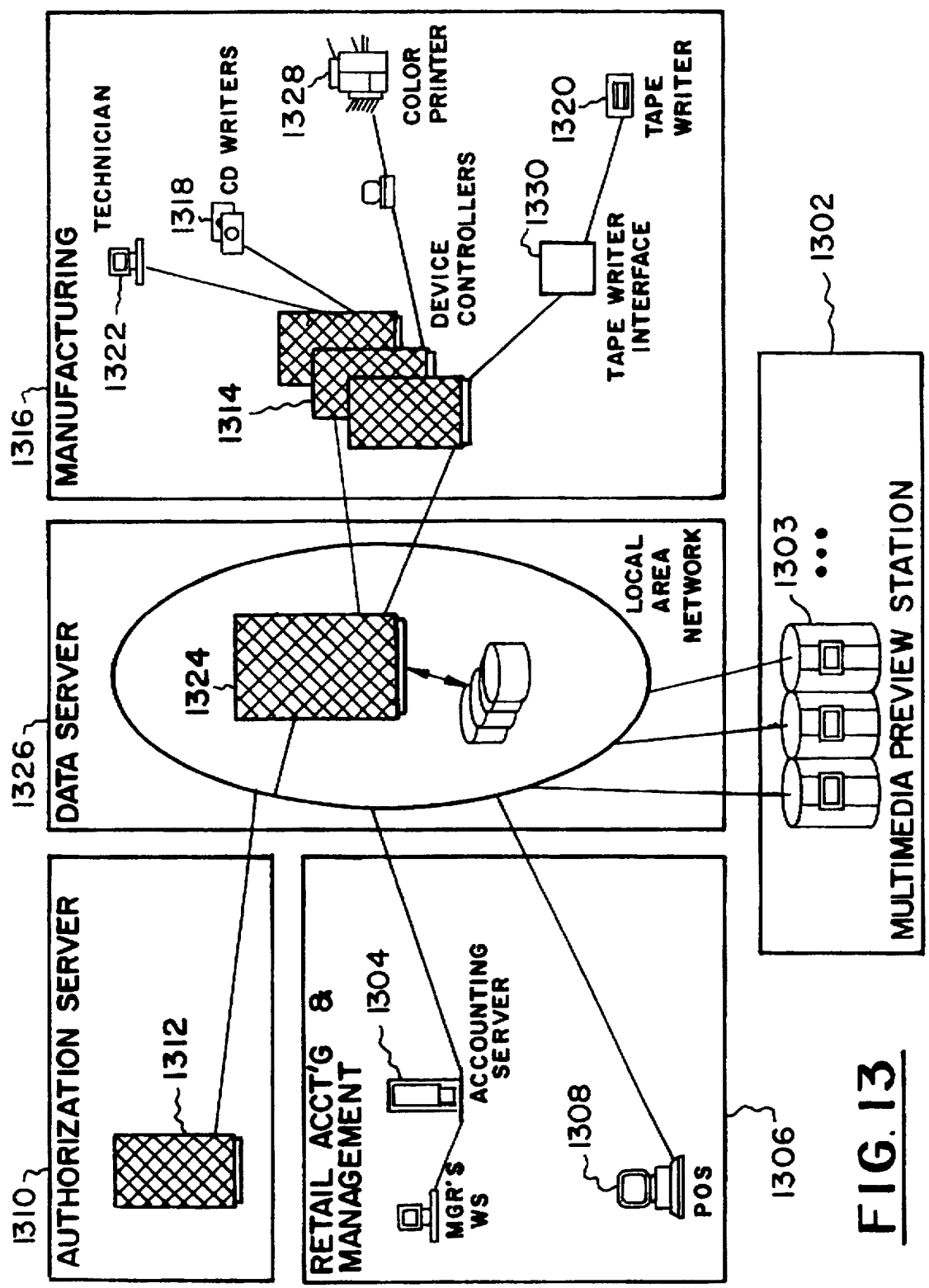
FIG. 13 is an exemplary block diagram of a retail store system according the principles of the present invention with the data server and other subsystems within a local area network (LAN)

Although the operational aspects of the innovative on-demand digital information system has been discussed in part with regard to FIGS. 1–12 and the corresponding communication and network features of the present invention. FIG. 13 and its description presents a total overview of a typical preview, order, authorization, manufacture and purchase process for the average customer. The total process has been divided into component substeps identified as the Order Process (OP), the Authorization Process (AP), the Manufacturing Process (MP) and the Purchase Process (PP). The integral and alternate steps of each of the OP, AP, MP and PP processes are identified by general steps which are sequentially numbered with the lead letters a, b, c and d, respectively. These sequenced steps identify the logic flow of a typical order from the initial browsing through to the purchase.

Certain terms, as defined below, will aid in the understanding of the logic and flow of the order and its subsequent handling as hereafter described for FIG. 13. The definitions include Transactional Terms, Database Tables and Process Messages.

Transactional Terms:

Accounting Server—a set of computer programs which can and typically do serve as the central point of control within a store. These programs provide the central data base for all orders originating in a store, perform all financial accounting (related to orders placed through this system) for a store, and perform all authorization interchanges with the Authorization Server.

Authorization Server—a set of computer programs which makes decisions, authorizing or denying approval to manufacture a product.

These programs maintain several databases such as:

a database of products available;

a database of royalties owed to the company, such as a label company, owning a product; and a database providing criteria for determining if a given retail outlet is authorized to sell a given product.

These programs provide a decision making process for several stores. These programs typically execute at a site that is separate from a retail store.

Customer Premise—that location from which a customer can interact with the on-demand system, including, but not limited to, such interactions, like previewing, ordering, product pick-up and maintaining transactional records.

Device Controller—a set of computer programs which control the manufacturing process. This server is located in a retail store.

Item—a manufactured product or work, suitable for purchase. As an example, it is that which a customer might procure in a traditional purchase. It includes primarily the media on which the information is recorded plus secondary materials such as a case, labels, pamphlets, case liner, etc. In an exemplary retail system, an item would be a compact disc, a cassette tape or electronic video games contained in a package along with appropriate labels and printed materials.

Line Item—a record description of a single work, in some quantity, which is to be purchased. A Line Item consists of one or more identical Items. In addition to a count of the number of copies desired, is an indication if compact disc or cassette tape is to be used as the recording media.

Order—a collection of Items a customer wishes to purchase. Orders are made up of one or more Line Items.

Piece—one component part of an Item, such as:

the pamphlet placed inside a compact disc case, the label placed on the case, or the tape cassette.

Point of Sale—a terminal such as a cash register, located at the point where a customer makes a purchase. This terminal includes a computer program that allows a sales person to view, and, if appropriate, change an order.

Preview Station—a location, including devices with which an individual accesses a sample of a work. Typically the access is to demonstrate the capabilities of the offered product at a preview by the viewer with the prospect of leading to a sale of the product to that individual. A station of this type would generally be located in a retail sales environment such as a store or kiosk. Orders for product may be placed at the Preview Station.

Work—an Item being offered for preview and/or for sale.

Database Tables:

Grant Table—a persistent record of all manufacturing transactions requested on a per store basis. Contains one record for each Item ordered describing the authorization status of that Item.

Line Item Table—a persistent record of all ordered Line Items for all orders on a per store basis.

Make Table—a temporary record of all Items ordered but not yet manufactured. There is one record for each Item describing what is to be manufactured and the stage of the manufacturing process.

Orders Table—a persistent record of all Orders on a per store basis.

Process Messages:

op_approved—the message sent from the Authorization Server to the Accounting Server when an Item is approved for manufacturing.

op_cancel—the message sent from the Point of Sale station to the Accounting Server to indicate that an order has been canceled prior to the authorization request and the order should be removed from the system.

op_cannot_make—the message sent from the Device Controller to the Accounting Server when a Piece of an Item has been unsuccessfully manufactured.

op_denied—the message sent from the Authorization Server to the Accounting Server when an Item is not approved for manufacturing.

op_grant—the message sent from the Accounting Server to the Authorization Server requesting authorization to manufacture a single Item.

op_grant_failed—the message sent from the Accounting Server to the Point of Sale station when an authorization request is denied by the Authorization Server.

op_made—the message sent from the Device Controller to the Accounting Server when a Piece of an Item has been successfully manufactured.

op_make—the message sent from the Accounting Server to the Device Controller to indicate what Items are to be manufactured.

op_make_failed—the message sent from the Accounting Server to the Point-of-Sale station when an Item is unsuccessfully manufactured.

op_ok—the message sent from the Point-of-Sale station to the Accounting Server to indicate that an order has been validated, and paid for, by the customer.

op_order—the message sent from the Preview Station to the Accounting Server to indicate that an order has been entered into the system.

op_order_complete—the message sent from the Accounting Server to the Point-of-Sale when all Items in an order have been completed either successfully or unsuccessfully.

Figure 16:
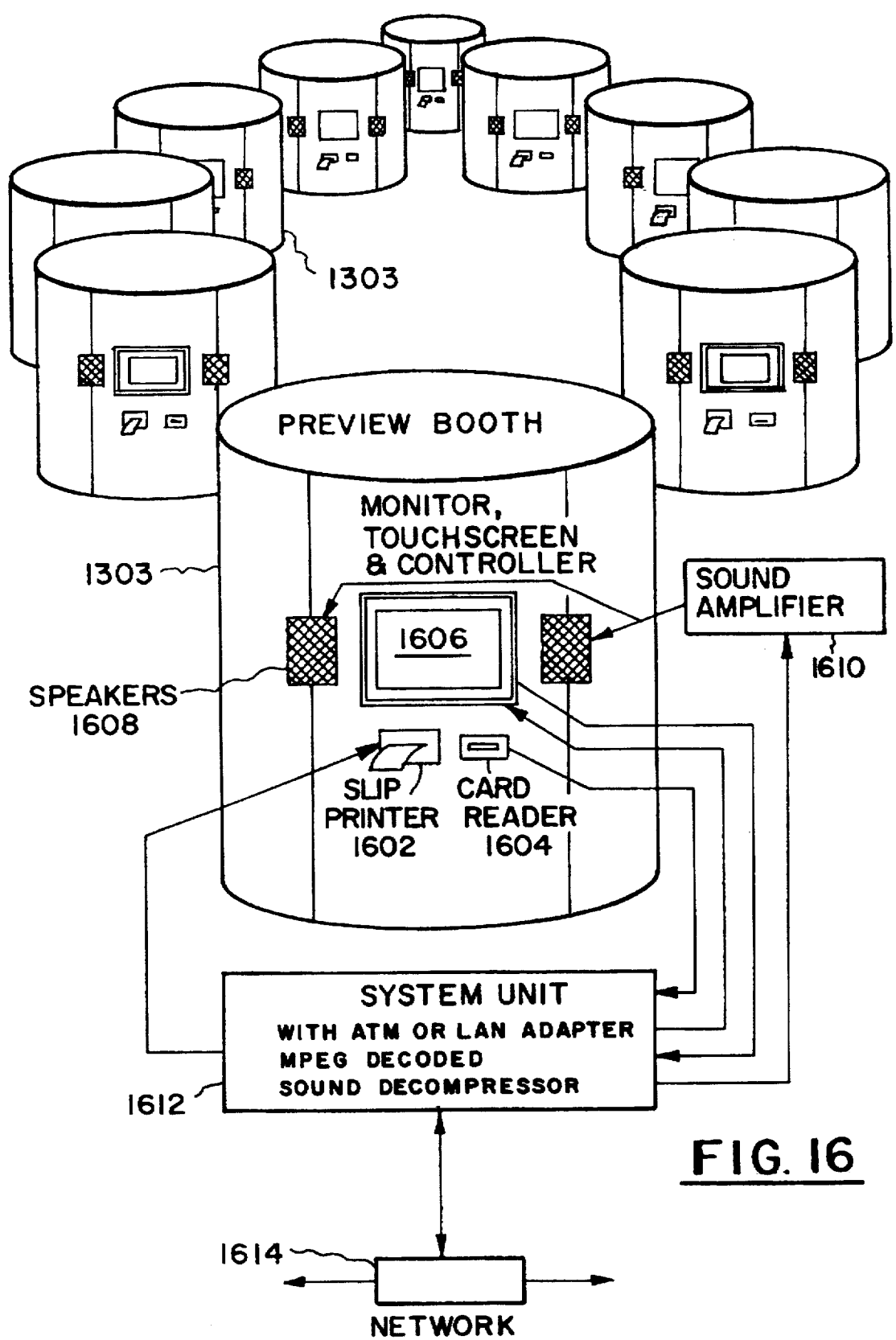
FIG. 16 is an exemplary illustration of the multimedia preview station of the on-demand system according to the principles of the present invention.
Figure 23:
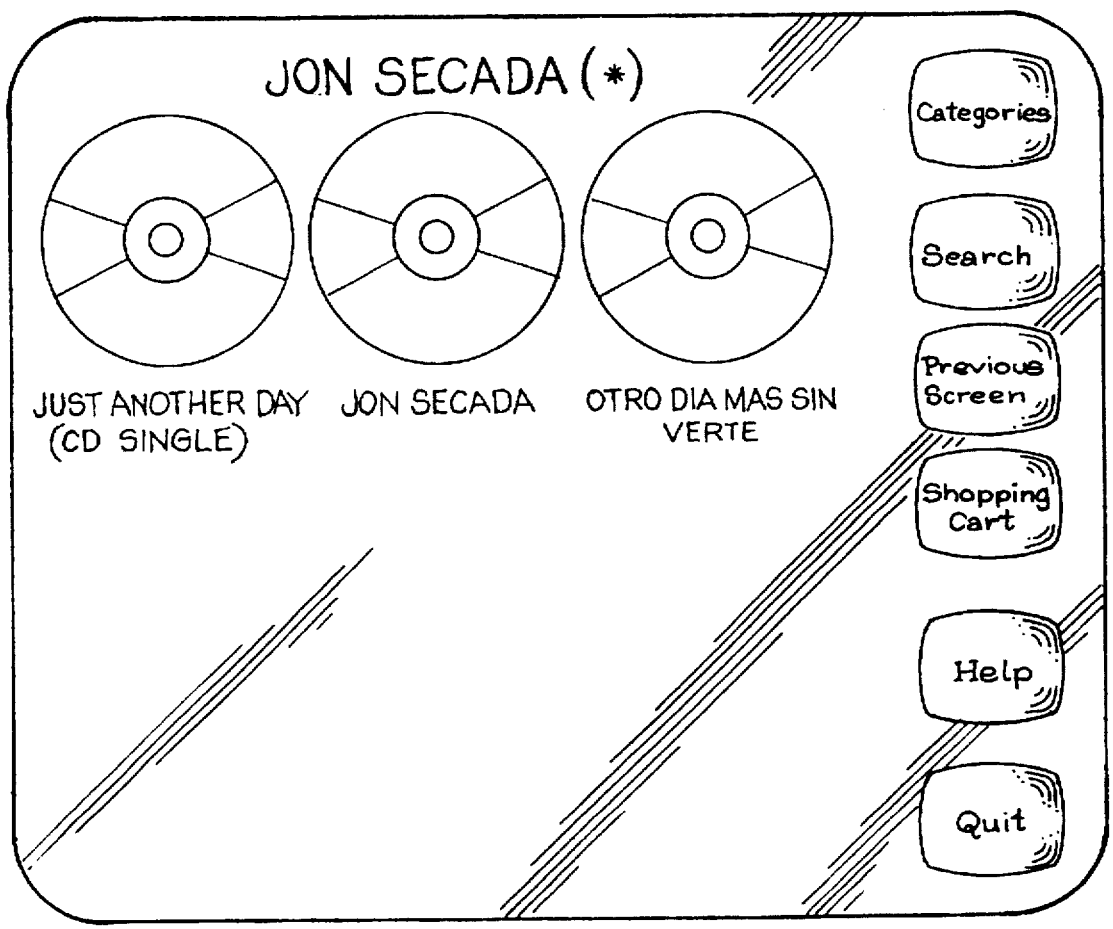
FIG. 23 is an exemplary preview station screen listing of the album works of a particular artist or group.
Figure 24:
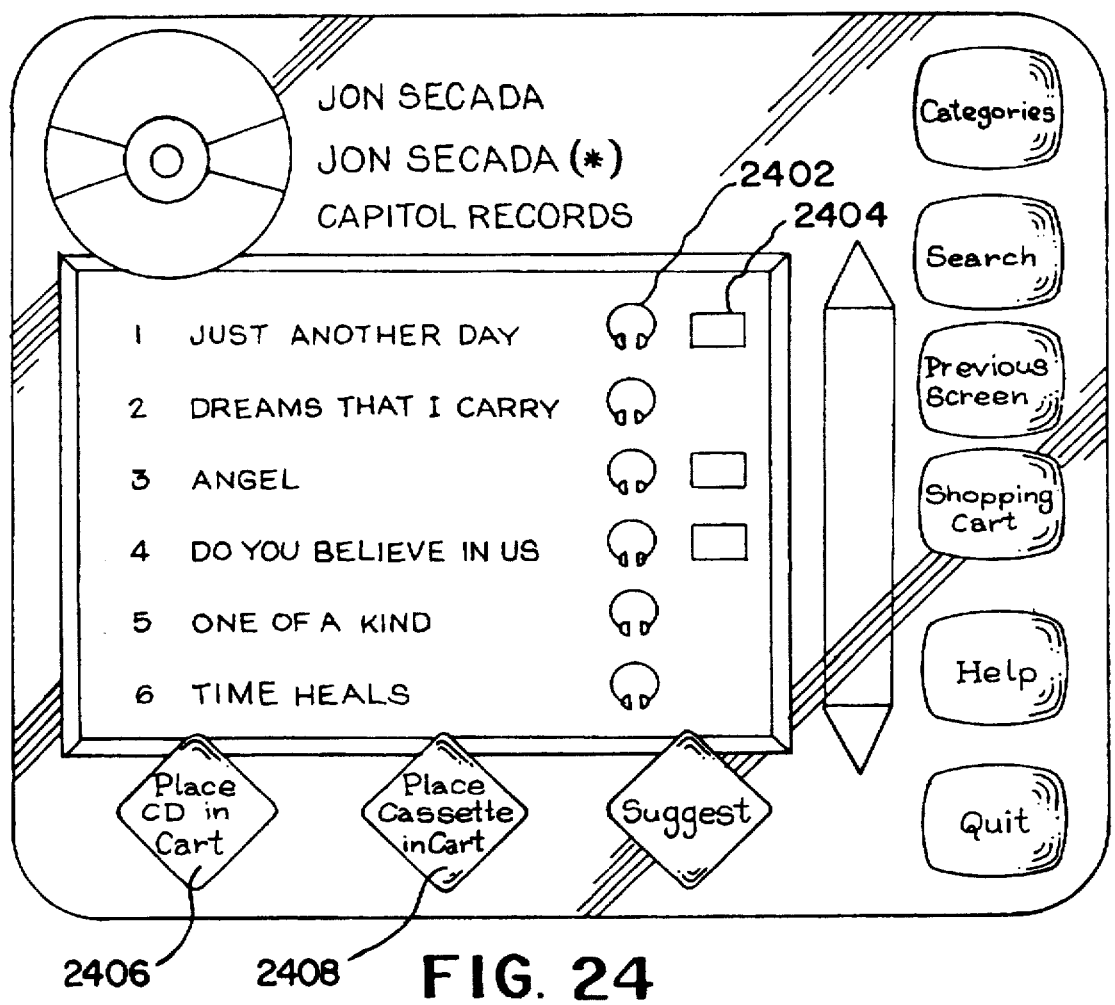
FIG. 24 is an exemplary preview station screen listing of selections for preview of a particular album.

Order Process a01) The customer, as a prospective purchaser, enters the store, and accesses one of a multitude of multimedia preview stations 1303, at a preview subsystem 1302 as shown in FIG. 13. In this example, the preview station is the Customer Premise. The customer inserts a membership card into a reader as more fully explained for FIGS. 16, 17 and 28 and sets about previewing various works. Through the touch screen panels provided as shown in part and by way of example in FIGS. 18–27, the customer can choose to preview and listen to certain works, or to listen to works while viewing an accompanying video. A screen icon of a pair of headphones 2402, as seen in FIG. 24 and another icon of a TV set 2404 are used to inform the customer of the availability of preview materials. When the customer has made a purchase decision, commands at touch pads 2406 or 2408, describing the format of the desired items, are entered on the touch screen.

a02) A Preview Station 1303 of FIG. 13 prints a memorandum of the Order 1602 for the customer, as shown in FIG. 16.

a03) The Preview Station of the subsystem 1302 forwards a message describing this order (i.e., message type op_order) to the Accounting Server 1304 of the accounting and management subsystem 1306.

a04) The Order is stored in the Orders Table database on the Accounting Server 1304. The order information includes:
preview station number
date and time of day
a Line Item Table describing the details of the purchase, including:
  artist
  title
  number of copies
  media: compact disc or cassette tape.

a05) The customer approaches the checkout area of the store included within the accounting and management subsystem 1306, and hands a personal membership card or other suitable identifying card to the sales clerk.

a06) The sales clerk inserts the customer's membership card through a card reader at the Point-of-Sale (POS) terminal 1308.

a07) The POS 1308 sends a remote database query message to the Accounting Server 1304 providing this customer number.

a08) The Accounting Server 1304 searches the Orders Table database for this customer's Order. If the Order cannot be located, the Accounting Server 1304 returns an error to the POS 1308. However, if the Order is located, the Accounting Server 1304 returns a copy to the POS 1308 for display. Included is an Order number identifier.

a09) Once the customer's Order has been displayed at the POS 1308, the sales person will ask if the customer wishes to make any changes. Changes which are possible include:
change quantity of any Line Item;
delete Items;
change format of ordered Items (e.g., compact disc to cassette tape or cassette tape to compact disc);
add new Items not previously entered;
cancel the entire Order.

a10) As an alternative to the above POS purchasing sequence, the customer could simply approach a sales person immediately upon entering the store and have the sales person enter an Order. In this case, the procedures related to the activities at the preview station subsystem are not necessary. (The Order will not be found at step a08 but the sales person will be able to enter the order in its entirety at step a09.)

a11) The customer now makes payment via cash, check, or credit card, according to the accepted procedure for each particular store or retail outlet.

a12) When the sales person completes collection of the payment, the POS 1308 will send an op_ok message to the Accounting Server 1304. At this point, all the information about the Order is in the on-demand digital information system. The system is now ready and will automatically proceed to authorize the Order, to credit royalties to any party or entity so entitled as set forth in pre-existing agreements, and to issue manufacturing orders to generate the customer's selections.

Authorization Process b01) When the Accounting Server 1304 receives the op_ok message, it replaces the copy of the Order in the Orders Table database. This is to account for any changes made by the sales clerk at the POS terminal 1308.

b02) The Accounting Server 1304 updates the Grant Table and Make Table with one record per Item, initialized to blank.

b03) Before any manufacturing can begin, an authorization must be obtained and an Authorization procedure is performed. This insures that only works authorized or approved for manufacture are manufactured and that any and all royalty requirements are correctly recorded.

b04) The Accounting Server 1304 sends an op_grant message to the Authorization Server 1312 of the Authorization Server subsystem 1310 for each Item in each Line Item. (Note: If this step is reached due to a manufacturing failure c13 step, only the failing Items will have grant requests sent.)

b05) The Authorization Server 1312 performs various authorization checks on each op_grant message and returns an op_approved or op_denied message to indicate ok/not ok to manufacture that particular Item.

b06) The criteria for denying authorization may be objective or may include subjective rules.
Exemplary criteria include:
release date is later than today's date;
a particular store's credit rating is exceeded;
certain retail outlets may want to prohibit sale of certain works;
a content provider's or label company's unique rules; and
copyright license for a work does not exist in the country where the store is located.

b07) If an item is rejected for any reason, an op_denied message is returned for that Item by the Authorization Server 1312 to the Accounting Server 1304.

b08) When op_denied is received for an Item, the Accounting Server 1304:
updates the Grant Table, Line Item Table, and Order Table reflecting what was denied; and
the denied item is removed from the Make Table.

b09) Since more than one Order at a time can have outstanding authorization requests, if this is the last Item in a particular Order, the Accounting Server 1304 marks the Order complete and sends an op_make message to the Device Controller 1314 in the Manufacturing Subsystem 1316.

b10) If there are more items in this Order, the Accounting Server 1304 loops back to Authorization Process step b07).

b11) If an op_approved message is received for a Line Item, the Accounting Server 1304 updates the Grant Table, Line Item Table, Make Table, and Orders Table reflecting what was approved. It will then loop back to Authorization Process step b09.

Manufacturing Steps

In the specification below, the Device Controller 1314 configuration depicted in FIG. 13 is representative of those machines which are necessary to operate the manufacturing machines, such as the CD writer 1318 and the tape writer 1320 in a particular retail store. The actual number of manufacturing devices and their location may differ from that illustrated in FIG. 13 based upon a given store's requirements.

c01) When the Device Controller 1314 receives the op__make message from the Accounting Server 1304 the Order contains only those Items which have been authorized and are to be manufactured.

c02) The Device Controller 1314 displays the Order as a set of manufacturing instructions on the Manufacturing Technician's Terminal (MTT) 1322. Each Item to be manufactured is displayed as a single line.

c03) In the case of media manufacturing, when the appropriate machine such as the CD writer 1318 or tape writer 1320 is ready, the technician presses a FETCH icon on the MTT 1322. This sends a message to the respective Device Controller 1314 for that manufacturing machine. The technician then presses a START icon on the MTT 1322 to initiate actual manufacture.

c04) The Device Controller 1314 will then establish a dialogue with the Data Server 1324 of the Data Server Subsystem 1326 and begin the content data transfer to the exemplary machine 1318 or 1320 indicated in the Item.

c05) For any printed material required, the MTT 1322 sends a message to the Device Controller 1314 identifying the data for printing.

c06) The Device Controller 1314 will then establish a dialogue with the Data Server 1324 and begin transferring the printable material data to the printer 1328.

c07) In both manufacturing steps c04 and c06, the data being transferred may be encrypted or compressed or both or neither. Before the data is actually routed to the manufacturing machine such as machine 1318, 1320 or 1328, a decryption and/or decompression step is likely necessary. The cryptographic key needed for the decryption step may be contained in the original op__approve message of Authorization Process step b11.

c08) For each Piece of an Item successfully completed, the Device Controller 1314 sends an op__made message to the Accounting Server 1304.

c09) The Accounting Server 1304 notes each op__made message:
when all pieces in an Item are made successfully, that item is marked complete;
when all Items in a Line Item are complete, that Line item is marked complete; and
when all Line Items in an Order are complete, that Order is marked complete.

c10) If an error occurs at any step of the Manufacturing Process, the recovery steps depend on the failure point:
for a failure in the printing step, the technician must manually retry that step.

c11) For a failure in writing a media device such as at units 1318 or 1320 that Item will be scrapped and a new authorization sequence must be initiated.

c12) If any Piece of an Item does not complete successfully, the Device Controller 1314 sends an op__cannot__make message to the Accounting Server 1304.

c13) The Accounting Server 1304 receives the op__cannot__make message. The order number is used to retrieve the original Order from the database. If the failing Piece is media, as opposed to printed matter, a new grant request is constructed for the failing Item and the processing resumes above at step b04 of the Authorization Process. This step and the associated authorization grant/royalty accounting/manufacturing steps above step b04 through step c13 are repeated 'n' times—where n is a retry count that is stored in an operating characteristics file in the Accounting Server 1304. When a failure has been retried 'n' times, the Accounting Server 1304 will make a final determination that this Item cannot be delivered and processing will continue at Purchase Process step d01.

c14) The original Order remains on the account for the requesting retail store, i.e., normal royalties remain charged against that store. That store manager must subsequently process a Return Manufacturing Authorization request to obtain credit for the failed Pieces. This insures that no duplicate media may be produced without royalty payments being accrued to the content owner.

Purchase Process d01) Once the Accounting Server 1304 has received a response for all Pieces of all Items in the Order (either op__made or op__cannot__make and the retry count is exhausted), it accesses the original Order and processes the Items from top-to-bottom matching as many Line Items requested to those completed.

d02) Any Items whose retry counts were exhausted [see Manufacturing step c13)] must have their selling amounts backed out from the total charges for the Order. A credit will need to be issued, for a charge sale, or a cash refund, for a cash sale, according to the respective store's operating policy, d03) The Accounting Server 1304 makes a final update to the Order so that it reflects what is actually being delivered to the customer. A message is sent to the POS 1308 that the Order is complete.

d04) When the POS 1308 receives this message, it queries the Accounting Server 1304 for a copy of the updated Order.

d05) The Accounting Server 1304 sends a copy of the updated Order to the POS 1308.

d06) The POS 1308 prints the final receipt and the sales person is informed (by a message to the screen) and notifies the customer that their Order is ready for pickup.

Figure 14:
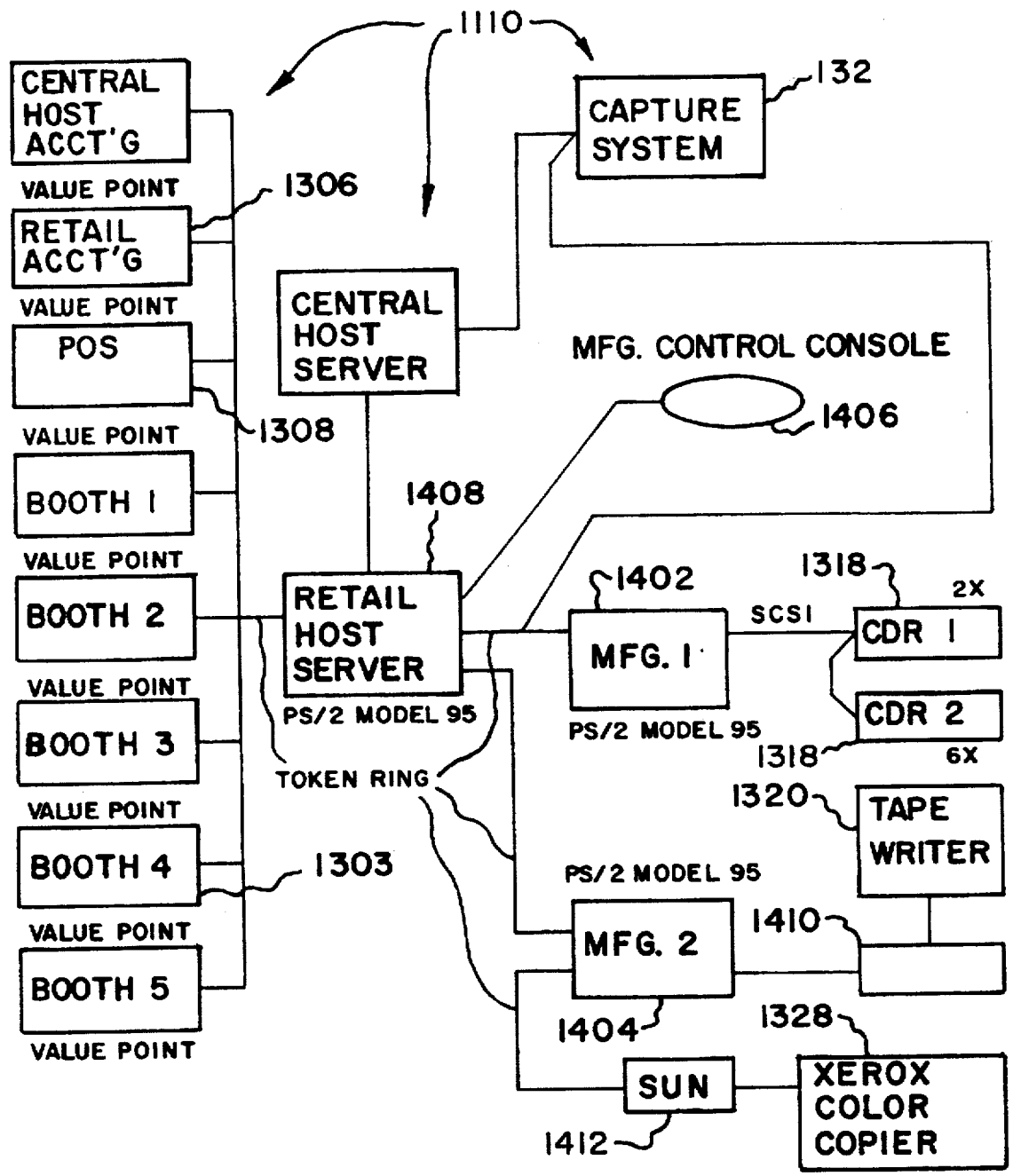
FIG. 14 is a functional block diagram of the on-demand data system according to the principles of the present invention.

FIG. 14 is a functional block diagram of the present inventive on-demand digital data system and is distinguishable from the foregoing figures as hereinafter mentioned. It identifies certain products or manufacturers as exemplary sources of devices for practicing the present invention. Manufacturing controller unit 1402 controls the two CD writers 1318 described in FIG. 13 and identified as CD writer unit 1202 in FIG. 12 in a manner to operate the two machines at two different speeds, i.e., twice real-time (2×) and 6 times real-time (6×). Suitable CD writers are available from various manufacturers including the Eastman Kodak company. Manufacturing controller unit 1404 controls the A/D interface 1410 for the special purpose devices built for what is tape writer 1320 of FIG. 13, as would a controller 1314 for the tape writer interface 1330 in FIG. 13. Manufacturing controller unit 1404 is also the interface for the Sun Microsystem's Workstation unit 1412 and a specific Xerox color copier or color printer 1328 of FIG. 13. FIG. 14 illustrates the Manufacturing Control Console 1406 optionally connected to the Retail Host Server 1408.

Figure 15:
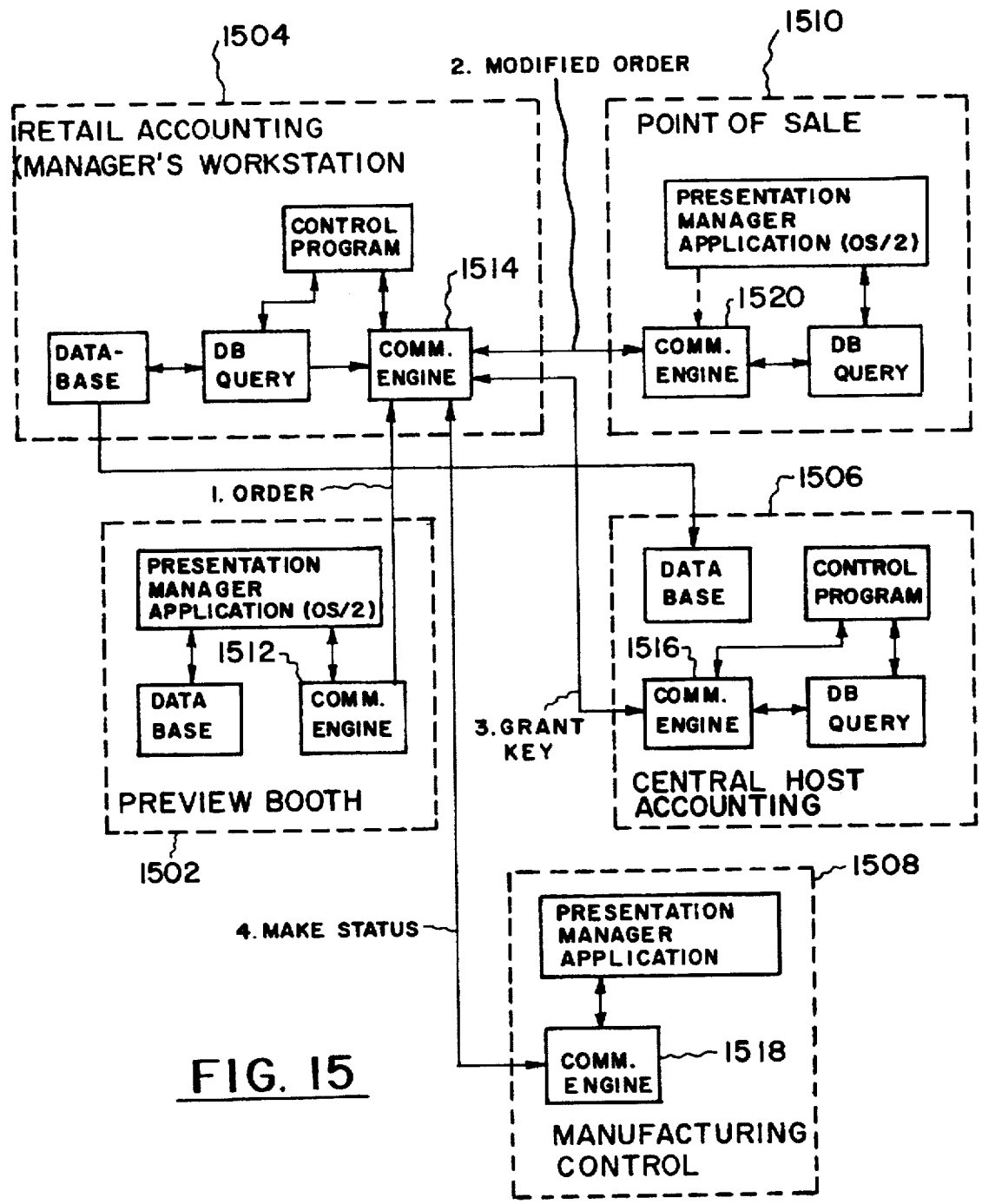
FIG. 15 is a logic diagram of the on-demand data system illustrating its five major subsystems without regard to local or remote location.

FIG. 15 has been discussed in some considerable detail with relation to FIG. 13. Further, it shows, by way of example only, certain illustrative programs or systems such as PARADOX which is generally hereinbefore referred to as a database. The Presentation Manager program shows that on-demand systems can be made to operate with the OS/2 operating system, as one such system. Likewise the booth 1502 is a multimedia preview station.

The communication process and the flow of messages or conversation between the subsystems of a typical on-demand system was described with regard to FIG. 13. In FIG. 15 there is provided a block diagram of a typical system encompassed by that of FIG. 13, and illustrates the presence of the communication engines of each of the typical subsystems, i.e., the Preview Booth station 1502, the Retail Accounting station 1504, the Central Host Accounting station 1506, the Manufacturing Control station 1508 and Point-of-Sale station 1510.

For the purpose of this presentation, a conversation is as a group of commands and responses that are logically related. For example, the set of commands and responses exchanged by the Retail Accounting subsystem 1504 and the Manufacturing Control Application 1508 is know as the 'Manufacturing Conversation'. The five clearly defined conversations of FIG. 15 consist of bi-directional, variable-length, point-to-point messages. These messages can be transported by any suitable communications protocol such as NetBios, TCP/IP, SPX/PIX, etc. Guaranteed delivery is a requirement of the communications protocol selected.

Consider the following conversations:

| Conversation | Description |
|---|---|
| Grant | Established between the Retail Accounting 1504 and the Central Host Accounting 1506 for the purpose of requesting and granting the manufacture of a music or audio product. |
| Manufacturing | Established between the Retail Accounting System 1504 and the Manufacturing Control Application 1508 to submit an order to reproduce a particular audio or video product. |
| Stream | Established between the customer preview station (PS) and the file server in order to transfer audio and video data to the PS for user interaction. This same conversation is also established between each device controller machine and the Data Server to transfer data to the CD and tape writers as illustrated by way of example, in more detail in FIGS. 11, 12, 13 and 14. |
| Order | This conversation is established between the PSs and the Retail Accounting System 1504 for the purpose of placing and order put together by a customer. |
| Device | This conversation is established between the Manufacturing Control Application 1508 and a device server. Typical device controllers are CD writers, tape writers, and color printers, as shown in FIG. 12. This conversation is strictly used to transfer control command to and from the device controllers. The device controllers themselves establish a Stream conversation of their own with the Data Server. |

In order to provide for platform and operating system independency, the unsigned long type in all of our data structures is preferred. The unsigned long data type can be easily manipulated by DOS, OS/2, Windows, and UNIX or X Windows, or other operating environment.

The message structure is such that each message consists of a header followed by message-dependent information. The handler of a particular message knows about the contents of the message-dependent section of the message. Message handlers are hereinafter discussed. The message is structured as follows:

```
typedef struct _msg
{
    unsigned long dwOpCode;
    unsigned long dwSequence;
    unsigned long dwFlags;
    unsigned long dwBuffLen;
    unsigned char Buffer[1];
} MSG, *PMSG;
```

A common communications application program interface (API) used throughout an exemplary on-demand system assumes that a Netbios transport layer is available, or that a Netbios emulation can be readily implemented. Such is the case for NetWare, Banyan Vines, and other network operating systems.

Further, the communications engine hides the sequencing of the messages as well as retries and re-connections.

Incoming messages have the following data structures:

```
/*
* The following typedef defines a pointer to a function that handles
incoming messages
*/
typedef unsigned long (*PMHFN)(unsigned long dwSessionId,PMSG
pMsg);
typedef struct _msg
{
    unsigned long dwOpCode;
    unsigned long dwSequence;
    unsigned long dwFlags;
    unsigned long dwBuffLen;
    unsigned char Buffer[1];
} MSG, *PMSG;
typedef unsigned long LISTHANDLE;
// Error codes
#define ERROR_ALREADY_INITIALIZED      1001
#define ERROR_MEMORY_ALLOC             1002
#define ERROR_NOT_INITIALIZED          1003
#define ERROR_INVALID_PTR              1004
#define ERROR_HANDLER_NOT_FOUND        1005
#define ERROR_LANRESOURCES             1006
#define ERROR_NAME_NOT_REGISTERED      1007
#define ERROR_NO_MORE_NCBS             1008
#define ERROR_SUBMITTING_NCB           1009
#define ERROR_CONNECT_IN_PROCESS       1010
#define ERROR_NOT_CONNECTED            1011
#define ERROR_CONNECTING               1012
#define ERROR_SENDING                  1013
#define ERROR_INVALID_SESSIONID        1014
#define ERROR_COMM_RESOURCES           1015
#define ERROR_SEND_TIMEOUT             1016
#define ERROR_TOO_MANY_COMMANDS        1017
#ifdef OS2_COMMSYS
#define ERROR_ACCESSING_SEM            2001
#endif
// Session flags
#define SF_CONNECTED                   0x00000001
#define SF_CONNECTING                  0x00000002
#define SF_PENDRECEIVE                 0x00000004
#define SF_PENDLISTEN                  0x00000008
#define SF_PENDCALL                    0x00000010
```

The following is a continuation of the description for the programming interface. More detail about the various conversations are hereinafter discussed. For example, later sections describe the conversation-dependent part of the message as it is defined for each conversation.

Initialization of the communications engine is necessary by each process that uses its services.

The global default message handler and the global exception handler MUST be passed to this function. NULL values are not allowed. If this function fails the Comm Engine cannot be used. It is necessary to check the return code.

| | |
|---|---|
| int InitCommSystem( | // Initialize the system, create chain |
| int adapters, | // Number of adapters in this machine |
| PMHFN pfnDefMsgHandler, | // Pointer to global def msg handler |
| PMHFN pfnExceptionHandler); | // Pointer to global exception handler |

Each message is handled by a message handler, that is, when a message is received the proper message handler is invoked. If there is no message handler defined for the incoming message the Communications Engine invokes the default message handler for that conversation (or session) if one has been defined. If one has not been defined the Comm Engine invokes the global default message handler which is guaranteed to exist.

The following functions hide the implementation details of message handler support and allow the creation and maintenance of handler lists. The first step in creating a session is to create a handler list and adding the various message handlers to it.

| | |
|---|---|
| int CreateMessageHandlerList( | // Create an arbitrary handler list |
| LISTHANDLE *hList); | // Return id of arbitrary list here |
| int InstallMessageHandler( | // Add a message handler to the list |
| LISTHANDLE hList, | // ID of arbitrary handler list |
| unsigned long dwOpCode, | // Opcode of handler to be installed |
| PMHFN pfnMessageHandler); | // Pointer to function handling message |
| int ReplaceMessageHandler( | // Replace an existing mesage handler |
| LISTHANDLE hList, | // ID of arbitrary handler list |
| unsigned long dwOpCode, | // Opcode of handler to be replaced |
| PMHFN pfnMessageHandler); | // Pointer to function handling message |
| int RegisterDefaultMessageHandler( | // Install default handler for this list |
| LISTHANDLE hList, | // ID of arbitrary handler list |
| PMHFN pfnDefaultHandler); | // Pointer to default handling functn |
| int RegisterExceptionHandler( | // Install default exception handler |
| LISTHANDLE hList, | // ID of arbitrary handler list |
| PMHFN pfnExceptionHandler); | // Pointer to exception handling function |

The following functions form the core of the Comm Engine. These functions are used to create server sessions as well as to connect with remote server sessions.

| | |
|---|---|
| int RegisterLocalName( | // Register a name a-la-netbios |
| short iAdapter, | // Network adapter number (0 through 4) |
| unsigned char *pszLocalName); | // Name to be registered |
| int CreateServerSession( | // Initiate and receive all |
| unsigned char *pszLocalName, | // Name client connects to |
| unsigned char *pszRemoteNames, | // Name expected to connect ("*" for ALL1) |
| LISTHANDLE hList, | // ID of handler list |
| unsigned long *pdwSessionId); | // Pointer where session id returned |
| int ClientConnect( | // Client connects to server |
| unsigned char *pszLocalName, | // Name of this client |
| unsigned char *pszRemoteName, | // Name of the server session |
| LISTHANDLE hList, | // ID of handler list |
| unsigned long *pdwSessionId); | // Pointer where session id returned |
| int TerminateSession( | // Ussually client terminates session |
| unsigned long dwSessionId); | // Id of session to be terminated |
| int QuerySessionStatus( | // Query the status of a given session |
| unsigned long dwSessionId); | // Id of session to be queried |

The transport manager section includes three functions. These functions allow a message to be received and its message handler invoked, as well as sending a message across the link.

| | |
|---|---|
| int SendNetMessage( | // Client / Server sends message |
| unsigned long dwSessionId, | // Id of established session |
| unsigned long dwOpCode, | // Opcode to send to receiver |
| unsigned long dwFlags, | // Value of flags to send to receiver |
| unsigned long dwBuffLen, | // Length of buffer to send |
| void *pBuffer); | // Pointer to buffer data to send |
| unsigned long QuerySessionStatus( | // Returns session status flags |
| unsigned long dwSessionId, | // Id of established session |
| int DispatchNetMsg( | // Invokes message handlers |
| int bMainLoop); | // Must be TRUE if called from main loop, FALSE otherwise |

The previous function deserves a special explanation. This function allows to "cooperatively" dispatch messages to the appropriate handlers and the TRUE value is only used when DispatchNetMsg is called from within the main loop.

For example, the following code should replace your traditional GetMsg/DispatchMsg loop in an OS/2 Presentation Manager application:

```
bDone = FALSE;
while (!bDone)
    {
    fResult = WinPeekMsg(hab,(PQMSG)&qmsg,(HWND)NULL,
        (ULONG)NULL,(ULONG)NULL,PM_REMOVE);
    if (fResult)
        {
        if (qmsg.msg == WM_QUIT)
            bDone = TRUE;
        else
            WinDispatchMsg(hab,(PQMSG)&qmsg);
        }
    DispatchNetMsg(TRUE);
    }
```

A similar approach should be used under MS Windows.

If you are using the Comm Engine under PC DOS or OS/2 (non-PM application) you should have a loop in your main as follows:

```
while (TRUE)
    {
    DispatchNetMsg(TRUE);
    }
```

If processing of a particular message will take a long time (more than one second) you should call DispatchNetMsg from within the handler. Make sure you call it with its parameter set to FALSE as follows:

```
MessageHandler1(...)
{
    for (i = 0; i < n; i++)
    {
        // the following process takes a little while to execute
        DispatchNetMsg(FALSE);
    }
}
```

The following example uses a hypothetical sample conversation with two (2) opcodes between a server application and a client application. This code ignores run-time errors for the most part.

For example if it is desired to start a server and a client in machine #1, and another server and another client in machine#2 type the following:

At the OS/2 prompt in machine #1:
  sessions -Ss1.c3 -Ss2.c4 -Cc1.s3 -Cc2.s4

At the OS/2 prompt in machine #2:
  session -Ss3.c1 -Ss4.c2 -Cc3.s1 -Cc4.s2

The command-line option -S defines a server and -C defines a client. For example, -Ss1.c3 defines a server named s1 that accepts a connection from a remote client named c3. Option -Cc4.s2 defines a client named c4 that connects with a remote server named s2.

```
#pragma pack(1)
#define INCL_DOSPROCESS
#include <os2.h>
#include <stdlib.h>
#include <stdio.h>
#include <string.h>
#include <malloc.h>
#include <memory.h>
#include <ctype.h>
#include <time.h>
#include <commsys.h>
int main(int argc,char **argv);
int DefMsgHandler(unsigned long dwSessionId,PMSG pMsg);
int ExceptionHandler(unsigned long dwSessionId,PMSG pMsg);
int MessageHandler1(unsigned long dwSessionId,PMSG pMsg);
int ClientHandler1(unsigned long dwSessionId,PMSG pMsg);
#define    OP_REQUEST 1                              100
#define    OP_SERVICE1                               200
int main(int argc,char **argv)
{
    int rc = 0, i, j;
    LISTHANDLE hList = 0;
    LISTHANDLE hCList = 0;
    char *p;
    unsigned long dwServerSessions[10];
    unsigned long dwClientSessions[10];
    int nSSessions = 0;
    char szClientName[32];
    int nCSessions = 0;
    PMSG pMsg;
    char szArg[32];
    if (argc <3)
        {
        printf("usage: SESSIONS -cClient1 .Server1 -cCliene.Server2 -sServer1.Client?... \n");
        DosBeep(1000,100);
        return(-1);
        }
    rc = InitCommSystem(1,DefMsgHandler,ExceptionHandler);
    if (rc ?= SUCCESS)
        printf("Initializing Comm System (%d)\n",rc);
    if (rc != SUCCESS)
        return(DosBeep(1000,100));
    for (i = 1; i < argc; i++)
        {
        strcpy(szArg,argv[i]);
        if (szArg[0] == '-')
        if (toupper(szArg[1]) == 'C')
            {
            p = (char *) strchr(szArg,'.');
            if (p == 0)
                {
                printf("Invalid command line argument\n\n");
                return(DosBeep(1000,100));
                }
            *p = '\0';
            strcpy(szClientName,&szArg[2]);
            *p = '.';
            rc = RegisterLocalName(0,szClientName);
            if (rc != SUCCESS)
                printf("Registering %s
```

```
(%d)\n",szClientName,rc);
                if (rc != SUCCESS)
                    return(DosBeep(1000,100));
            }
            else if (toupper(szArg[1]) == 'S')
            {
                p = (char *) strchr(szArg,'.');
                if (p == 0)
                {
                    printf("Invalid command line argument\n");
                    return(DosBeep(1000,100));
                }
                *p = '\0';
                strcpy(szClientName,&szArg[2]);
                *p = '.';
                rc = RegisterLocalName(0,szClientName);
                if (rc != SUCCESS)
                    printf("Registering %s (%d)\",&sArg[2],rc);
                if (rc != SUCCESS)
                    return(DosBeep(1000,100));
            }
        }
    }
    rc = CreateMessageHandlerList(&hList);
    if (rc != SUCCESS)
        printf("Creating message handler list (%d)\n",rc);
    if (rc != SUCCESS)
        return(DosBeep(1000,100));
    rc = InstallMessageHandler(hList,OP_REQUEST1,MessageHandler1);
    if (rc != SUCCBSS)
        printf("Installing message handler 1 (%d)\n",rc);
    if (rc != SUCCESS)
        return(DosBeep(1000,100));
    rc = RegisterDefaultMessageHandler(hList,0);
    if (rc != SUCCESS)
        printf("Registering default message handler 1 (%d)\n",rc);
    if (rc != SUCCESS)
        return(DosBeep(1000,100));
    rc = RegisterExceptionHandler(hList,0);
    if (rc != SUCCESS)
        printf("Registering default exception handler 1 (%d)\n",rc);
    if (rc != SUCCESS)
        return(DosBeep(1000,100));
    // Create local server sessions
    for (i = 1; i < argc; i++)
    {
        strcpy(szArg,argv[i]);
        if (szArg[0] == '-')
        {
            if (toupper(szArg[1]) == 'S')
            {
                p = (char *) strchr(sZArg,'.');
                if (p == 0)
                {
                    printf("Invalid command line argument\n");
                    return(DosBeep(1000,100));
                }
                *p = '\0';
                rc = CreateServerSession(
&sZArg[2],p+1 ,hList,&dwServerSessions[nSSessions++]);
                *p = '.';
                if (rc != SUCCESS)
                    printf("Creating %s session (result = %d), session
(%ld)\n",szArg,rc,dwServerSessions[nSSessions-1]);
                if (rc != SUCCESS)
                    return(DosBeep(1000,100));
            }
        }
    }
    rc = CreateMessageHandlerList(&hCList);
    if (rc != SUCCESS)
        printf("Creating client message handler list (%d)\n"rc);
    if (rc != SUCCESS)
        return(DosBeep(1000,100));
    rc = InstallMessageHandler(hCList OP_SERVICE1,ClientHandler1);
    if (rc != SUCCESS)
        printf("Installing client message handler 1 (%d)\n",rc);
    if (rc != SUCCESS)
        return(DosBeep(1000,100));
```

-continued

```
    rc = RegisterDefaultMessageHandler(hCList,0);
    if (rc != SUCCESS)
        printf("Registering client default message handler 1 (%d)\n",rc);
    if (rc != SUCCESS)
        return(DosBeep(1000,100));
    rc = RegisterExceptionHandler(hcList,0);
    if (rc != SUCCESS)
        printf("Registering client default exception handler 1 (%d)\n",rc);
    if (rc != SUCCESS)
        return(DosBeep(1000,100));
    printf("\n\nSystem properly initialized. Press any key to connect ");
    fflush(stdout);
    getchar();
    printf("\n");
    // Connect to remote servers
    for (i = 1; i < argc; i++)
    {
        strcpy(szArg,argv[i]);
        if (szArg[0] == '-')
        {
            if (toupper(szArg[1]) == 'C')
            {
                p = (char *) strchr(szArg,'.');
                if (p == 0)
                {
                    printf("Invalid command line argument\n\n");
                    return(DosBeep(1000,100));
                }
                *p = '\0';
                strcpy(szClientName,&szArg[2]);
                rc = ClientConnect(szClientName,p+1 ,hCList,
                    &dwClientSessions[nCSessions++]);
                *p = '.';
                printf("Connecting with server %s (result = %d),
                    session
(%1d)\n",p+1 ,rc,dwClientSessions[nCSessions-1]);
                if (rc != SUCCESS)
                    return(DosBeep(1000,100));
            }
        }
    }
    j = 0;
    while (1)
    {
        for (i = 0; i < nCSessions; i++)
        {
            printf("Sending OP#REQUEST1 to session
%1d...\n",dwClientSessions[i]);
            rc = DispatchNetMsg(1);
            rc =
SendNetMessage(dwClientSessions[i],OP#REQUEST1,0,0,0);
            if (rc != SUCCESS)
            {
                while (rc == ERROR_CONNECT_IN_PROCESS)
                {
                    DispatchNetMsg(1);
                    rc =
SendNetMessage(dwClientSessions[i],OP#REQUEST1,0,0,0);
                }
            }
        }
    }
    return(0);
}
int MessageHandler1(unsigned long dwSessionId,PMSG pMsg)
{
    int rc;

printf("OP#REQUEST1 arrived þþþ (session %ld) ∇n",dwSessionId);
        pMsg->dwOpCode = OP_SERVICE1;
        pMsg->dwSequence = 2;
        pMsg->dwFlags = 0;
        pMsg->dwBuffLen = 0;
    rc = SendNetMessage(dwSessionId,OP_SERVICE1,0,0,0);

printf("Sending OP_SERVICE1 þþþ (%d)\n",rc);
    if (rc != SUCCESS)
    {
        while (rc == ERROR_CONNECT_IN_PROCESS)
        {
            DispatchNetMsg(0);
```

```
            rc = SendNetMessage(dwSessionID,OP_SERVICE1,0,0,0);
            }
        }
        return(rc);
}
int DefMsgHandler(unsigned long dwSessionId,PMSG pMsg)
{
    return(0);
}
int ExceptionHandler(unsigned long dwSessionId,PMSG pMsg)
{
    return(0);
}
int ClientHandler1(unsigned long dwSessionId,PMSG pMsg)
{
    printf("þþþ  OP_SERVICE1 arrived (session %ld)\n",dwSessionId);
    return(0);
}
```

The Grant conversation is originated by the Retail Accounting System 1504 of FIG. 15 in the store, most likely as a result of a request to purchase originated by the customer at the PS. The structure of the message-dependent section of the message passed back and forth between these two entities looks as follows:

```
#define OP#GRANT        0x0170    // Command
#define OP_GRANTED      0x0171    // Response
#define OP_DENIED       0x0172    // Response
typedef struct_grantstruct
{
    unsigned long dwOrderNum;
    unsigned long dwStore;
    unsigned long dwCIT;
    unsigned long dwMedia;
    char szFilename[SIZEOF_ALBUM_NAME+1];
    char szGrantKey[SIZEOF_GRANT_KEY+1];
} GRANTSTRUCT, *PGRANTSTRUCT;
```

For example, a message sent from the Retail Accounting System 1504 to the Central Host 1506 could look as follows:

| GRANT -> | | | | |
|---|---|---|---|---|
| Op Code | Sequence | Flags | Bufflen | Buffer |
| 00000170 | 00000001 | FFFFFFFF | 00000025 | 76 54 32 45 54 01 02 12 64 88 ... |

And the return message (authorization) could look like:

| GRANTED -> | | | | |
|---|---|---|---|---|
| Op Code | Sequence | Flags | Bufflen | Buffer |
| 00000171 | 00000001 | FFFFFFFF | 00000025 | 54 34 98 76 54 01 90 23 20... |

Where the flags field has an unknown meaning at this point.

Had the request been denied the return message would look like:

| DENIED <- | | | | |
|---|---|---|---|---|
| Op Code | Sequence | Flags | Bufflen | Buffer |
| 00000172 | 00000001 | FFFFFFFF | 00000010 | 54 09 70 23 41 ... |

Where the flags field probably describes the reason for the denial.

The Manufacturing conversation is originated by the Retail Accounting System. The structure of the message passed back and forth between the Retail Accounting 1504 and the Manufacturing Control Station 1508 looks as follows:

Note: These two structures are shared by both the Order and Manufacturing conversations.

```
#define OP_MAKE         0x0110    // Command
#define OP_MADE         0x0111    // Response
```

```
#define OP_CANNOT_MAKE  0x0112    // Response
typedef struct _itemstruct
{
    unsigned long dwMedia;
    unsigned long dwCopies;
    unsigned long dwTracks;
    unsigned long dwCDBarcode;
```

```
        unsigned long dwPricePerItem;
        char szFileName[SIZEOF_ALBUM_NAME+1];
        char szAlbumTitle8 SIZEOF_ALBUM_TITLE+1];
    } ITEMSTRUCT, *PITEMSTRUCT;
typedef struct _orderstruct
    {
        unsigned long dwOrderNum;
        unsigned long dwCustomerID;
        unsigned long dwCIT;
        unsigned long dwNumLineItems;
        char szHowPaid[SIZEOF_HOW_PAID+1];
        ITEMSTRUCT ItemBuff[1];
    } ORDERSTRUCT, *PORDERSTRUCT;
```

For example, a message sent from the Retail Accounting Station to the Manufacturing Control Application station 1508 could look as follows:

| Op Code | Sequence | Flags | BuffLen | Buffer |
|---|---|---|---|---|
| MAKE -> | | | | |
| 00000110 | 00000001 | FFFFFFFF | 00000011 | 54 09 70 23 41 ... |
| MADE <- | | | | |
| 00000111 | 00000001 | FFFFFFFF | 00000011 | 54 09 70 23 41 ... |

The inability to manufacture would be signaled by a message with the following contents:

| Op Code | Sequence | Flags | BuffLen | Buffer |
|---|---|---|---|---|
| CANNOT_MAKE <- | | | | |
| 00000112 | 00000001 | FFFFFFFF | 00000011 | 54 09 70 23 41 ... |

Where the flags field indicates the reason why the requested item cannot be manufactured, and perhaps also suggests a recommended action to remedy the problem. Problems such as device out of service, unable to establish NetBios session, etc, are likely to be the reasons encoded in the flags field of the message.

The Stream conversations are more complex than the others since the conversation occurs in states such as OPEN, READ, CLOSE.

```
#define OP_EXIST          0x0130    // Command
#define OP_EXISTS         0x0131    // Response
#define OP_OPEN           0x0132    // Command
#define OP_OPENED         0x0133    // Response
#define OP_SEEK           0x0134    // Command
#define OP_SEEK_RESULT    0x0135    // Response
#define OP_READ           0x0136    // Command
#define OP_BUFF_READ      0x0137    // Response
#define OP_WRITE          0x0138    // Command
#define OP_WRITTEN        0x0139    // Response
#define OP_BLAST          0x0140    // Command
#define OP_BLASTED        0x0141    // Response
#define OP_XON            0x0142    // Command
#define OP_XOFF           0x0143    // Command
#define OP_CLOSE          0x0144    // Command
#define OP_TRUNCATE       0x0145    // Command
#define OP_TRUNCATED      0x0146    // Response
#define OP_STATUS         0x0147    // Informational (async)
typedef struct _streamstruct
    {
        unsigned long idCIT;
        unsigned char Buffer[1];
    } STREAMSTRUCT, *PSTREAMSTRUCT;
```

For example, a conversation established between the PS and the Data Server or between the Device Controller and the Data Server might look as follows:

| Op Code | Sequence | Flags | BuffLen | Buffer |
|---|---|---|---|---|
| EXIST --> | | | | |
| 00000130 | 00000001 | FFFFFFFF | 00000009 | 54 09 70 23 41 ... |
| EXISTS <-- | | | | |
| 00000131 | 00000001 | FFFFFFFF | 00000010 | 54 09 70 23 41 ... |
| OPEN --> | | | | |
| 00000132 | 00000001 | FFFFFFFF | 00000010 | 54 09 70 23 41 ... |
| OPENED <-- | | | | |
| 00000133 | 00000001 | FFFFFFFF | 00000010 | 54 09 70 23 41 ... |
| READ --> | | | | |
| 00000136 | 00000001 | FFFFFFFF | 00000010 | 54 09 70 23 41 ... |
| BUFF_READ <-- | | | | |
| 00000137 | 00000001 | FFFFFFFF | 00000010 | 54 09 70 23 41 ... |
| SEEK --> | | | | |
| 00000134 | 00000001 | FFFFFFFF | 00000010 | 54 09 70 23 41 ... |
| SEEK_RESULT <-- | | | | |
| 00000135 | 00000001 | FFFFFFFF | 00000010 | 54 09 70 23 41 ... |
| BLAST --> | | | | |
| 00000140 | 00000001 | FFFFFFFF | 00000010 | 54 09 70 23 41 ... |
| BLASTED <-- | | | | |
| 00000141 | 00000001 | FFFFFFFF | 00000010 | 54 09 70 23 41... |
| XON --> | | | | |
| 00000142 | 00000001 | FFFFFFFF | 00000010 | 54 09 70 23 41 ... |
| XOFF --> | | | | |
| 00000143 | 00000001 | FFFFFFFF | 00000010 | 54 09 70 23 41 ... |
| TRUNCATE --> | | | | |
| 00000145 | 00000001 | FFFFFFFF | 00000010 | 54 09 70 23 41 ... |
| TRUNCATED <-- | | | | |
| 00000146 | 00000001 | FFFFFFFF | 00000010 | 54 09 70 23 41 ... |
| WRITE --> | | | | |
| 00000138 | 00000001 | FFFFFFFF | 00000010 | 54 09 70 23 41 ... |
| WRITTEN <-- | | | | |
| 00000139 | 00000001 | FFFFFFFF | 00000010 | 54 09 70 23 41 ... |
| CLOSE --> | | | | |
| 00000144 | 00000001 | FFFFFFFF | 00000010 | 54 09 70 23 41 ... |
| STATUS <--> | | | | |
| 00000147 | 00000001 | FFFFFFFF | 00000010 | 54 09 70 23 41 ... |

The Order conversation can exist between the PS 1502 and the Retail Accounting Station 1504.

```
#define OP_ORDER          0x0160    // Command
typedef struct _orderstruct
    {
        char szileName[9];
    } ORDERSTRUCT, *PORDERSTRUCT;
```

For example, a message sent from the PS 1502 to the Retail Accounting Station 1504 during the process of placing an order could look as follows:

| | | | | |
|---|---|---|---|---|
| ORDER --> | | | | |
| Op code | Sequence | Flags | BuffLen | Buffer |
| 00000160 | 00000001 | FFFFFFFF | 00000009 | FDS453FG0 |

The Device conversation takes place within the Manufacturing Control station 1508.

```
#define OP_PREPARE       0x0180    // Command
#define OP_READY         0x0181    // Response
#define OP_START         0x0182    // Command
#define OP_STARTED       0x0183    // Response
#define OP_RESTART       0x0184    // Command
#define OP_RESTARTED     0x0185    // Response
#define OP_ABORT         0x0186    // Command
#define OP_ABORTED       0x0187    // Response
#define OP_PAUSE         0x0188    // Command
#define OP_PAUSED        0x0189    // Response
#define OP_DEVSTATUS     0x0190    // Informational (async)
#define OP_COMPLETED     0x0193    // Informational (async)
#define OP_SHUTDOWN      0x0194    // Command
#define OP_DOWN          0x0195    // Response
typedef struct _devicestruct
{
    unsigned long dwStatusCode;    // return status codes
    unsigned long dwDeviceType;    // device type
    unsigned long dwTrackCount;    // track (song) count
    unsigned char szFileName[12];  // audio/image file name
    unsigned char szExtraBuf[1];   // pointer to extra data
} DEVICESTRUCT, *PDEVICESTRUCT;
```

For example, a typical conversation between the Manufacturing Control Application at station 1508 and a particular Device Controller may develop as follows:

```
OP_PREPARE -->
Op Code    Sequence   Flags      Bufflen    Buffer
00000180   00000001   FFFFFFFF   00000010   54 09 70 23 41 ...
OP_READY <--
Op Code    Sequence   Flags      Bufflen    Buffer
00000181   00000001   FFFFFFFF   00000010   54 09 70 23 41 ...
OP_START -->
Op Code    Sequence   Flags      Bufflen    Buffer
00000182   00000001   FFFFFFFF   00000010   54 09 70 23 41 ...
OP_STARTED <--
Op Code    Sequence   Flags      Bufflen    Buffer
00000183   00000001   FFFFFFFF   00000010   54 09 70 23 41 ...
OP_RESTART -->
Op Code    Sequence   Flags      Bufflen    Buffer
00000184   00000001   FFFFFFFF   00000010   54 09 70 23 41 ...
OP_RESTARTED <--
Op Code    Sequence   Flags      Bufflen    Buffer
00000185   00000001   FFFFFFFF   00000010   54 09 70 23 41 ...
OP_ABORT -->
Op Code    Sequence   Flags      Bufflen    Buffer
00000186   00000001   FFFFFFFF   00000010   54 09 70 23 41 ...
OP_ABORTED <--
Op Code    Sequence   Flags      Bufflen    Buffer
00000187   00000001   FFFFFFFF   00000010   54 09 70 23 42 ...
OP_PAUSE -->
Op Code    Sequence   Flags      Bufflen    Buffer
00000188   00000001   FFFFFFFF   00000010   54 09 70 23 41 ...
OP_PAUSED <--
Op Code    Sequence   Flags      Bufflen    Buffer
00000189   00000001   FFFFFFFF   00000010   54 09 70 23 41 ...
OP_DEVSTATUS <--
Op Code    Sequence   Flags      Bufflen    Buffer
00000190   00000001   FFFFFFFF   00000010   54 09 70 23 41 ...
OP_COMPLETED <--
Op Code    Sequence   Flags      Bufflen    Buffer
00000193   00000001   FFFFFFFF   00000010   54 09 70 23 41 ...
OP_SHUTDOWN -->
Op Code    Sequence   Flags      Bufflen    Buffer
00000194   00000001   FFFFFFFF   00000010   54 09 70 23 41 ...
OP_DOWN <--
Op Code    Sequence   Flags      Bufflen    Buffer
00000195   00000001   FFFFFFFF   00000010   54 09 70 23 41 ...
```

In FIG. 16 there is illustrated a panorama of multimedia preview stations or booths 1303 as previously illustrated for FIGS. 12 and 13. These booths 1303 are similar in concept to the multimedia preview booths 106 of FIG. 1 and are those booths illustrated in FIG. 11 at the retail store 1108. FIG. 16 illustrates a typical video and audio system including a monitor touch screen and controller 1606 for video, and an audio system including speakers 1608 and a sound amplifier 1610. A system unit 1612 provides for interconnect with the selected ATM or LAN adapter and further includes a MPEG decoder and sound decompressor with a communication network connection at network unit 1614. At the completion of the customer's initial preview and ordering transaction, the slip printer 1602 provides a hard copy record of the customer's order.

Figure 17:
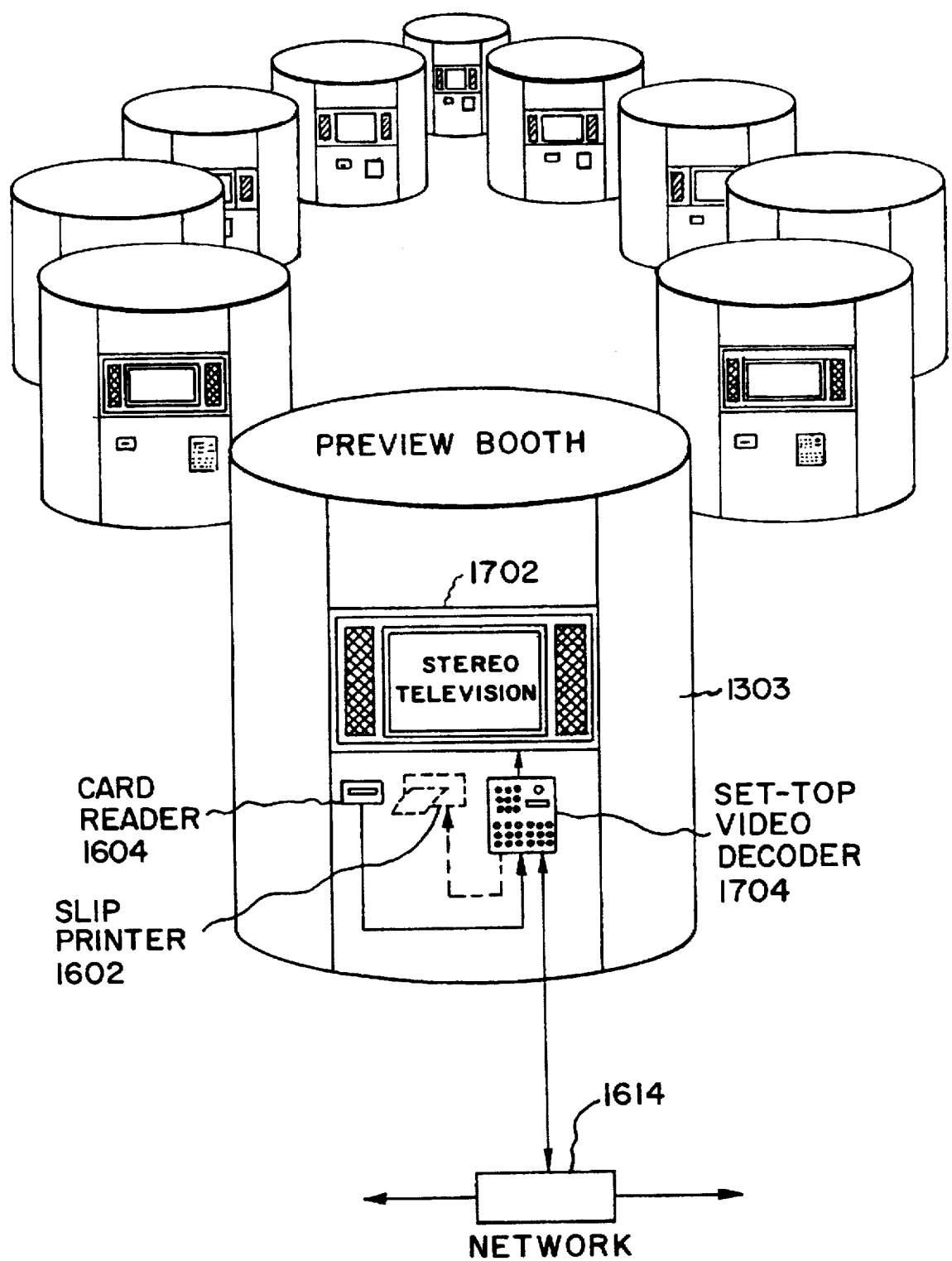
FIG. 17 is an exemplary illustration of the multimedia preview station alternatively showing a set-top video decoder application.

A multimedia preview station 1303 similar to the station 1303 of FIG. 16 is illustrated in FIG. 17. The alternative of FIG. 17 provides for a stereo television unit 1702, which differentiates it from FIG. 16 as does the inclusion of a set-top video decoder unit 1704. The individualized arrangement of FIG. 17, including the stereo television 1702 and in particular the set-top video decoder 1704, emphasizes the potential of personalized customer premise arrangements which can be provided for outside of the retail store environment. Further, such "home" units can include their own built in ATM hardware and software interfaces. An additional example is a color printer which could be equipped with a direct communication unit providing a connect to a communications data network which eliminates the need for a SCSI bus attachment or an interface card on the computer bus as is typical for such printing units.

The present invention as presented herein is adaptable by those of ordinary skill in the art to accommodate customer requests which originate from any customer premise, including a customer's residence. The preview station 1303 of FIG. 17 is not significantly dissimilar from a home entertainment center equipped with stereo television and a set-top video decoder with cable television service from such providers as COMCAST, TCI, SELKIRK, LEADERSHIP and other similar companies. The customer or home consumer can through the set-top unit preview, for example, authorized movies or other digital data, including video games and experience the requested feature communicated from a remotely disposed data server. Alternatively, the consumer can through the set-top unit place an order for the item of interest either identifying it for later pick-up or home delivery within a short period of time.

The preview and order process at the customer premise was generally introduced with regard to FIG. 13. There it was identified that the customer, through the touch screen panel further illustrated in FIGS. 18 through 28, initiated the data preview and content data ordering through touch manipulation of the touch pads at the touch screen monitor.

Figure 18:
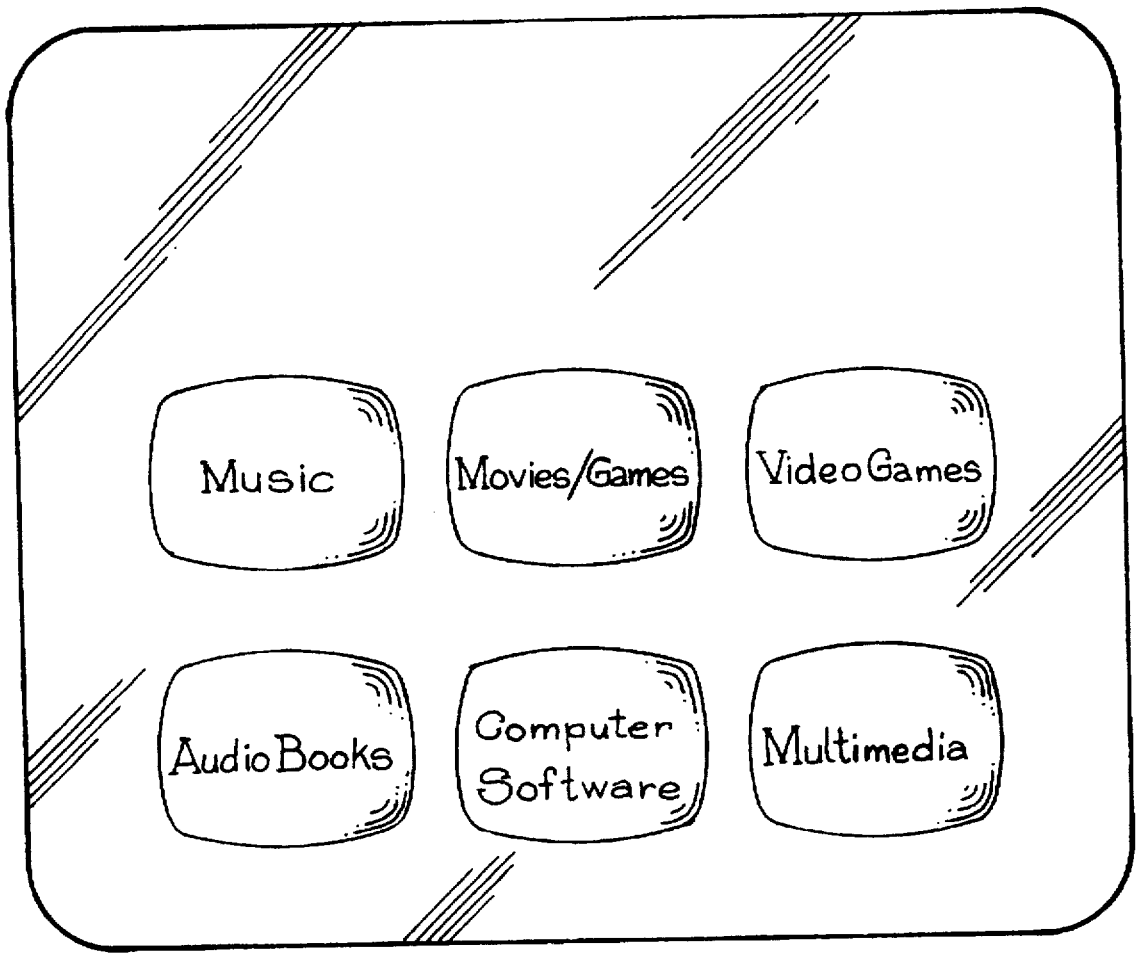
FIG. 18 is a monitor screen illustration of the library content of the on-demand audio and video system at the preview station.

FIG. 18 is one of the initial screens which will be presented to the customer. This library screen shows by way of example six touch pads with descriptive legends identifying selection categories such as MUSIC, MOVIES/VIDEOS, VIDEO GAMES, AUDIO BOOKS, COMPUTER SOFTWARE and MULTIMEDIA. Once a touch pad is contacted, the program provides for a visual indicator, such as a change in color of the pad, that the selection has been received and is understood. In the case of FIG. 18, if the MUSIC pad is touched the category screen as illustrated in FIG. 19 will be presented.

The category screen will at the top of the screen identify the customer by name as a result of the customer having presented the customer's membership or other identifying card and having inserted it into the card reader receptacle slot 1604 of FIG. 16 for initiating the transaction process at the Preview station 1303. Shown by way of example in FIG. 19, are 12 categories of music which are identified as touch pads for POP/ROCK, COUNTRY, BLUES, R&B/SOUL, EASY LISTENING, RAP, JAZZ, RELIGIOUS, SOUND TRACK, CLASSICAL, NEW AGE and COMEDY.

Along the right margin of the screen are five transactional touch pads to further assist the customer in the selection process. The top-most touch pad with the legend "Search" if touched will present the screen of FIG. 21 which will be discussed subsequently. The second from the top touch pad with the legend "Previous Screen," in the case of the present example, would return the customer to the screen in FIG. 18. The middle touch pad with the legend "Shopping Cart" will advance the screen presentation to the screen identified in FIG. 27 which will be discussed hereinafter. The touch pad second from the bottom has a legend identified as "Help." When the help touch pad is initiated, video instructions with respect to the touched screen will appear to aid the customer in the use of the screen, in this case for FIG. 19. If the bottom-most touch pad with the legend "Quit" is energized, the screen will be switched back to one of the most initial screens, not discussed here, which presents an attraction screen to encourage a walk-by customer to participate in the preview and ordering process unless an order has been made by placing an item in the Shopping Cart, in which case, the screen in FIG. 28 will be displayed.

Figure 19:
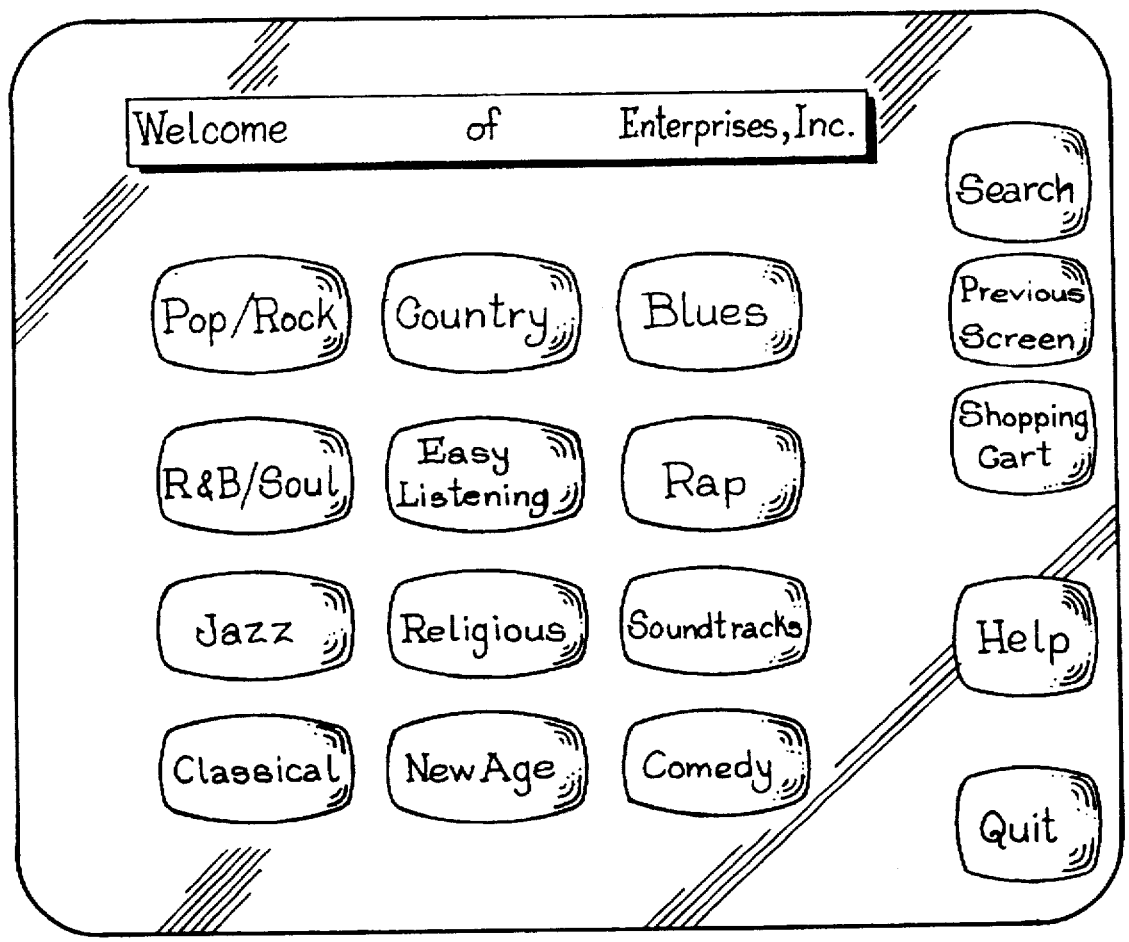
FIG. 19 is a multimedia preview station screen presentation of the audio and video music categories at the preview station.
Figure 20:
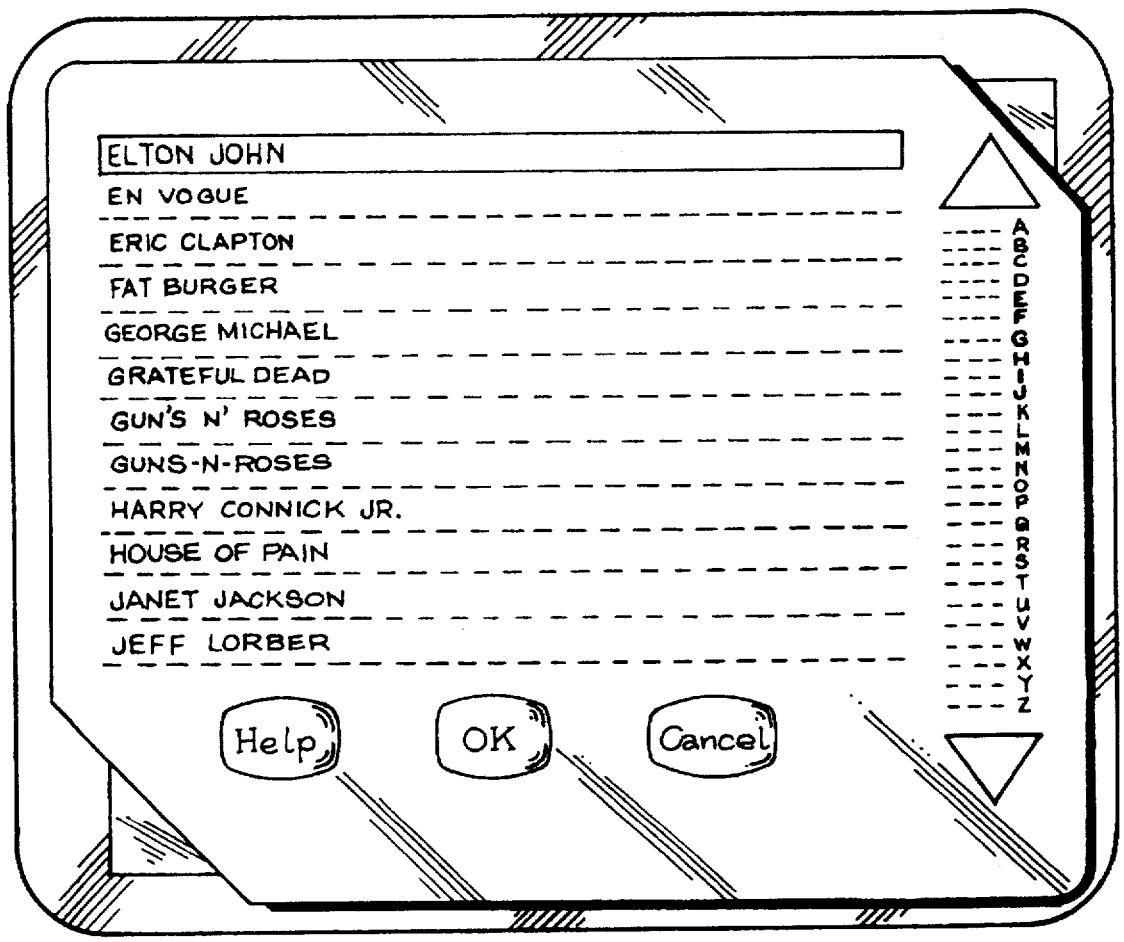
FIG. 20 is a preview station screen presentation of an exemplary listing of artists and groups within a particular music category.

The screen in FIG. 20 is what will be presented to the customer if the POP/ROCK touch pad of FIG. 19 is initiated. It provides to the customer an alphabetic listing of artists and groups included within the POP/ROCK category. At the right margin of the screen near the top is a triangular shaped touch pad which allows a customer to page up for artists or groups which may be listed at the near end of the alphabet, whereas an inverted triangle at the bottom right hand margin provides a touch pad for allowing the customer to page down to the far end of the alphabetical listing.

In addition, by touching the vertically disposed alphabet letters presented at the right side of the screen, the customer can by touching a particular letter of the alphabet have presented on the screen a list of artists or groups, which list starts with the first artist or group in the selected letter listing. The three assistance touch pads at the bottom include the "Help" touch pad which if touched will present a screen which explains the operation of the screen for FIG. 20. If the touch pad with the legend "Cancel" is touched, then in this exemplary case the category screen of either FIG. 19 or the keyboard screen of FIG. 21 will be presented dependent upon the path which the customer utilized in reaching this screen 20. If in the alternative, the customer touches the pad with the legend "OK", the screen will change to the screen of FIG. 23 which will show the multiple album listings of the selected artists or in the case of an artist who has only a single album, the next screen will be the screen identifying that particular single album as in FIG. 24. It should be noted that in FIG. 20 at the very top there is a vivid border outline around the first listed artist identifying that artist as the customer's selection. To change the selection, the customer must touch the name of another artist or group.

Figure 21:
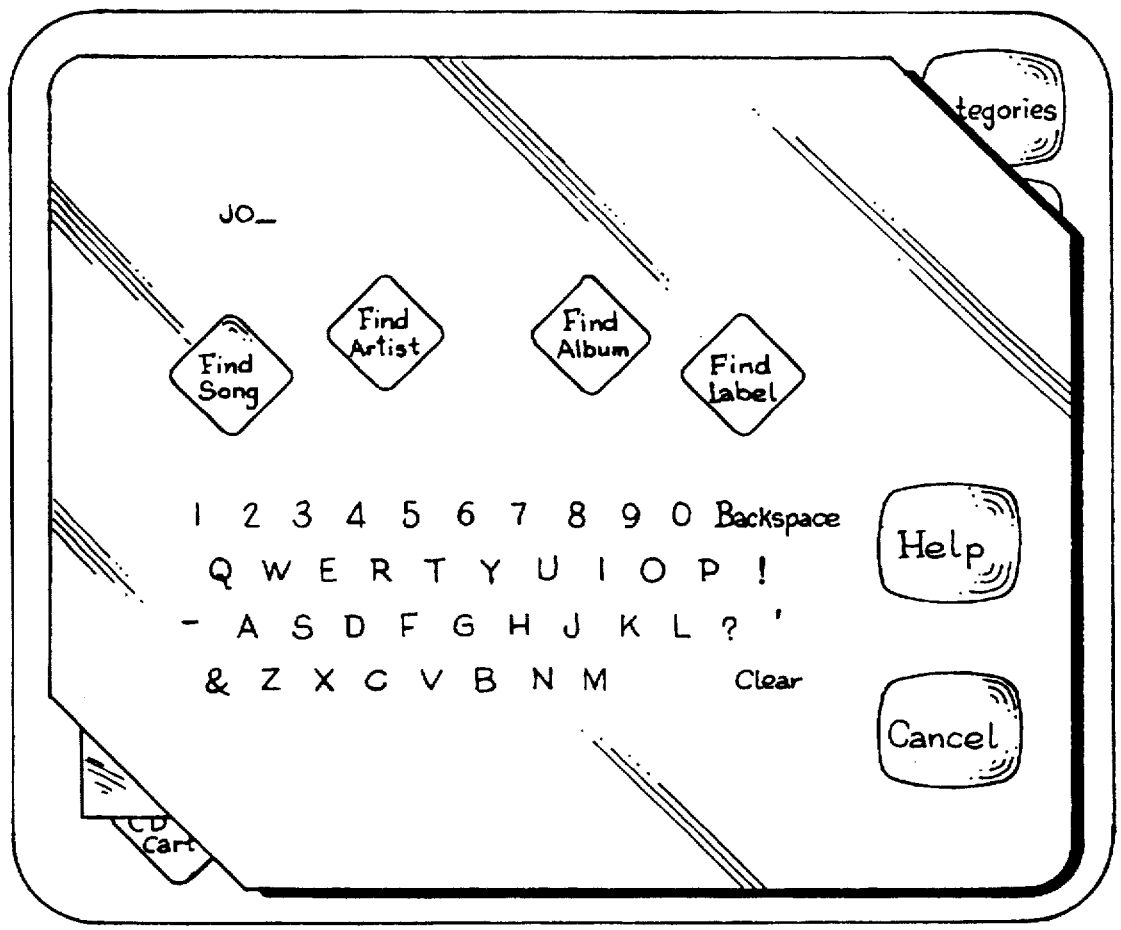
FIG. 21 is a preview station screen illustration of a keyboard layout for manipulation by touch for identifying through description artist's works.
Figure 22:
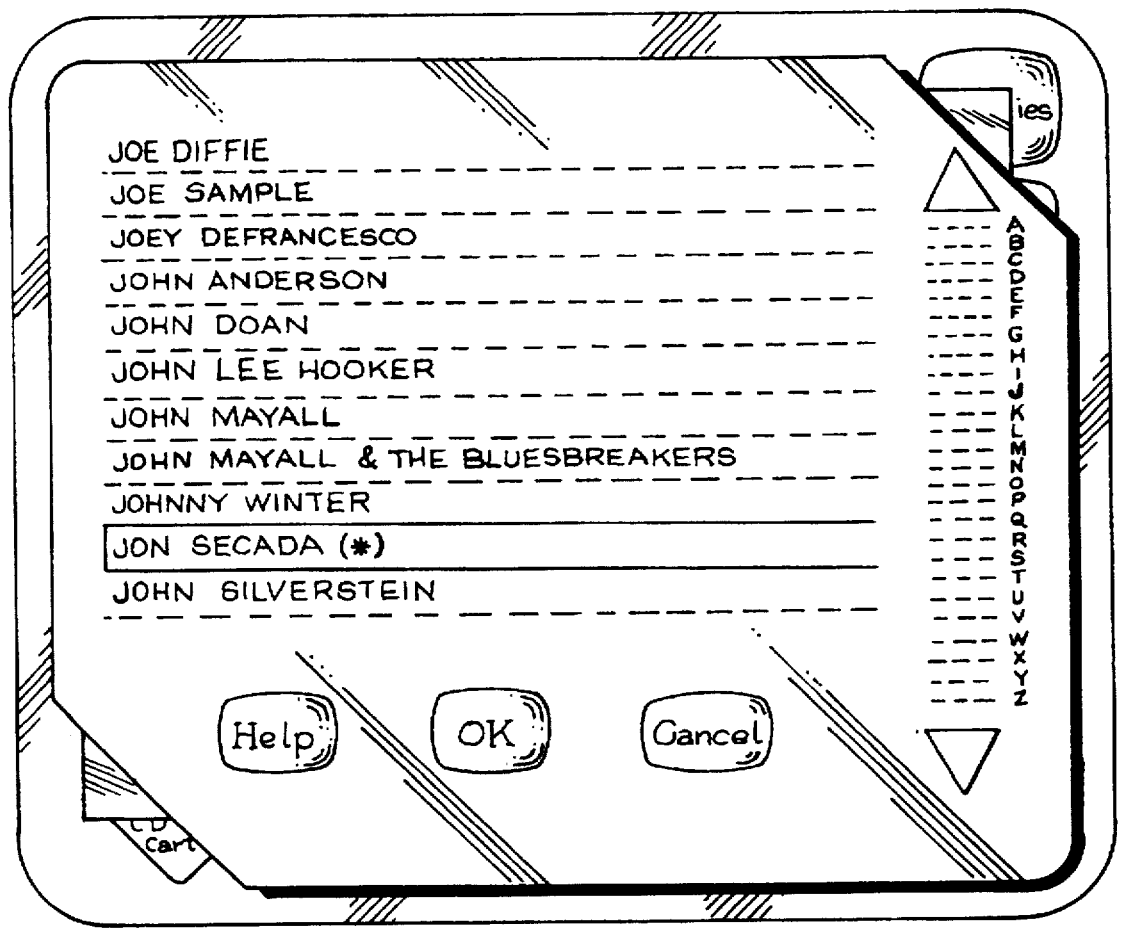
FIG. 22 is an exemplary preview station screen listing of a particular search result.

The screen of FIG. 21 is the keyboard screen which presents a typical typewriter pad for inquiry initiation by letter and number of a description of any of the subjects of the four pads identified centrally in the screen by the legends "Find Song," "Find Artist," "Find Album," and "Find Label." If for example the customer types by touching the letters "JO" and the "Touch Artist" pad is initiated, the next screen that will be presented will be the screen of FIG. 22 which identifies all such artists or groups with a name starting with "JO". In FIG. 21, as explained elsewhere herein, the "Help" touch pad will present a screen for the customer's aid in providing an explanation of the manner of use of the screen of FIG. 21. The "Cancel" touch pad at the very right hand corner when touched will, in this instance, return the viewer to the category screen of FIG. 19 or possibly FIG. 23 or 24 if the touch pad with the legend "Search" was previously touched at these respective screens.

Similarly, entering search criteria on the screeen depicted in FIG. 21 and touching the "Find Song" or "Find Album" or "Find Label" pad, will result in a screen similar to that depicted in FIG. 22 with a list of the respective search results, such as a list of song titles or album names or albums of a specific music recording label depending on the pad pressed.

In the presented example, FIG. 22 illustrates a list of artists. The vivid border around the listed artist indicates the selection the customer has made. If the customer touches the touch pad with the legend "OK" the customer will be presented with the screen of FIG. 23. The touch pads at the right border of the screen of FIG. 23 are exemplary and are discussed in general with respect to other figures and screens. Selecting a specific album by touching the album picture or the screen causes the screen in FIG. 24 to be presented.

The customer when presented with the screen of FIG. 24 which lists a specific album title, artist and label company for that particular album, has the choice of selecting, from the listed pieces on that album, both audio and video as indicated to the right side of each of the listed pieces where audio is identified as being available if the headphone set icon 2402 is presented and video is identified as being available if the television set icon 2404 is present. The headset icon 2402 and the TV icon 2404 are touch points which can be touched to initiate preview of the selected song or music video.

The screen in FIG. 24 is identified as the song screen, and if there are more selections than can be presented on an individual screen, then the triangular shaped touch points are available for paging up or paging down. Further, the touch points or pads at the right margin of the figure are exemplary of past discussed touch pads with similar legends. At the bottom of the screen, there are three touch points with legends, including "Place CD in Cart," "Place Cassette in Cart" and "Suggest." If the CD touch point is touched, then the particular listed album will be presented to the customer in the customer's shopping cart as a CD. Likewise, the customer may select a cassette if the cassette touch pad is touched. If either of the touch pads are consecutively touched, then each time the touch pad is contacted it will place an additional CD or cassette in the shopping cart. The "Suggest" touch point of FIG. 24 when touched will present additional selections similar to the artist or group identified at the top portion of the screen 24 which can be tailored to the customer's interest based upon information available from the Customer Data Base 128 of FIG. 1.

Figure 25:
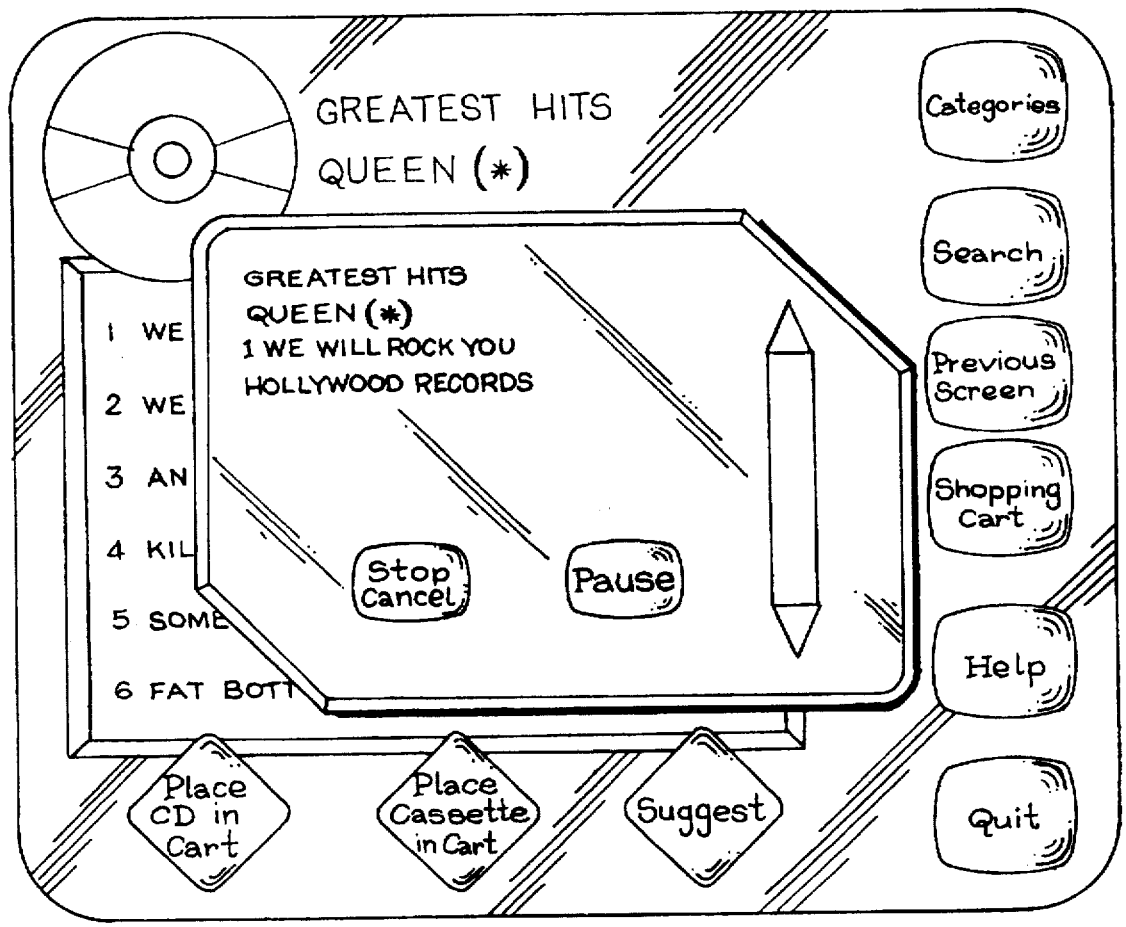
FIG. 25 is an exemplary preview station screen depicting a single selection for audio preview.

When a headset icon 2402 is touched, such as those illustrated in FIG. 24, then a screen such as that illustrated in FIG. 25 which is an audio screen will be presented for preview of the identified song or piece by the artist. It will be noted that the audio screen for preview is superimposed upon the screen which was identified for FIG. 24. Only the touch pads of the superimposed screen are active when presented with the screen of FIG. 25. Presented at the bottom portion of the superimposed screen of FIG. 25 are two touch pads. The left most pad being a touch pad to stop and cancel the preview presentation, whereas the right most touch pad is a "Pause" touch pad for momentary stopping the audio presentation. At the right side of the superimposed screen is a double ended vertical pointer which provides a volume control which is dependent upon the level of the point touched or manipulated by the customer.

Figure 26:
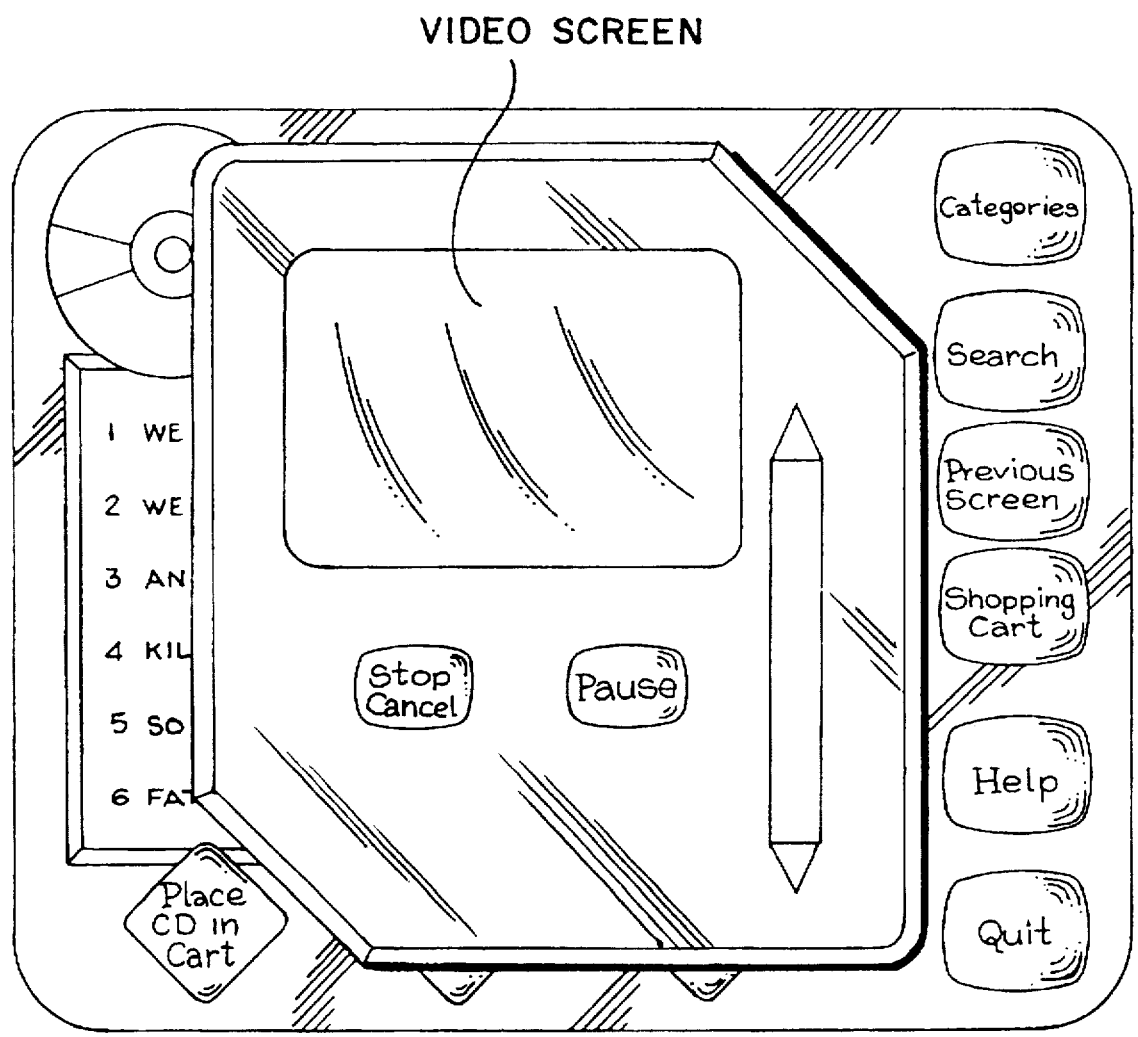
FIG. 26 is an exemplary video preview station screen with motion video of a selection.

In FIG. 26 the customer is presented with a presentation of the video selection if the customer has initiated a touch at the TV icon 2404 as presented in FIG. 24. The screen of 26 has similar "Stop and Cancel," "Pause" and volume touch point controls as in FIG. 25.

Figure 27:
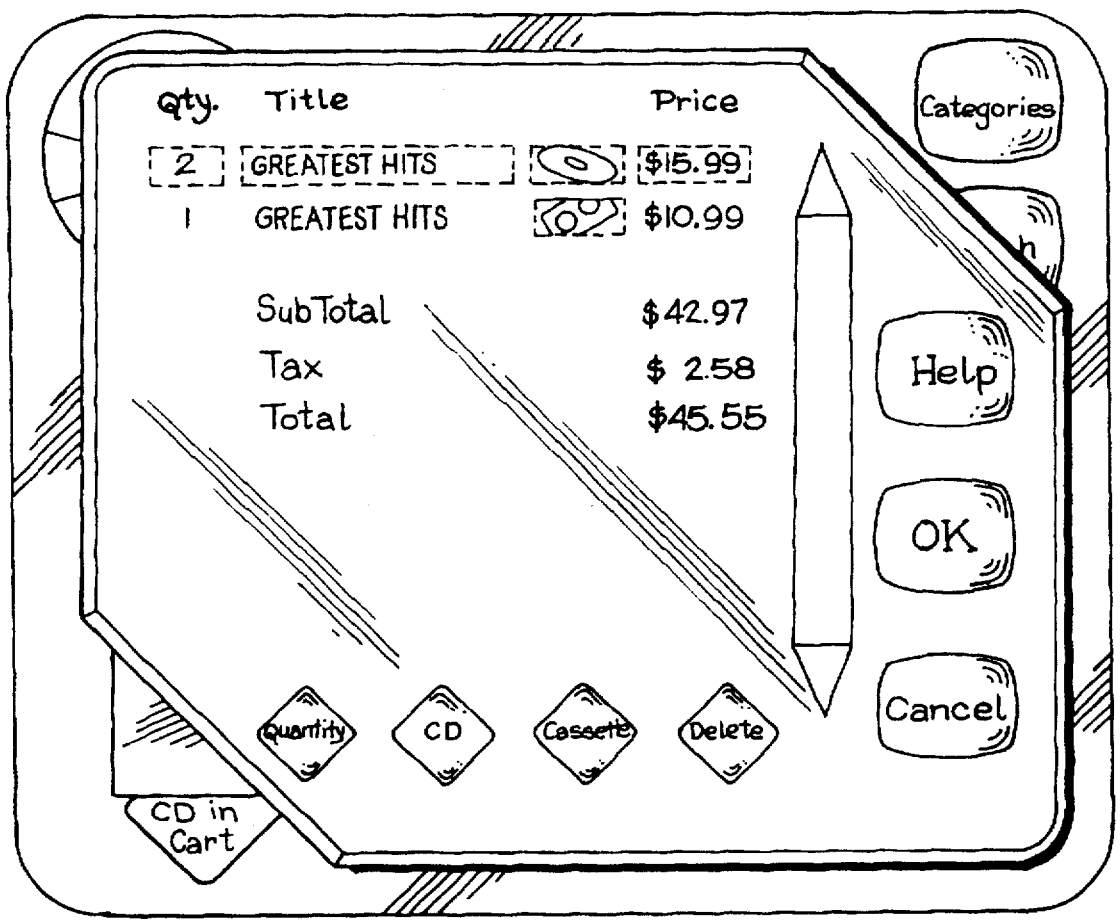
FIG. 27 is an exemplary preview station screen listing and itemization of selected items in the shopping cart of the previewer.

FIG. 27 presents a screen which is a Shopping Cart screen which identifies those album selections which the customer has made during the course of the customer's presence in the preview booth 1303. It presents the customer with the quantity, the title, the format, i.e., CD or cassette, itemized with subtotal, and tax and total prices. The touch pads at the bottom with the legends "Quantity," "CD," "Cassette" and "Delete" allow the customer to change the quantity or change the format, or to delete selections if there should be a change of mind on the part of the customer or the customer needs to make a correction in the order. The touch pad with the legend "Quantity" can increase the quantity by touching at the top part of the diamond shaped touch pad or by touching at the bottom to reduce the quantity.

Figure 28:
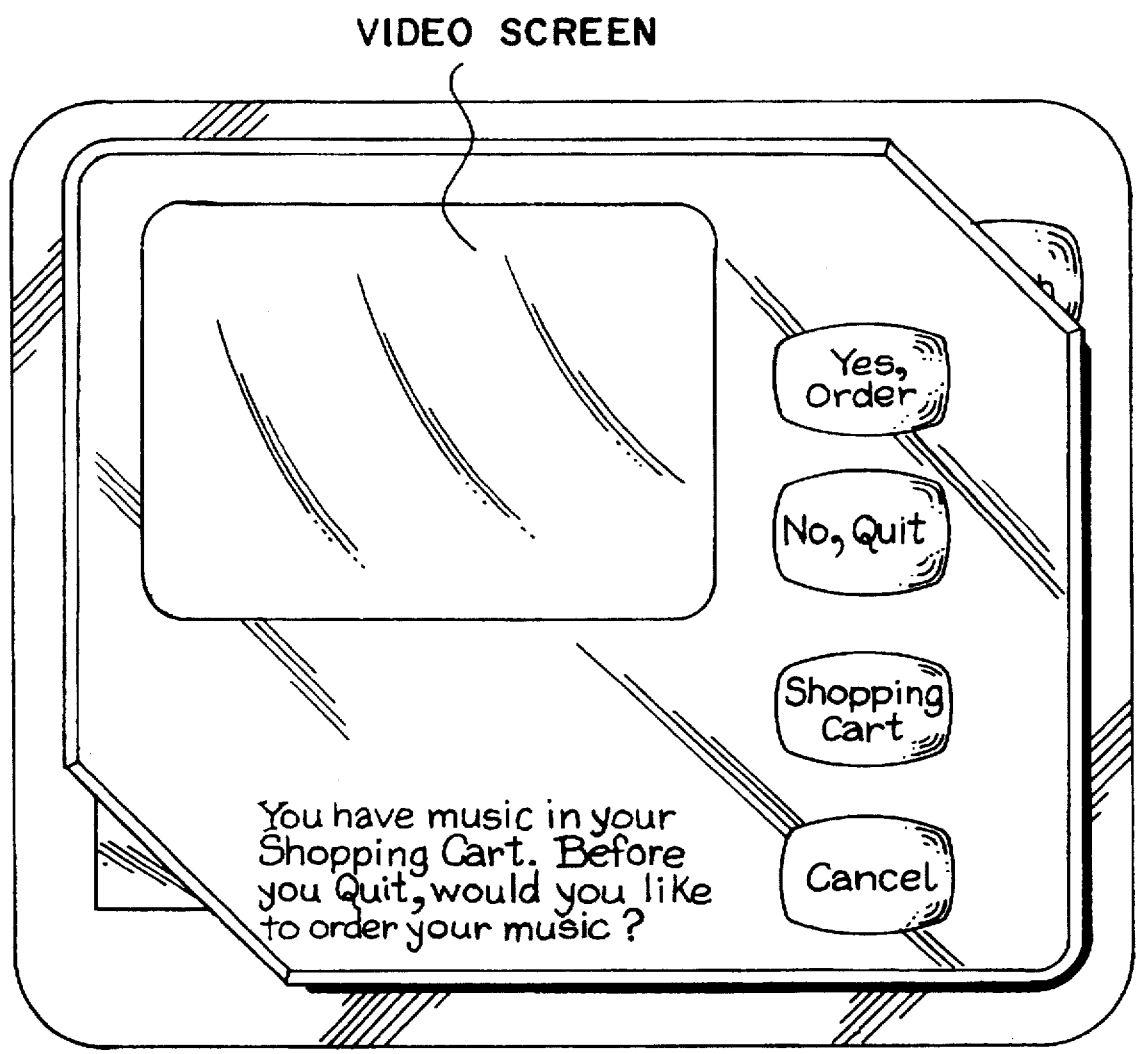
FIG. 28 is an exemplary preview station screen presenting a previewer with the opportunity to submit or cancel an order.

In FIG. 28 the customer is presented with this screen to place an order or in the event that during the course of the preview and ordering, the customer has requested to discontinue the ordering process and has touched the pad with the legend "Quit" when the shopping cart of the customer at that particular time has identified items for purchase. A video screen will appear with a sales clerk audibly presenting a statement to the customer, as shown in print at the bottom of the screen, suggesting that the customer review the customer's shopping cart and make a determination, based on the touch pads at the right margin, to clarify the order status and the purchase and order intentions of the customer.

The on-demand digital data reproduction system of the present invention provides numerous accounting tools which have flexibility in their location placement, and, for example, can reside at the local retail store level as shown at retail store 110 in FIG. 1, in particular at the accounting management subsystem 108, and for example the retail accounting and management subsystem 1306 of FIG. 13 and also that which is shown, by way of example, in FIG. 15 at the retail accounting manager's workstation 1504.

Figure 37:
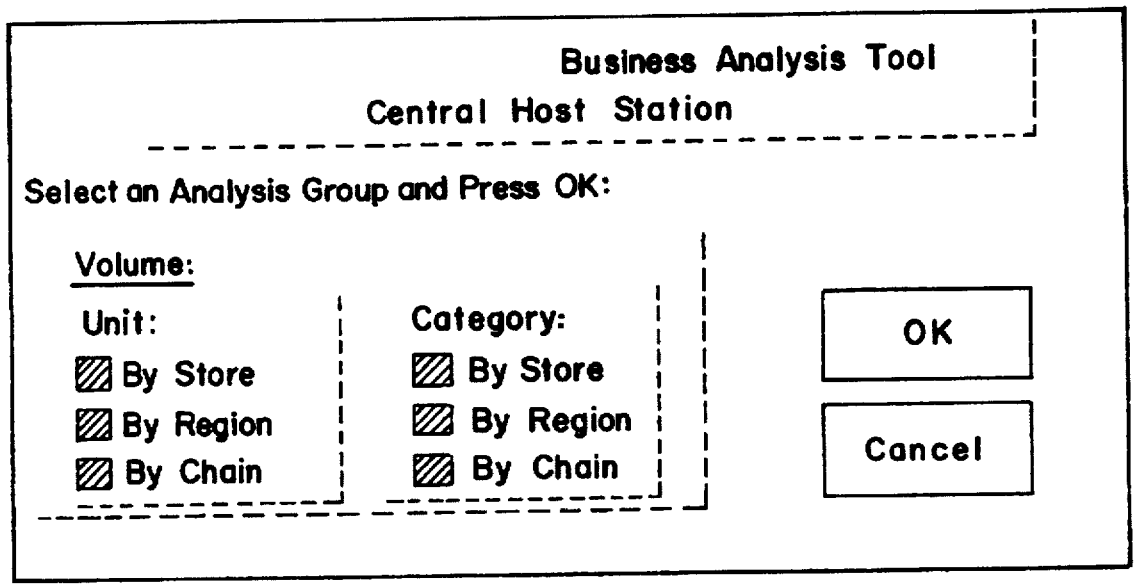
FIG. 37 is an exemplary central host accounting workstation screen analysis tool for local, regional and chain accounting information.
Figure 38:
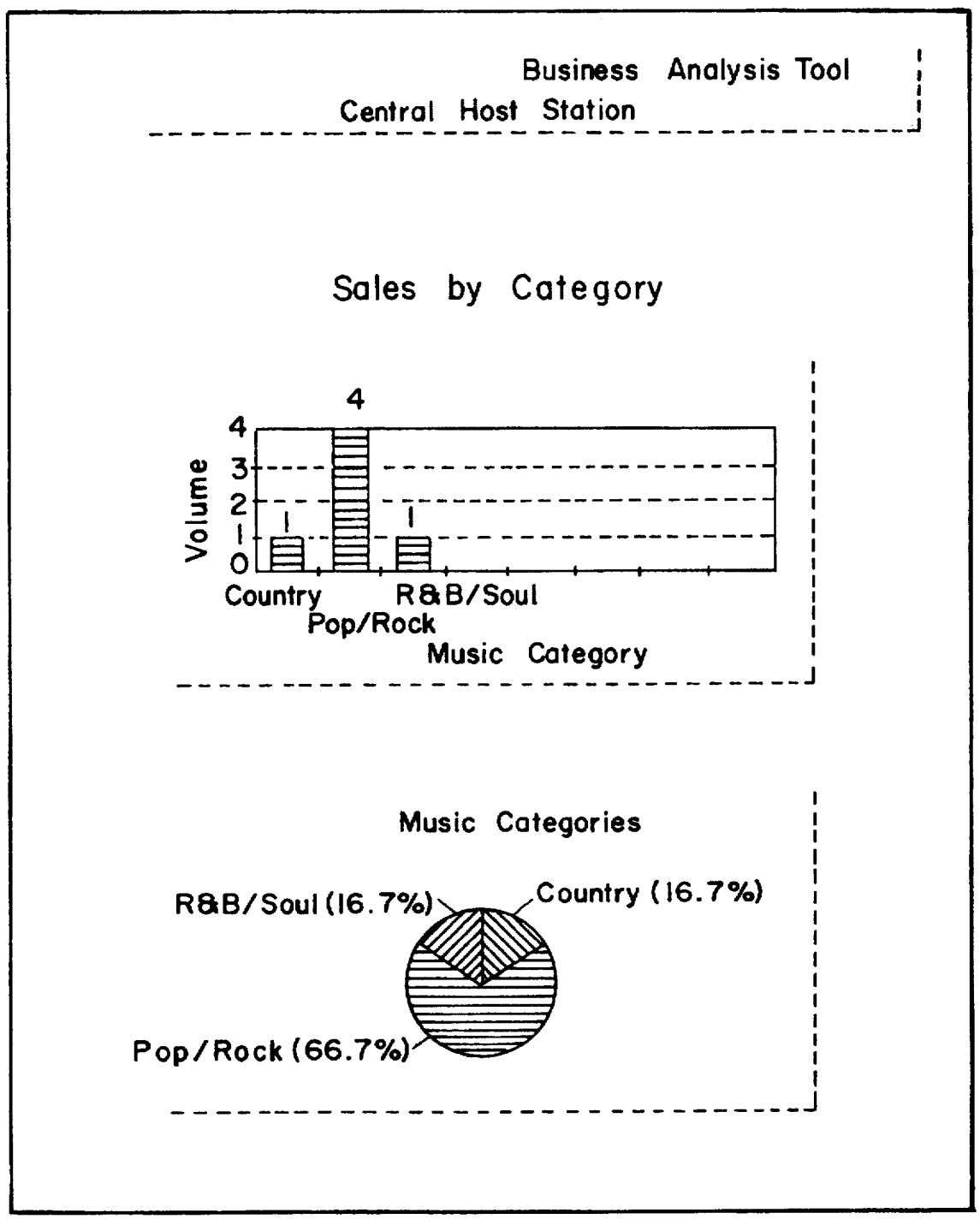
FIG. 38 is an exemplary hardcopy printout report of a central host analysis accounting tool showing sales for the regional central host by music category.

A few of the transactional analysis tool workstation screens of the manager's workstation are illustrated in FIGS. 29-36, with a central host analysis tool screen presentation shown in FIG. 37. A hard copy sales by-category report in FIG. 38, is the result of activity and requests made at the analysis central host workstation in FIG. 37.

FIG. 29 presents for the operator numerous report opportunities with regard to sales and customer demographics. In the sales category, reports on gross revenue, top selling albums for a category, top selling albums, music category and unit sales by media type can be accessed by way of example. Customer demographics can be further analyzed by reports specific to customer transactions by age, time of day and money spent. Activating the gross revenue sales report will result in the presentation of the screen of FIG. 30, where by way of illustration, a report is provided for compact discs and tape sales in monetary amounts. Activating the top selling albums category will result in the screen presentation as shown in FIG. 31 where the albums and the specific unit sales count number are indicated. As shown in FIG. 31 a hard copy report can be obtained through manipulation of the "Print" touch pad.

Figure 33:
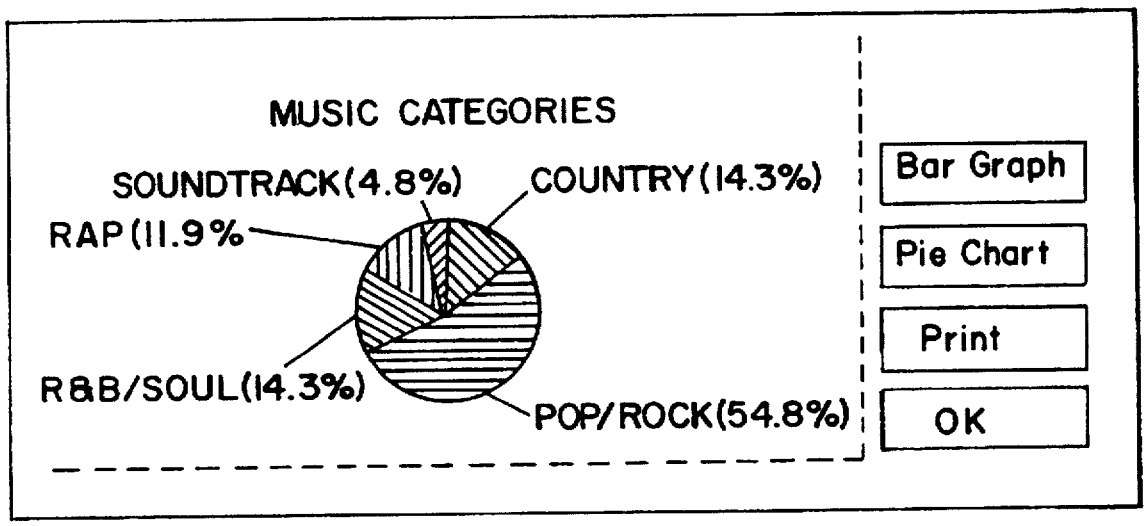
FIG. 33 is an exemplary graphical screen presentation of retail activity by type of music.
Figure 34:
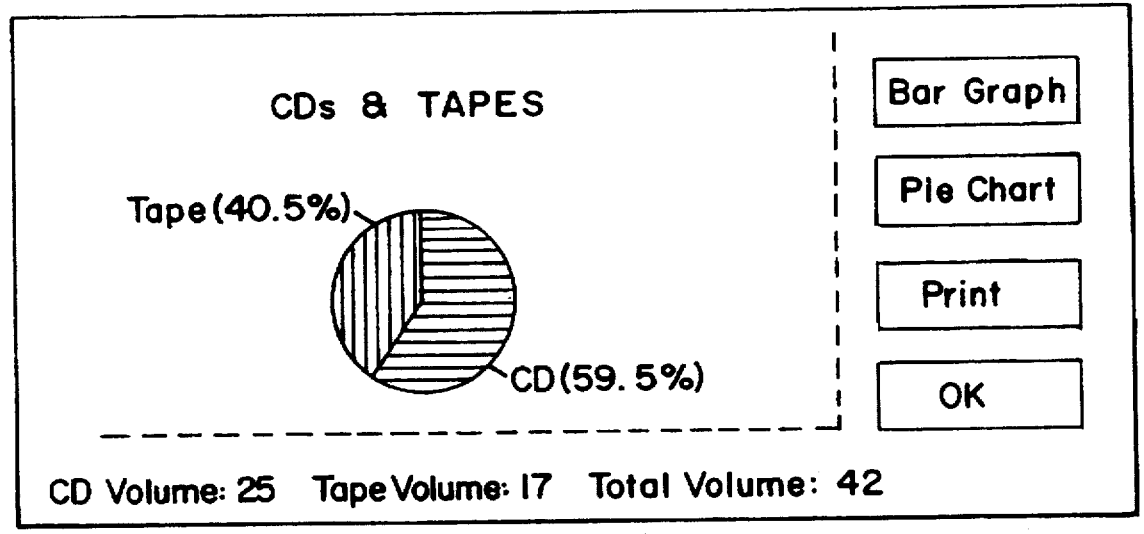
FIG. 34 is an exemplary graphical screen presentation of retail activity by type of media.

At FIG. 29, activation of the top selling albums feature will result in presentation of the screen shown in FIG. 32 where the albums for all categories are listed as well as the numerical sales count. If the music category analysis tool of FIG. 29 is activated, then the screen presentation would be that of FIG. 33 where the categories are illustrated, and in this particular example, in a pie chart formation. The touch pad to the right of the screen in FIG. 33 is for other graphical selections such as bar graphs or a print in hard copy. Similar to the presentation in FIG. 33 is the presentation of FIG. 34 where the data format, such as for CDs and tapes, can be illustrated in the pie chart graphical presentation. The screen of FIG. 34 can be obtained by activation of the sales category by media type at the screen of FIG. 29.

For customer demographics the activation of customer transactions by age in FIG. 29 results in the presentation of the screen in FIG. 35, whereas, the time of day for a transactions count, when activated, presents the screen of FIG. 36. Likewise, the money spent category in FIG. 29 pulls up and displays screens similar to those of FIGS. 35 and 36 for money amounts spent as a function of time at an identified particular store operation.

The screen of FIG. 37 is a higher level analysis tool for the central host workstation such as that illustrated in FIG. 11 for the central repository and accounting subsystem 1110 or in FIG. 15 for the central host accounting 1506. Transactional operation at this screen can provide significant managerial information and data with regard to the sales performance and accountability by retail store, by geographic regions or by a chain of particular stores and the hard copy presentation of FIG. 38 shows, by way of example, particular sales performance aspects of that available data.

While the invention has been particularly shown and described with reference to a detailed description, it will be understood by those skilled in the art that various changes in form and detail may be made therein without departing from the spirit and scope of the invention.

What is claimed is:

1. In a multimedia manufacturing system, a method for providing media with information, which information is processed for subsequent playback, comprising the steps of:

storing digital information in a source library at a first location;

identifying at a plurality of second locations, each remote from the first location, portions of the digital information in the source library;

concurrently sending request commands at a high speed constant bit rate from the second locations to the source library for the same and different identified portions of the digital information in the source library via a multiplexing means at each second location, a wide bandwidth communications network and a demultiplexing means at the first location;

validating that the identified portions of the digital information are authorized for playback;

logging each validation step of an identified portion of the digital information in an accounting data base;

concurrently accessing in real time the same and different portions of the digital information in the source library in response to said request commands as they are received at the first location;

said accessing step including the step of concurrently making independent multiple accesses to each portion in real time in response to multiple concurrent request commands for said each portion as they are received at the first location;

transferring in real-time at a high speed constant bit rate each accessed portion of the digital information to a respective one of a plurality of different types of manufacturing devices at a location other than the first location for incorporation of the digital information on a predetermined one of a plurality of different types of media suitable for playback via a multiplexing means at the first location, the wide bandwidth communications network and a demultiplexing means at said other location; and incorporating each accessed portion of the digital information on the predetermined medium in real-time in a manner adapted for playback.

2. The method for providing media with identified digital information as defined in claim 1, wherein the step of transferring in real-time each identified portion of the digital information transfers the digital information at a high speed constant bit rate in asynchronous transfer mode.

3. The method for providing media with identified digital information as defined in claim 1, wherein the step of transferring in real-time each identified portion of the digital information transfers the digital information at a high speed constant bit rate which exceeds 44.7 megabits per second.

4. The method for providing media with information which information is processed for subsequent playback, as defined in claim 1 wherein the step of storing digital information in a source library at a first location stores encrypted and compressed digital information and further comprising the step of decrypting and decompressing the accessed portions of the digital information at said other location and providing the manufacturing devices with the decrypted and decompressed portions of the digital information for incorporation on the media.

5. The method for providing media with information, which information is processed for subsequent playback, as defined in claim 1, wherein the digital information stored in the source library includes audio information and video information, and wherein the step of providing each manufacturing device with a selected portion of the digital information provides audio and video information at a communication rate appropriate for direct incorporation of the information on media for playback of the digital information at X rate for audio information and at Y rate for video information, said approximate rate being a multiple of the X rate for audio information and being a multiple of the Y rate for video information which multiple is a function of whether the information is audio or video and the recording speed of the manufacturing device.

6. The method of claim 1, wherein the step of transferring each accessed portion of the digital information to a respective manufacturing device comprises applying each accessed portion to the communications network via the multiplexing means at the first location at a data rate required to faithfully reproduce each respective accessed portion on a respective medium in a manner adapted for playback.

7. The method of claim 1, wherein a plurality of manufacturing devices are provided in each of at least certain second locations for incorporating each portion of the digital information identified and requested at a certain second location on a respective predetermined medium in a manner adapted for playback.

8. In a multimedia manufacturing system, a method for providing media with information, which information is processed for subsequent playback, comprising the steps of:

storing digital information at a first location in a source library comprised of direct access storage means for immediate access to segments of the information independent of their location in storage;

identifying at a plurality of second locations, each remote from the first location, portions of the digital information in the source library;

multiplexing at each second location request commands for the same and different identified portions of the digital information in the source library for transmission to said source library;

concurrently sending said multiplexed request commands from the second locations to the first location;

validating that the identified portions of the digital information are authorized for playback;

logging each validation step of an identified portion of the digital information in an accounting data base;

demultiplexing said multiplexed request commands at said first location for concurrent accessing of the identified portions of the digital information from said source library;

concurrently accessing succeeding segments of identified portions of the information in real time as request commands are received at the first location;

arranging the succeeding segments of each accessed identified portion in a sequence of asynchronous transmission mode (ATM) cells with headers having routing information;

multiplexing the ATM cells of different ones of the accessed identified portions for concurrent transmission of the identified portions to second locations in accordance with said routing information;

transmitting the ATM cells of each accessed identified portion in sequence at a high speed constant bit rate over wide bandwidth transmission paths concurrently with the sequential transmission of the multiplexed ATM cells of other accessed identified portions to second locations in accordance with the routing information;

demultiplexing at the second locations incoming multiplexed sequences of ATM cells for transfer of each sequence to a respective manufacturing device;

sending the segments in each sequence of ATM cells to a respective manufacturing device at a data rate required to faithfully reproduce a respective identified portion on a respective medium in real time in a manner adapted for playback.

9. The method of claim 8, wherein the step of transmitting the ATM cells of each accessed identified portion in sequence to a second location occurs at a data rate required to faithfully reproduce a respective identified portion on a respective medium in a manner adapted for playback.

10. A real time system for concurrently reproducing recordings on various types of media, at each of a plurality of customer premises, in response to requests transmitted concurrently from each of the customer premises to a remote source library comprising:

a first location having:
means for storing original audio and audio/video recordings in digital form in a source library comprised of direct access storage means for immediate access to segments of the recordings independent of their location in storage;

data server apparatus for accessing the recordings in the library in response to requests; and first multiplexer/demultiplexer means coupled to the server apparatus;

a plurality of customer premise locations remote from the first location and each having:
  a plurality of terminals for selecting recordings and for initiating concurrent requests for the same and different recordings;
  a plurality of manufacturing devices, each effective for recreating faithful reproductions of certain recordings on a respective one of several types of media adapted for subsequent playback; and
  second multiplexing/demultiplexing means coupled to the terminals and devices;
a wide bandwidth communications network having means for routing and transporting data at a high speed constant bit rate, said bandwidth being greater than an aggregate bandwidth required by the terminals and manufacturing devices at the customer premise location to reproduce recordings in response to concurrent requests from the terminals;
a first high speed trunk coupling the network to the first multiplexer/demultiplexer means and a respective second high speed trunk coupling the network to each second multiplexer/demultiplexer means;
said terminals including means for initiating and sending concurrent requests for the same and different selected recordings to the data server apparatus by way of the second multiplexer/demultiplexer means, the second high speed trunks, the communications network, the first trunk and the first multiplexer/demultiplexer means;
said data server apparatus including means effective in response to said concurrent requests for concurrently accessing consecutive segments of said same and different selected recordings and including additional means for arranging the accessed consecutive segments of each selected recording into a sequence of asynchronous transmission mode (ATM) cells having recording segments and headers with routing information;
means for concurrently applying the sequences of ATM cells of different ones of the concurrently accessed selected recordings to said first multiplexer/demultiplexer means for concurrent transmission of the accessed recordings over said network to respective customer premise locations in accordance with said routing information;
said network including means for assigning a network path to each of the ATM cells applied thereto by the first multiplexer/demultiplexer means in accordance with network traffic and load;
said second multiplexing/demultiplexing means at each customer premise location including means effective to direct each sequence of ATM cells transmitted thereto via the network to a respective one of the manufacturing devices for reproduction of a respective original recording on a respective media.

11. The real time system of claim 10, wherein the means for concurrently applying the sequences of ATM cells to the first multiplexer/demultiplexer means applies each sequence at a data rate required to faithfully reproduce a respective original recording on a respective medium.

12. A real time system for recording on various types of media at each of a plurality of customer premises, information in response to requests transmitted concurrently from each of the customer premises to a remote source library comprising:
  a first location having:
    means for storing content data in digital form in a source library comprised of direct access storage means for immediate access to segments of the content data independent of their location in storage;
    data server apparatus for accessing content data in the library in response to requests; and
    first multiplexer/demultiplexer means coupled to the server apparatus;
  a plurality of customer premise locations remote from the first location and each having:
    a plurality of terminals for identifying portions of the content data and for initiating concurrent requests for the same and different portions of the content data;
    a plurality of manufacturing devices, each effective for recording on a respective one of several types of media content data adapted for subsequent playback; and
    second multiplexing/demultiplexing means coupled to the terminals and devices;
  a wide bandwidth communications network having means for routing and transporting data at a high speed constant bit rate, said bandwidth being greater than an aggregate bandwidth required by the terminals and manufacturing devices at the customer premise location to produce recordings in real time in response to concurrent requests from the terminals;
  a first high speed trunk coupling the network to the first multiplexer/demultiplexer means and a respective second high speed trunk coupling the network to each second multiplexer/demultiplexer means;
  said terminals including means for initiating and sending concurrent requests for the same and different identified portions of the content data to the data server apparatus by way of the second multiplexer/demultiplexer means, the second high speed trunks, the communications network, the first trunk and the first multiplexer/demultiplexer means;
  said data server apparatus including means effective in response to said concurrent requests for concurrently accessing consecutive segments of said same and different identified portions of the content data and including additional means for arranging the accessed consecutive segments of each accessed, identified portion into a sequence of asynchronous transmission mode (ATM) cells having headers with routing information;
  means for concurrently applying the sequences of ATM cells of different ones of the concurrently accessed identified content data portions to said first multiplexer/demultiplexer means for concurrent transmission of the accessed, identified portions over said network to respective customer premise locations in accordance with said routing information;
  said network including means for assigning a network path to each of the ATM cells applied thereto by the first multiplexer/demultiplexer means in accordance with network traffic and load;
  said second multiplexing/demultiplexing means at each customer premise location including means effective to direct each sequence of ATM cells transmitted thereto via the network to a respective one of the manufacturing devices for reproduction of a respective identified portion on a respective media.

13. The real time system of claim 12, wherein the means for concurrently applying the sequence of ATM cells to the first multiplexer/demultiplexer means applies each sequence at a data rate required to record the respective content data on the respective medium.

14. In a multimedia retrieval and distribution system, a method comprising the steps of:

storing multimedia information in digital form in a source library at a first location;

identifying at a plurality of second locations, each remote from the first location, portions of the digital information in the source library;

concurrently sending request commands from the second locations to the source library for the same and different identified portions of the digital information in the source library via a wide bandwidth communications network and a demultiplexing means at the first location;

validating that the identified portions of the digital information are authorized for retrieval;

logging each validation step of an identified portion of the digital information in an accounting data base;

concurrently accessing in real time the same and different portions of the digital information in the source library in response to said request commands as they are received at the first location;

said accessing step including the step of concurrently making independent multiple accesses to each portion in real time in response to multiple concurrent request commands for said each portion as they are received at the first location;

transferring in real time at a high speed constant bit rate each accessed portion of the digital information to a respective utilization device at a respective second location for faithful reproduction of the respective accessed portion in the respective utilization device via a multiplexing means at the first location and the wide bandwidth communications network.

15. The method defined in claim 14, wherein the step of storing multimedia information in digital form in a source library at a first location stores encrypted and compressed digital information and further comprising the step of decrypting and decompressing the accessed portions of the digital information at said other location, and providing the utilization devices with the decrypted and decompressed portions of the digital information.

16. In a multimedia retrieval and distribution system, a method comprising the steps of:

storing multimedia information in digital form at a first location in a source library comprised of direct access storage means for immediate access to segments of the information independent of their location in storage;

identifying at a plurality of second locations, each remote from the first location, portions of the digital information in the source library;

initiating request commands for the same and different identified portions of the digital information in the source library for transmission to said source library;

concurrently sending said request commands from the second locations to the first location;

validating that the identified portions of the digital information are authorized for playback;

logging each validation step of an identified portion of the digital information in an accounting data base;

processing said request commands at said first location for concurrent accessing of the identified portions of the digital information from said source library;

concurrently accessing succeeding segments of identified portions of the information in real time as request commands are received at the first location;

arranging the succeeding segments of each accessed identified portion in a sequence of data packets with headers having routing information;

applying the data packets of different ones of the accessed identified portions to a multiplexing means for concurrent transmission of the accessed identified portions to second locations in accordance with said routing information and at respective data rates required to faithfully reproduce each portion of the multimedia information in a respective utilization device;

transmitting the data packets of each accessed identified portion in sequence at a high speed constant bit rate over wide bandwidth transmission paths concurrently with the sequential transmission of the multiplexed data packets of other accessed identified portions to second locations in accordance with the routing information; and routing at the second locations incoming sequences of data packets to respective utilization devices.

17. A real time system for concurrently reproducing multimedia recordings at each of a plurality of customer premises, in response to requests transmitted concurrently from the customer premises to a remote source library comprising:

a first location having:
means for storing original audio and audio/video recordings in digital form in a source library comprised of direct access storage means for immediate access to segments of the recordings independent of their location in storage;

data server apparatus for concurrently accessing the same and different ones of the recordings in the library in response to requests; and multiplexer/demultiplexer means coupled to the server apparatus;

a plurality of customer premise locations remote from the first location and each having:
means for selecting one of the recordings and for initiating a request for the selected recording;

at least one utilization device effective for recreating faithful reproductions of requested recordings;

a wide bandwidth communications network having means for routing and transporting data at a high speed constant bit rate, said bandwidth being greater than an aggregate bandwidth required by the utilization devices at the customer premise locations to reproduce recordings in response to concurrent requests from the customer premise locations;

a first high speed trunk coupling the network to the multiplexer/demultiplexer means and a respective second high speed trunk coupling the network to each customer premise requesting means and utilization device;

means for sending concurrent requests for the same and different selected recordings to the data server apparatus by way of the second high speed trunks, the communications network, the first trunk and the multiplexer/demultiplexer means;

said data server apparatus including means effective in response to said concurrent requests for concurrently accessing consecutive segments of said same and different selected recordings and including additional means for arranging the accessed consecutive segments of each selected recording into a sequence of asynchronous transmission mode cells having recording segments and headers with routing information;

means for concurrently applying the sequences of cells of different ones of the concurrently accessed selected recordings to said multiplexer/demultiplexer means for concurrent transmission of the accessed records over said network to respective customer premise locations in accordance with said routing information;

said data server apparatus including means for applying each sequence of cells to the multiplexer/demultiplexer means at a respective data rate required to faithfully reproduce the respective recording on a respective utilization device;

said network including means for assigning a network path to each of the cells applied thereto by the multiplexer/demultiplexer means in accordance with network traffic and load;

means at each customer premise location effective to direct each sequence of cells transmitted thereto via the network to a respective utilization device for faithful reproduction of a respective original recording at the customer premise location.

18. A real time system for reproducing in utilization devices at each of a plurality of customer premises multimedia recordings in response to requests transmitted concurrently from the customer premises to a remote source library comprising:

a first location having:

means for storing multimedia recordings in digital form in a source library comprised of direct access storage means for immediate access to segments of the recordings independent of their location in storage;

data server apparatus for accessing the recordings in the library in response to requests; and multiplexer/demultiplexer means coupled to the server apparatus;

a plurality of customer premise locations remote from the first location and each having:

means for identifying recordings and for initiating requests for the same and different recordings concurrent with requests from other customer premise locations; and a plurality of utilization devices, each effective for reproducing a respective type of recording;

a wide bandwidth communications network having means for routing and transporting data at a high speed constant bit rate, said bandwidth being greater than an aggregate bandwidth required by the utilization devices at the customer premise locations to reproduce recordings in real time in response to anticipated concurrent requests from the customer premise locations;

a first high speed trunk coupling the network to the multiplexer/demultiplexer means and a respective second high speed trunk coupling the network to each customer premise location;

said customer premise locations including means for sending concurrent requests for the same and different identified recordings to the data server apparatus by way of the second high speed trunks, the communications network, the first trunk and the multiplexer/demultiplexer means;

said data server apparatus including means effective in response to said concurrent requests for concurrently accessing consecutive segments of said same and different identified recordings and including additional means for arranging the accessed consecutive segments of each accessed, identified recording into a sequence of asynchronous transmission mode cells having headers with routing information;

means for concurrently applying the sequences of cells of different ones of the concurrently accessed identified recordings to said multiplexer/demultiplexer means for concurrent transmission of the accessed, identified recordings over said network to respective customer premise locations in accordance with said routing information;

said network including means for assigning a network path to each of the cells applied thereto by the multiplexer/demultiplexer means in accordance with network traffic and load;

each customer premise location including means effective to direct each sequence of cells transmitted thereto via the network to a respective one of the utilization devices for faithfully reproducing a respective recording.

19. The real time system of claim 18, wherein the means for concurrently applying sequences of cells to the multiplexer/demultiplexer means applies each sequence at a data rate required to faithfully reproduce a respective recording in a respective utilization device.

\* \* \* \* \*

UNITED STATES PATENT AND TRADEMARK OFFICE
CERTIFICATE OF CORRECTION

PATENT NO. : 5,734,719
DATED : March 31, 1998
INVENTOR(S) : TSEVDOS, James T., et al It is certified that error appears in the above—identified patent and that said Letters Patent is hereby corrected as shown below:

On the title page:

[73] Assignee: International Business Machines Corporation
Armonk, New York

The printed patent incorrectly indicates assignee as: International Business Systems, Incorporated, Armonk, N.Y.

Attorney, Agent or Firm - Barry L. Haley, Esq.
John C. Black, Esq.

Signed and Sealed this

Twenty-ninth Day of December, 1998

Attest:

BRUCE LEHMAN

*Attesting Officer*     *Commissioner of Patents and Trademarks*